(12) United States Patent
Hurwicz

(10) Patent No.: US 11,523,712 B1
(45) Date of Patent: Dec. 13, 2022

(54) SINK UTENSIL HOLDER

(71) Applicant: Maxim Hurwicz, Stanchfield, MN (US)

(72) Inventor: Maxim Hurwicz, Stanchfield, MN (US)

( * ) Notice: Subject to any disclaimer, the term of this patent is extended or adjusted under 35 U.S.C. 154(b) by 208 days.

(21) Appl. No.: 17/090,243

(22) Filed: Nov. 5, 2020

Related U.S. Application Data

(60) Provisional application No. 62/933,799, filed on Nov. 11, 2019.

(51) Int. Cl.
*A47J 47/20* (2019.01)
*A47J 45/02* (2006.01)
*A47L 13/51* (2006.01)

(52) U.S. Cl.
CPC .............. *A47J 47/20* (2013.01); *A47J 45/02* (2013.01); *A47L 13/51* (2013.01)

(58) Field of Classification Search
CPC ....................................................... A47J 47/20
USPC ....... 248/309.1, 310, 311.2, 316.7, 210, 315, 248/318, 312
See application file for complete search history.

(56) References Cited

U.S. PATENT DOCUMENTS

| | | | | |
|---|---|---|---|---|
| 1,112,744 | A | * 10/1914 | Weh ......................... | A47J 43/22 248/312.1 |
| 1,981,389 | A | * 11/1934 | Roberts ..................... | A47K 5/05 248/316.5 |
| 6,062,397 | A | * 5/2000 | Licari ....................... | A47J 47/20 D32/55 |
| 6,619,604 | B1 | * 9/2003 | Stillman ................... | A47J 45/02 248/205.5 |
| 8,684,192 | B1 | * 4/2014 | Margolin ................. | A47J 47/20 211/41.3 |
| 9,808,123 | B1 | * 11/2017 | Brinkmann ........... | F16M 13/022 |
| 2015/0122961 | A1 | * 5/2015 | Batiste ..................... | A47L 13/51 248/316.1 |
| 2021/0076897 | A1 | * 3/2021 | Eifes ......................... | A47K 5/02 |

FOREIGN PATENT DOCUMENTS

WO    WO-2017141234 A1 * 8/2017 ............. A47G 29/08

* cited by examiner

*Primary Examiner* — Lori L Baker
(74) *Attorney, Agent, or Firm* — Sherrill Law Offices, PLLC

(57) ABSTRACT

A holder for supporting a cleaning utensil. One end of the holder is configured for attachment to a horizontal surface adjacent to the vertical sink wall. The other end can be cantilevered over the sink basin and configured to receive a utensil. The holder can swivel to reposition the cantilevered end of the holder.

15 Claims, 59 Drawing Sheets

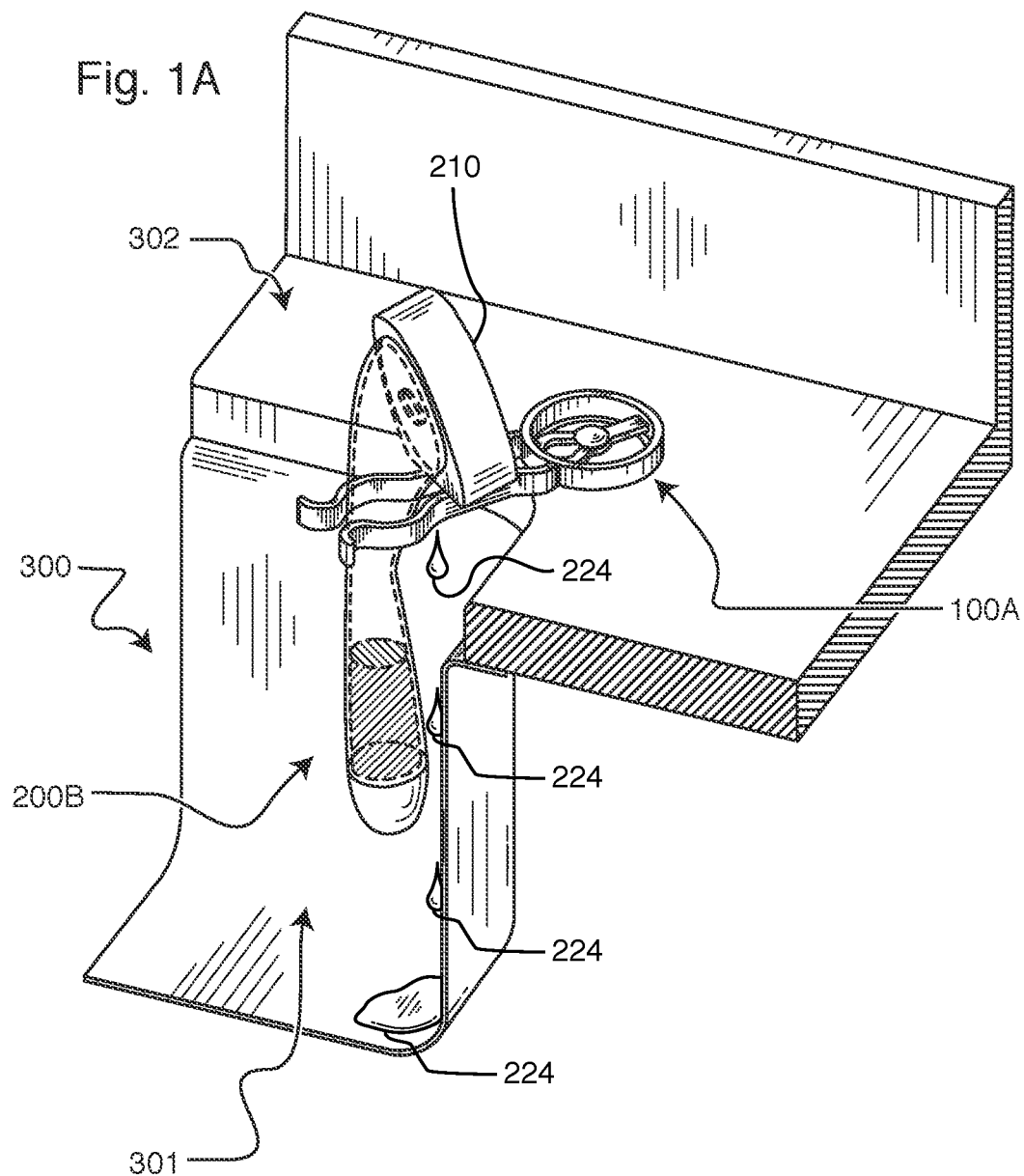

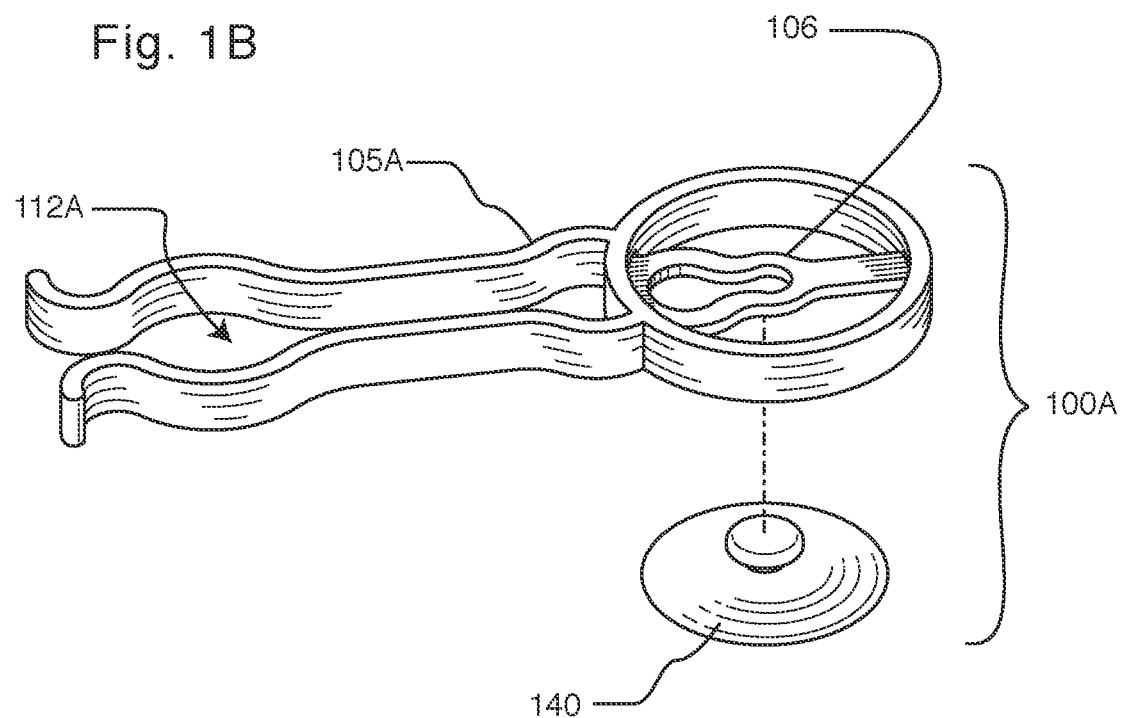

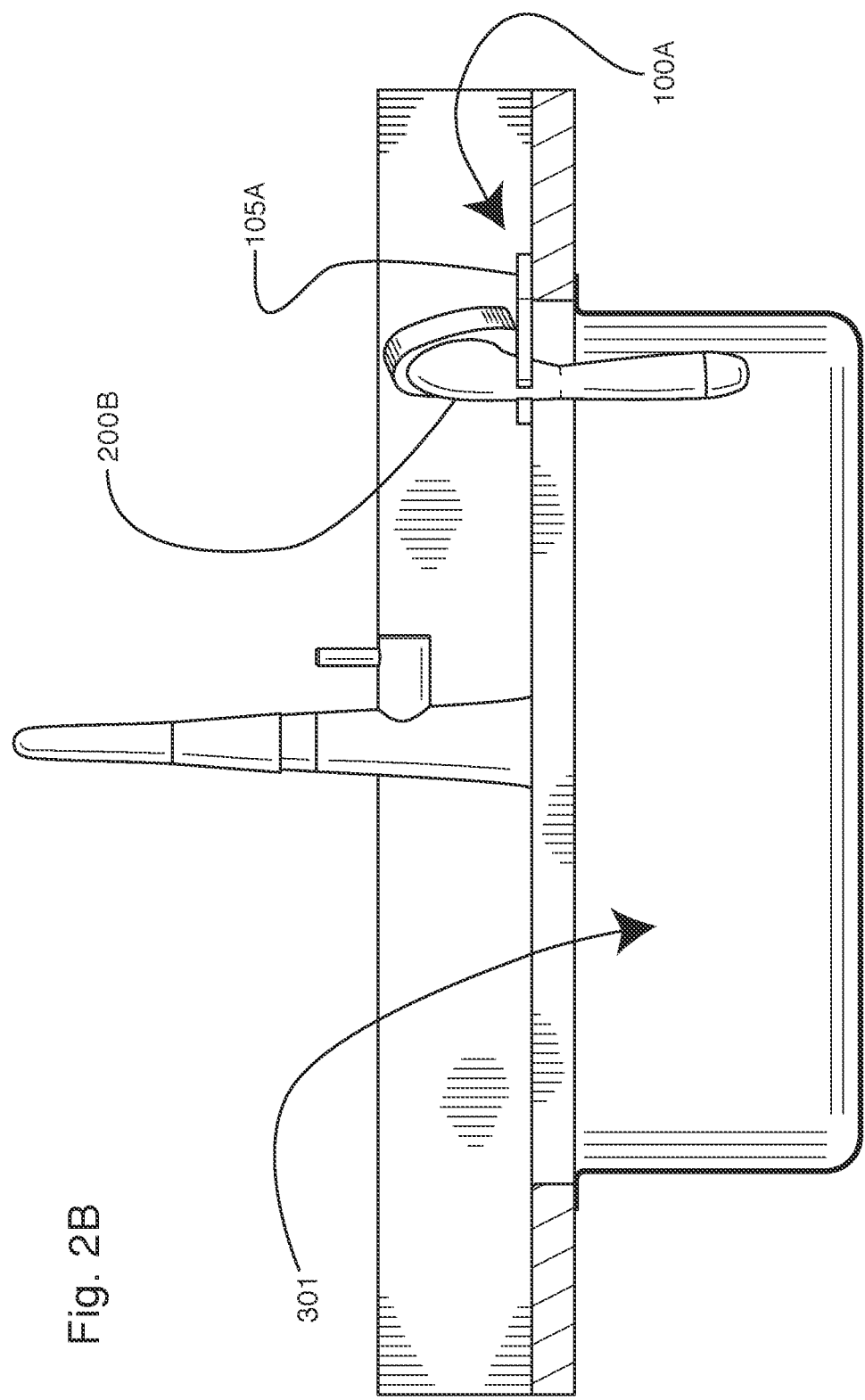

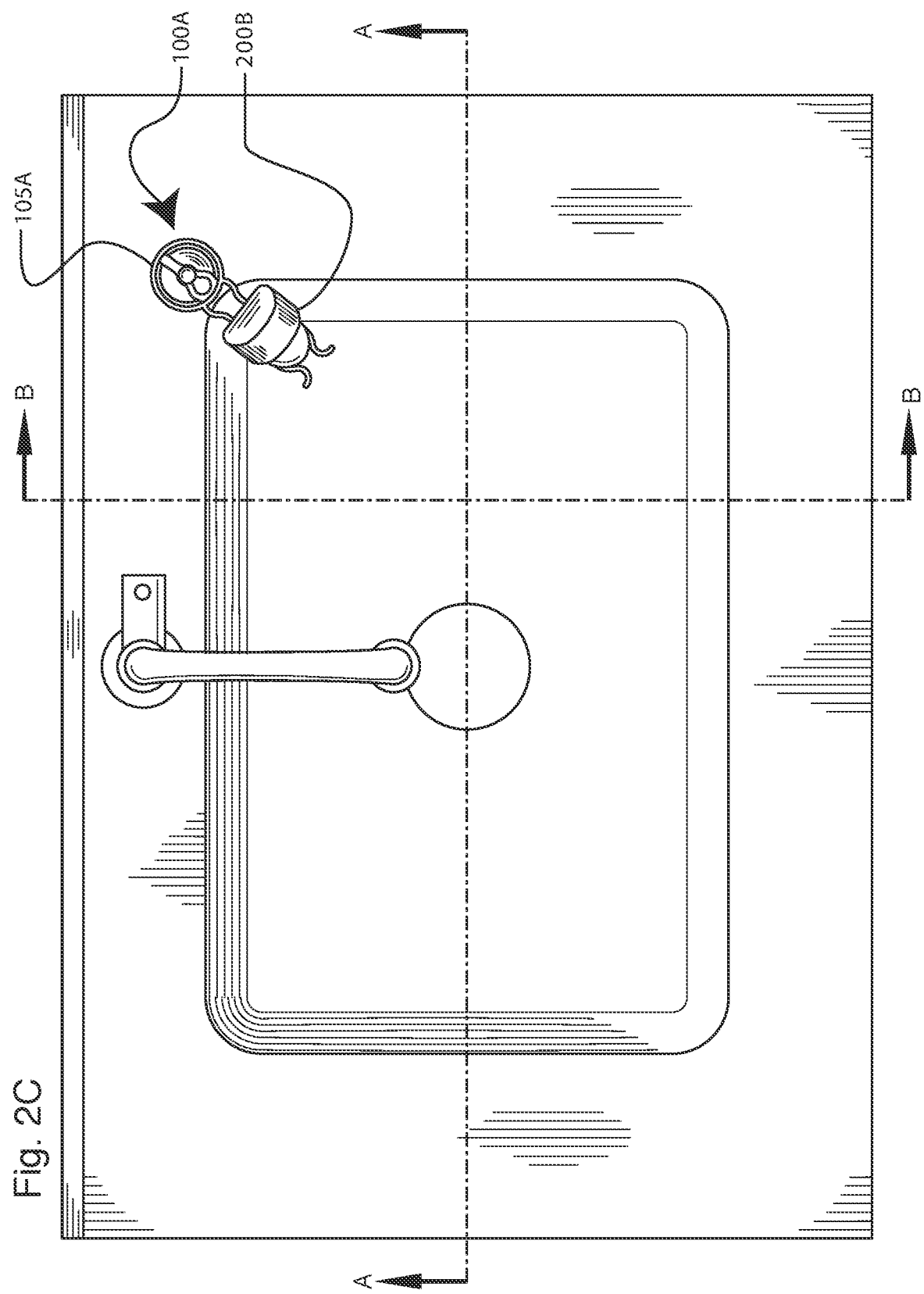

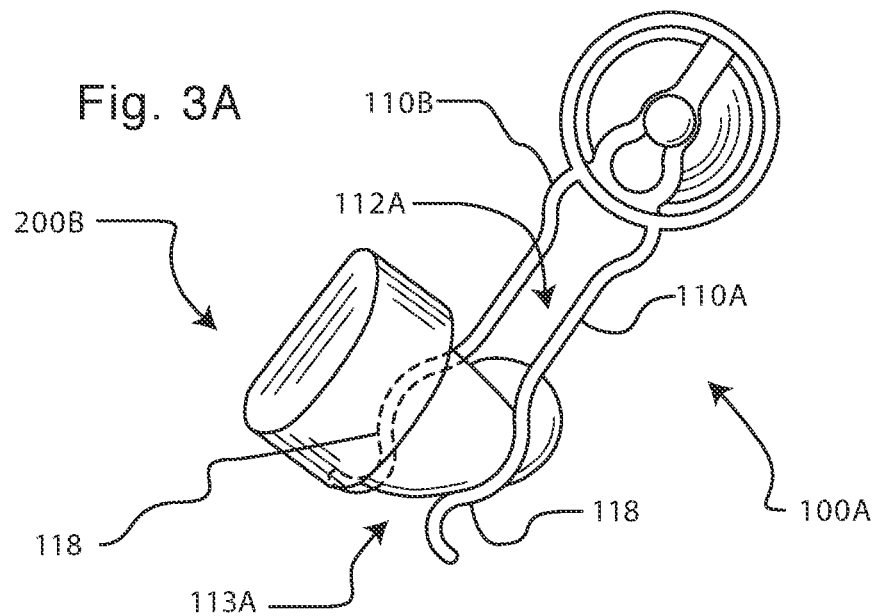
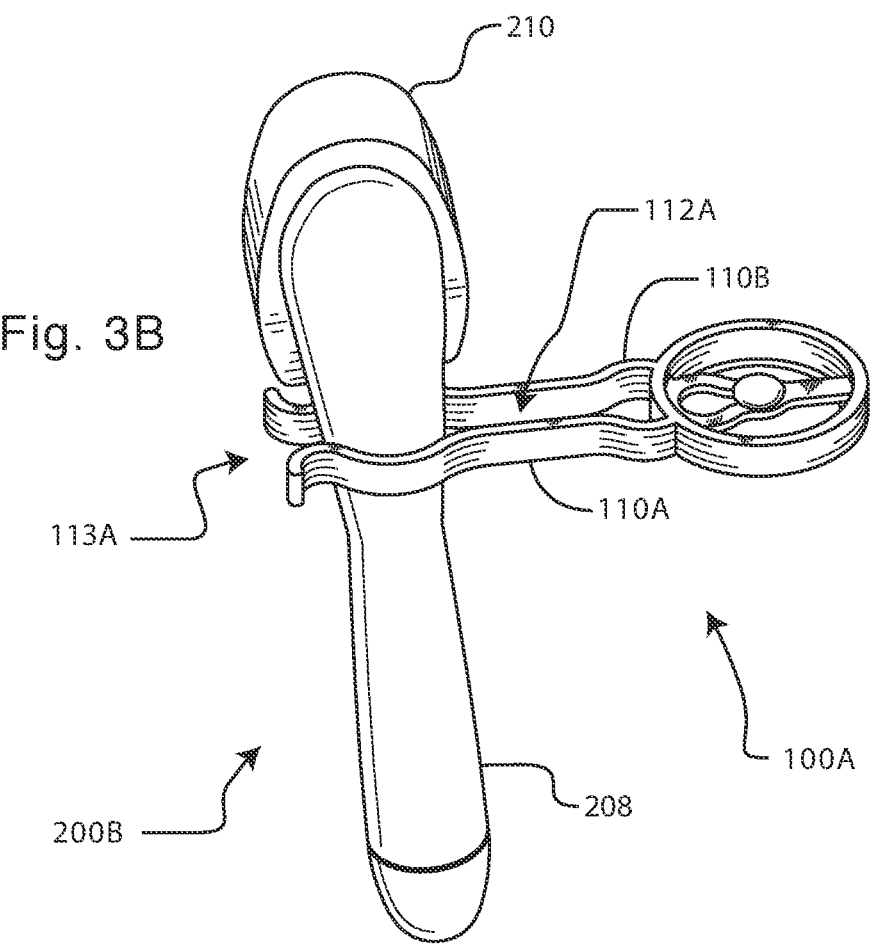

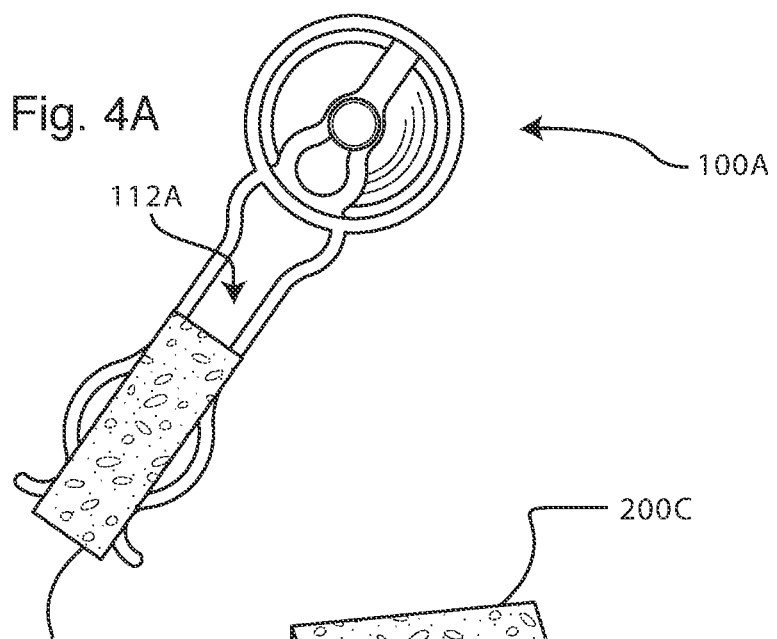
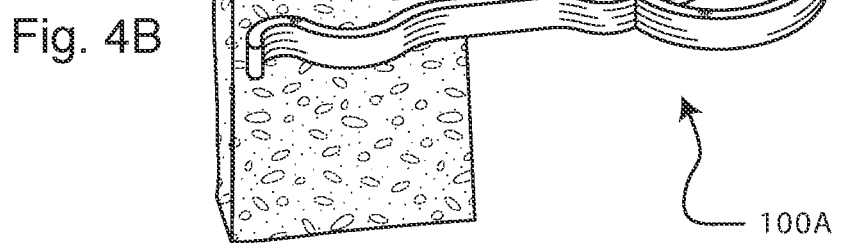
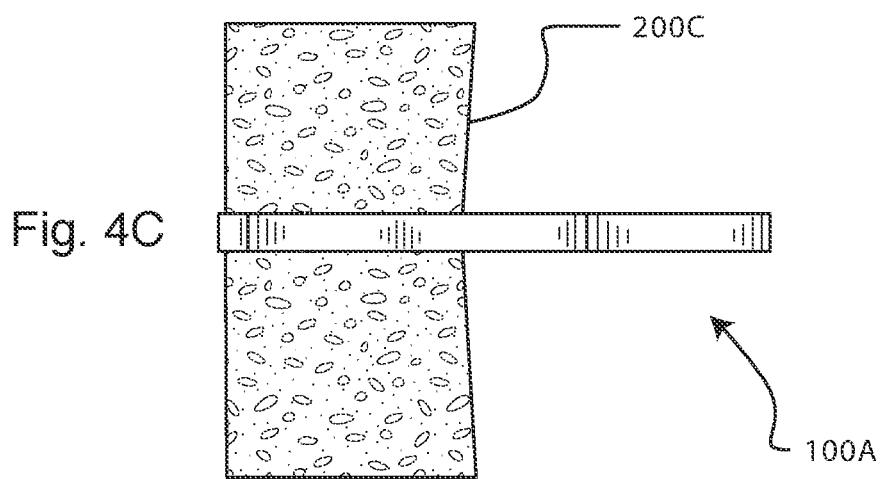

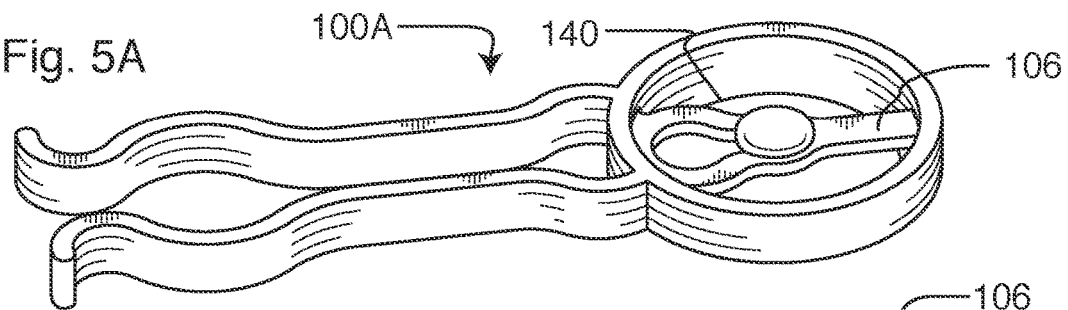
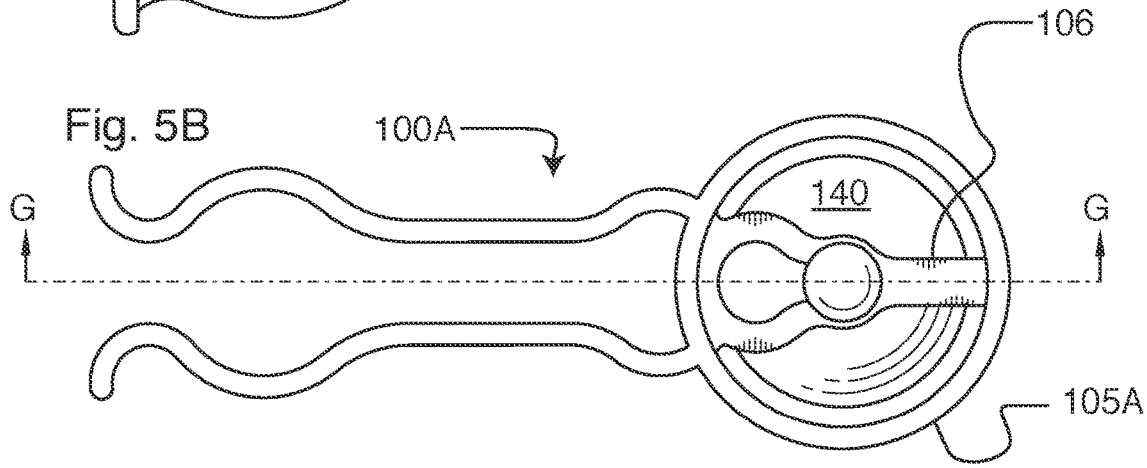
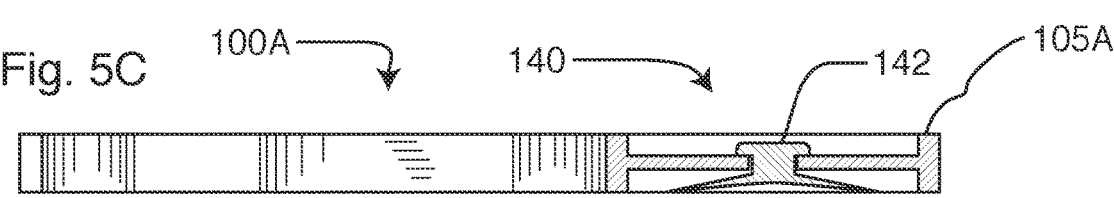
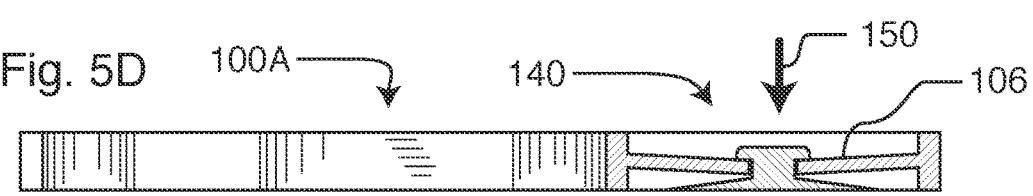
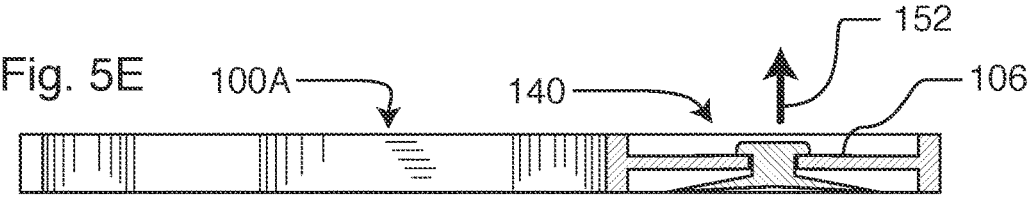
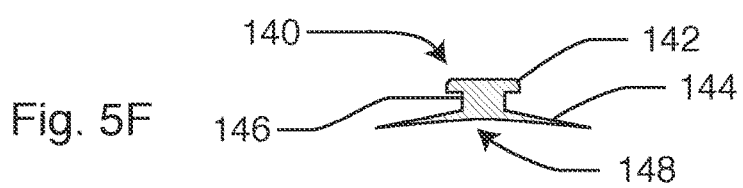

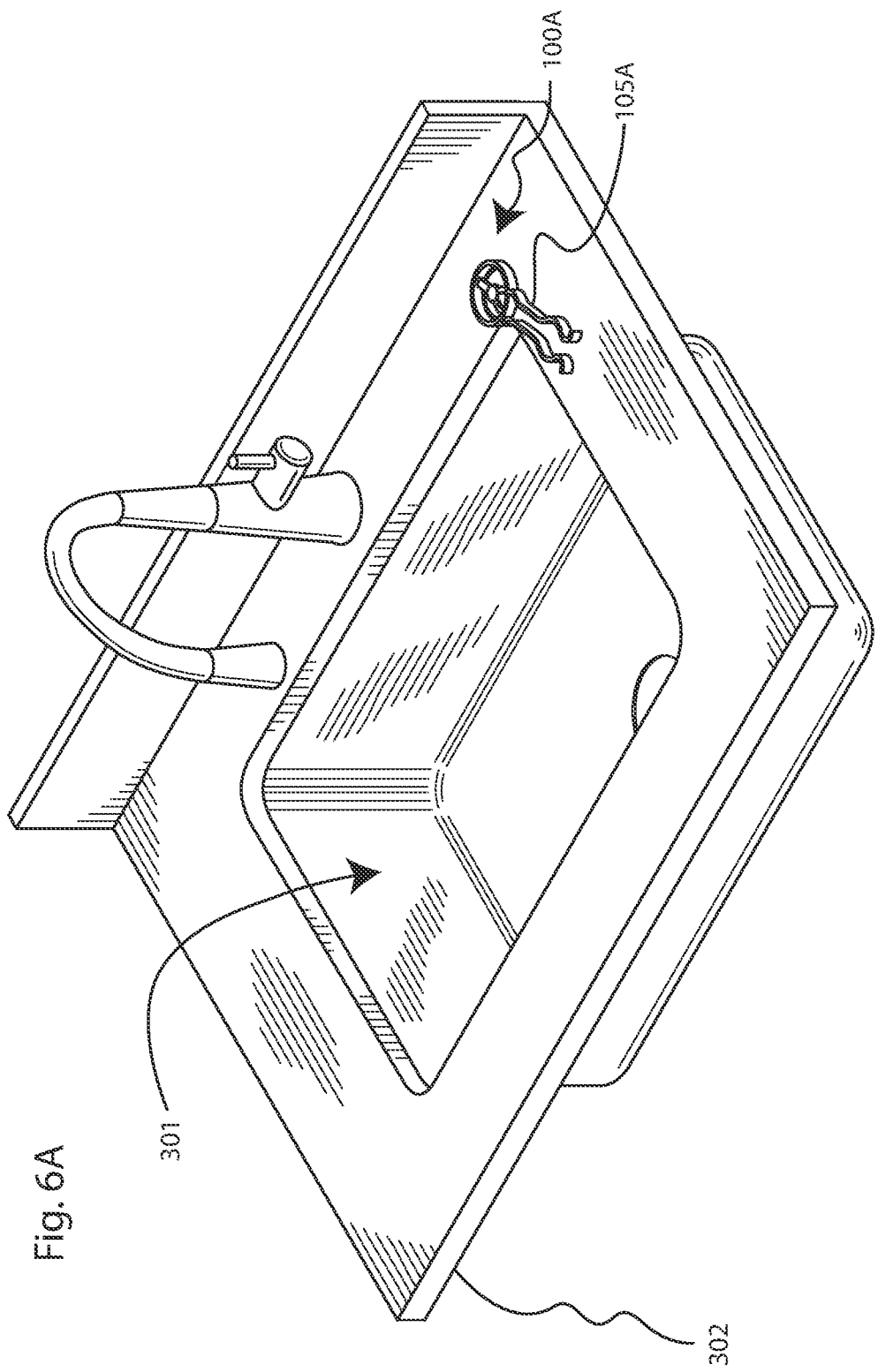

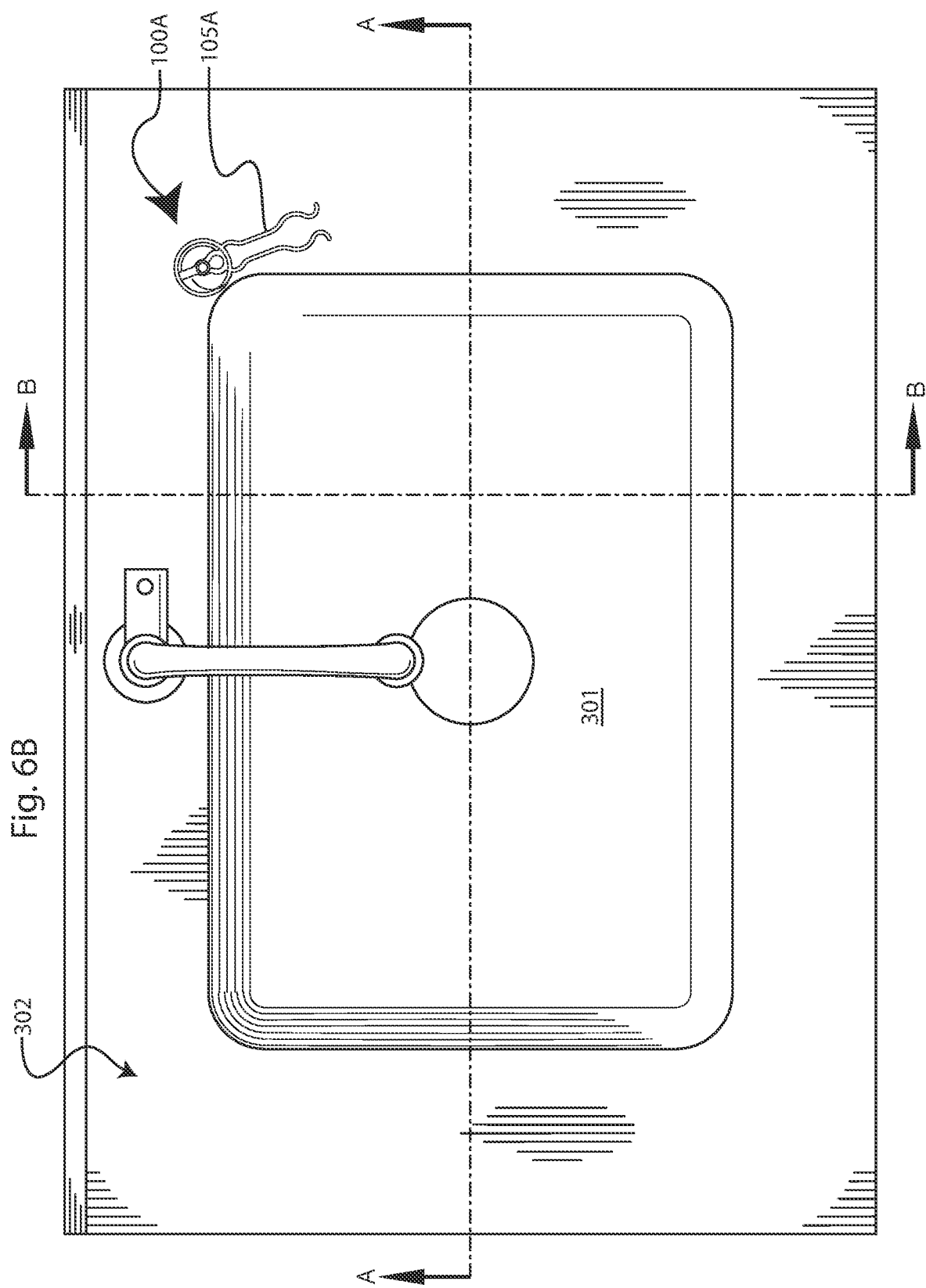

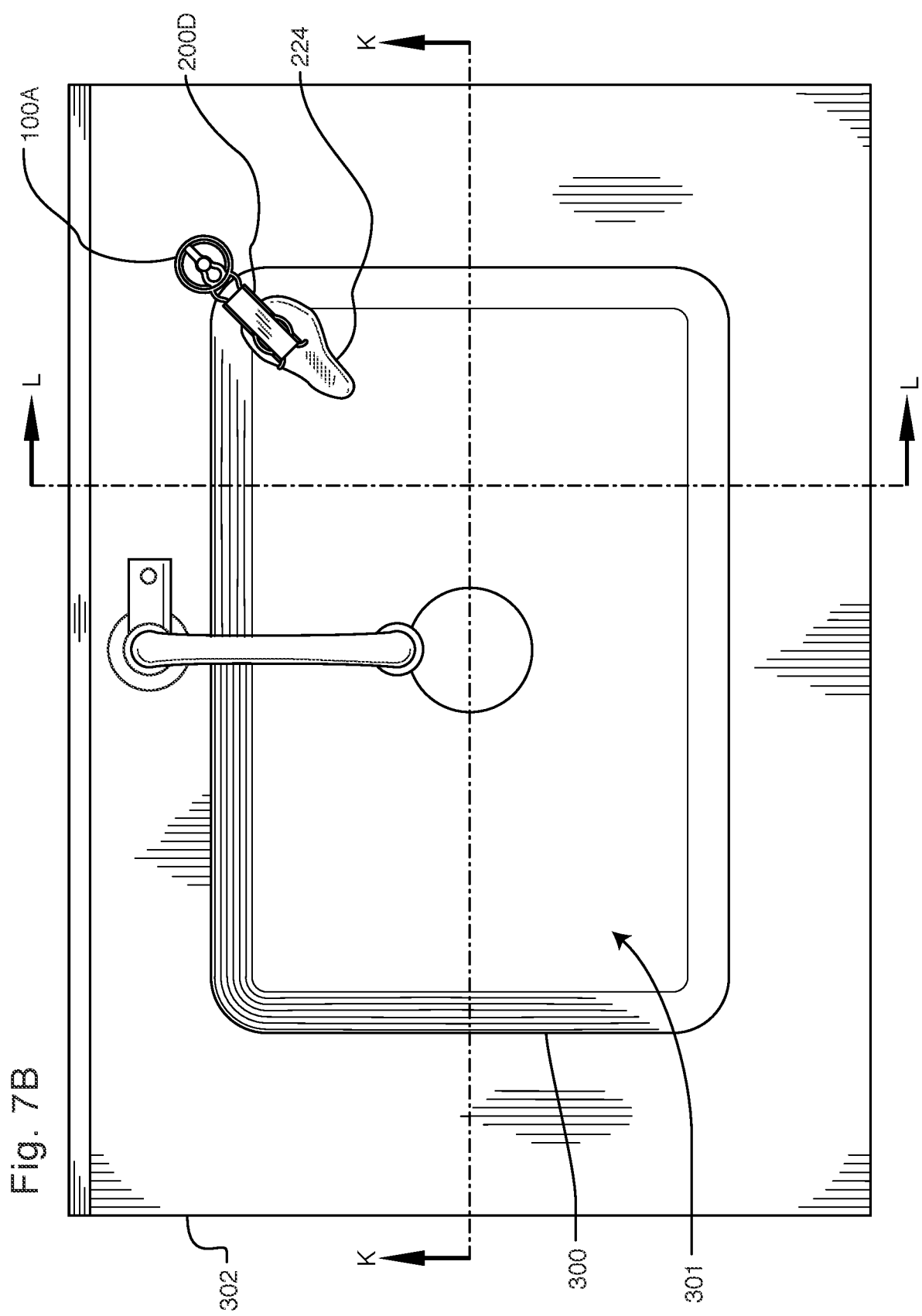

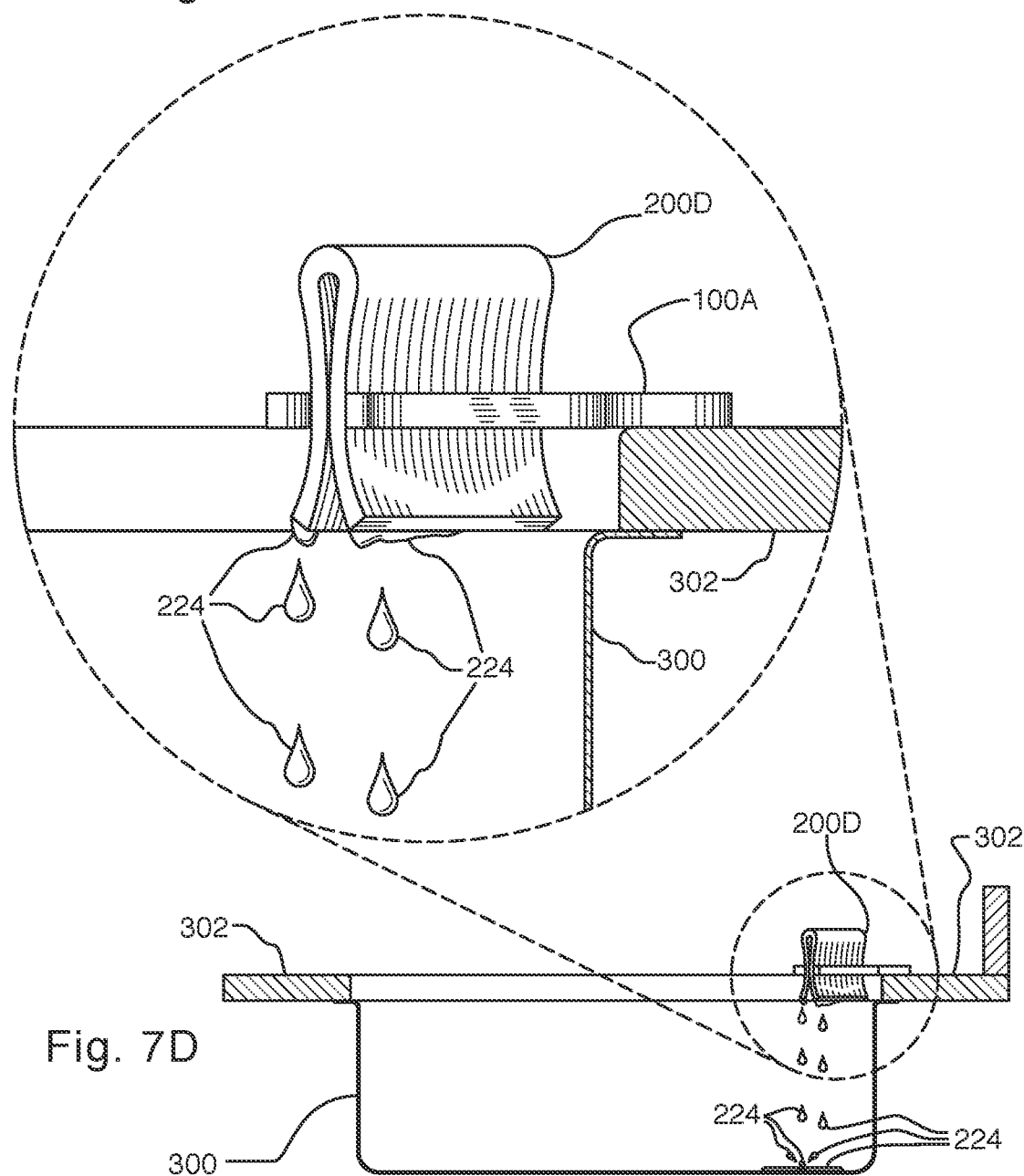

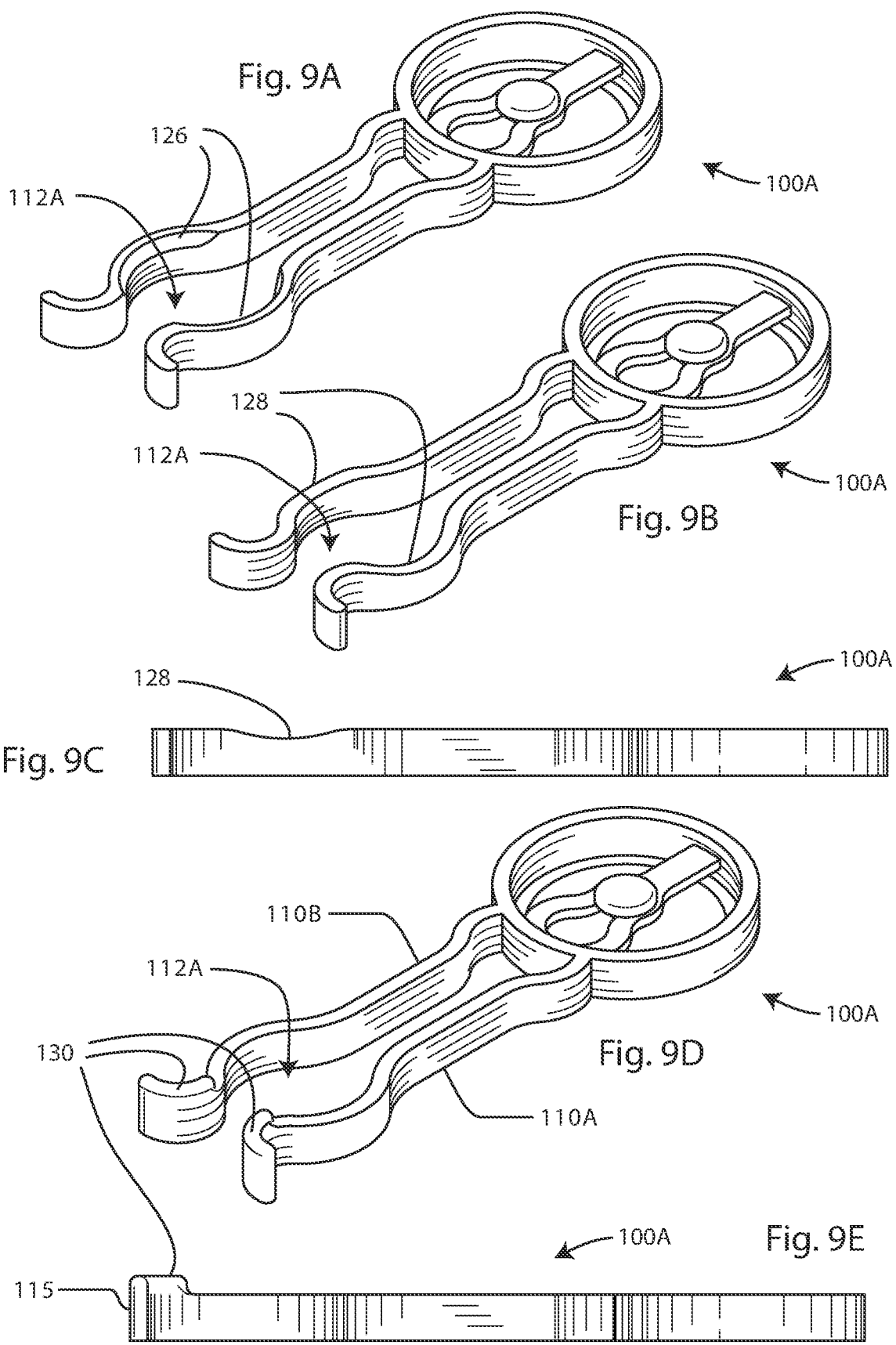

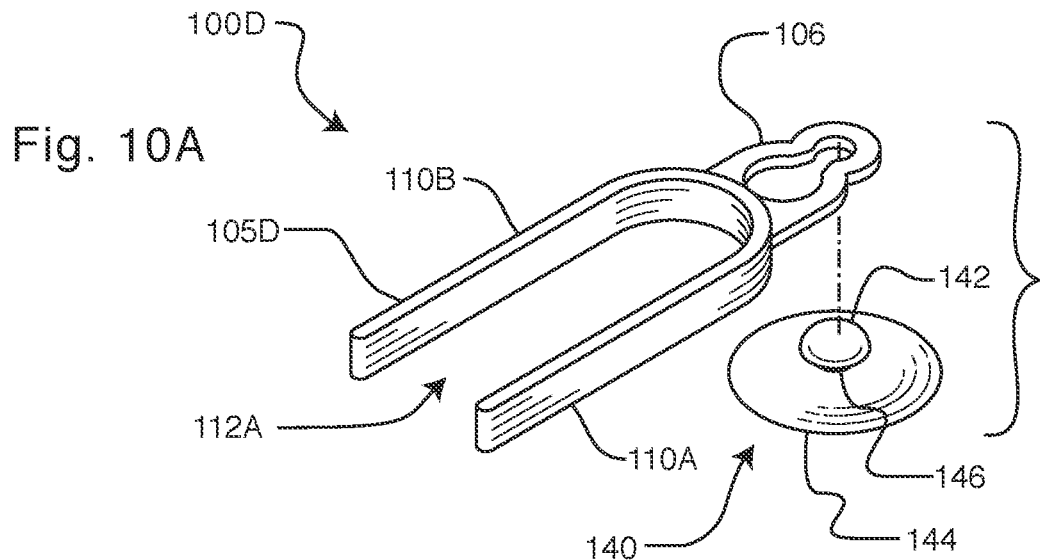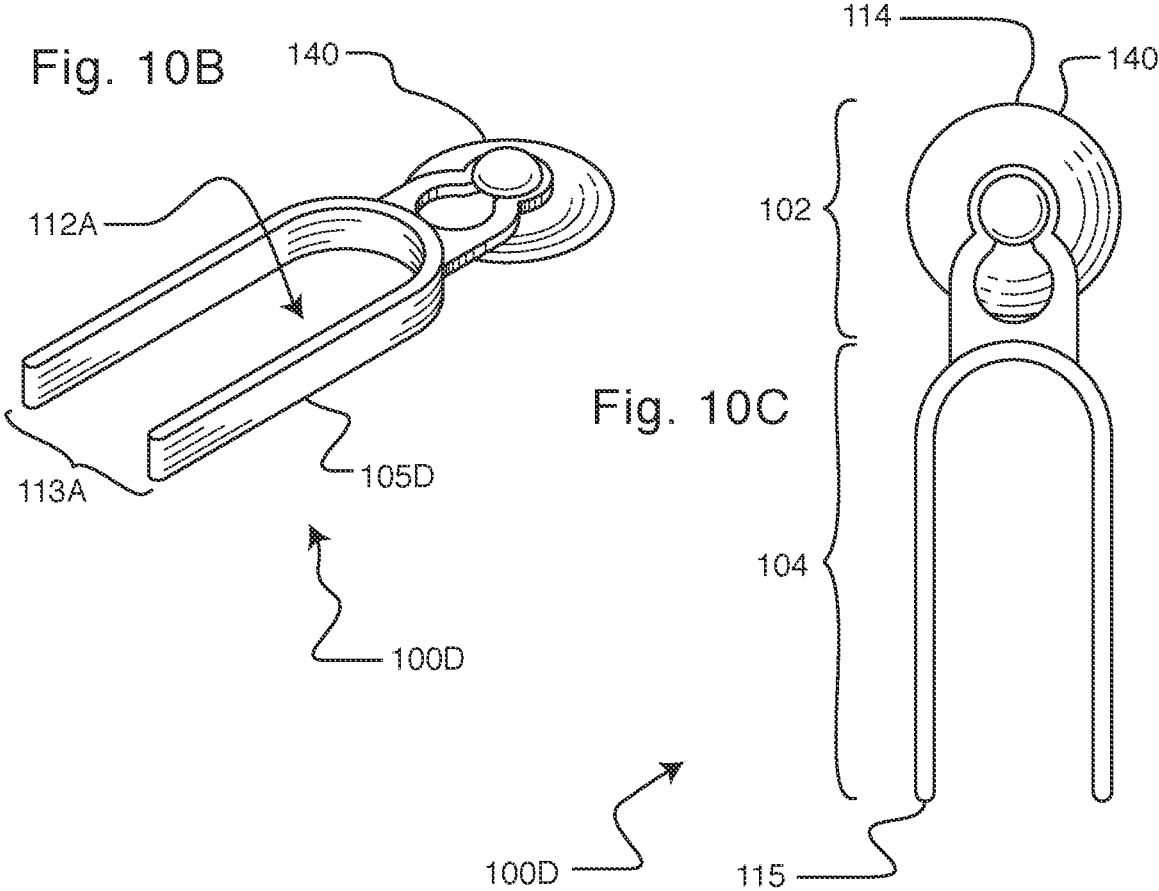

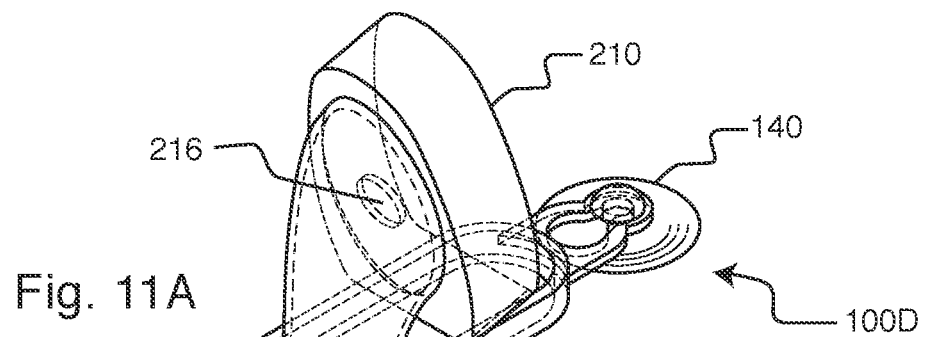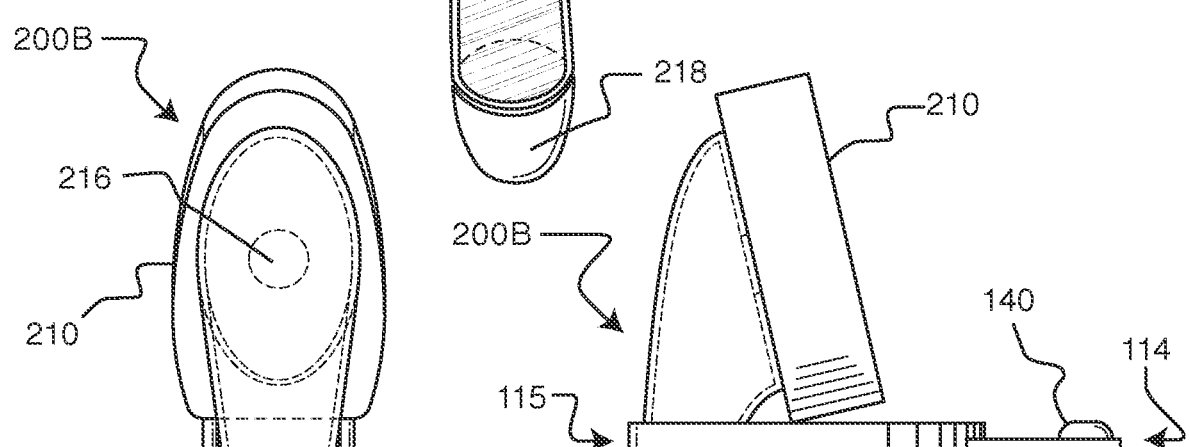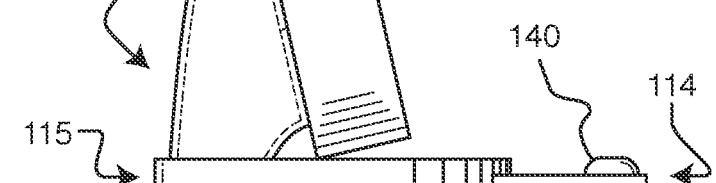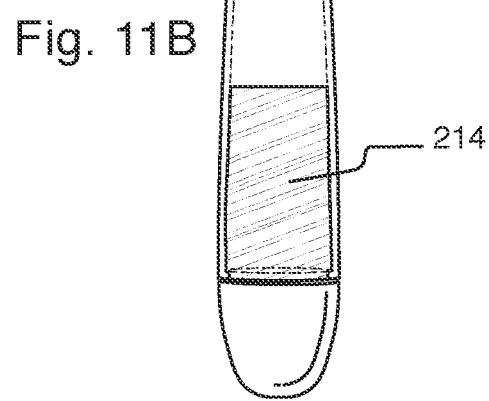

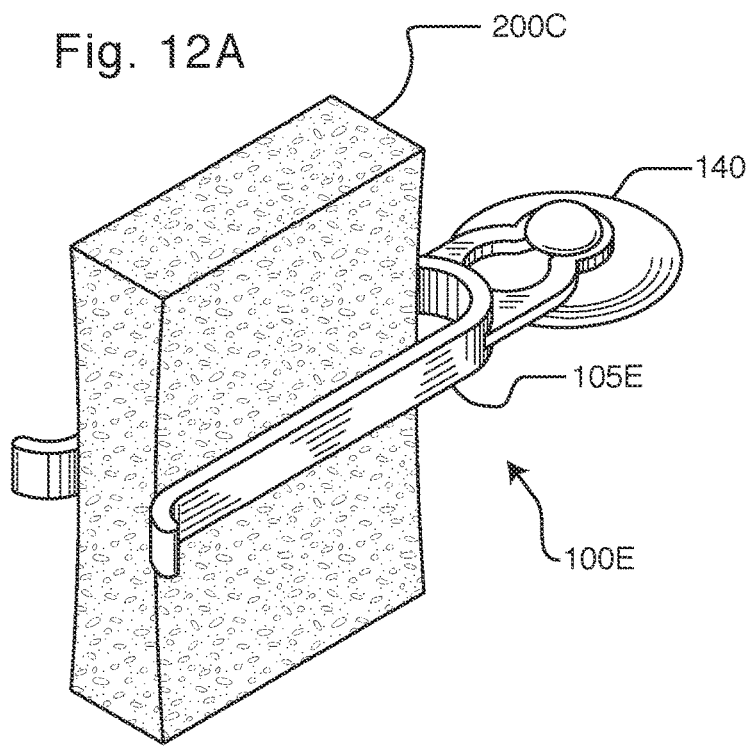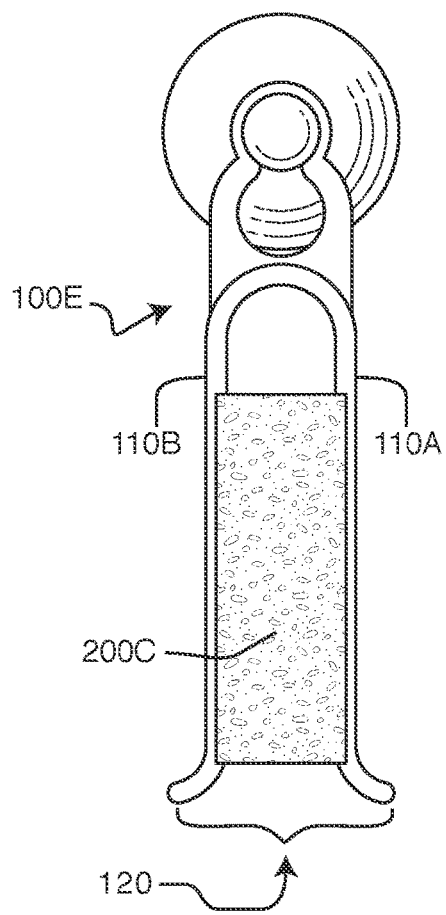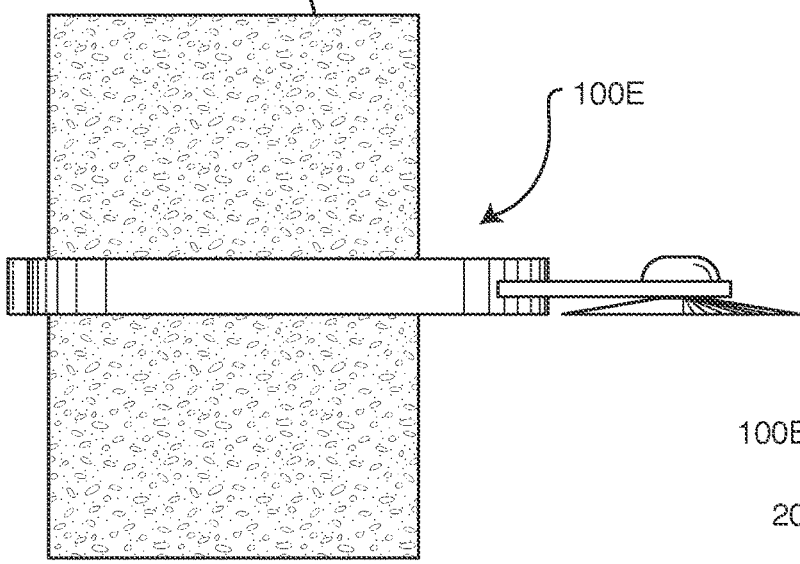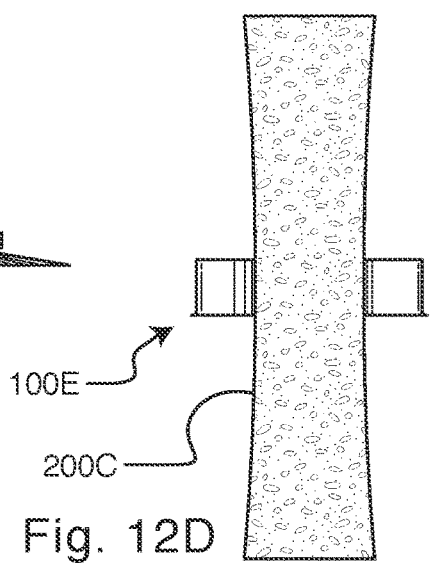

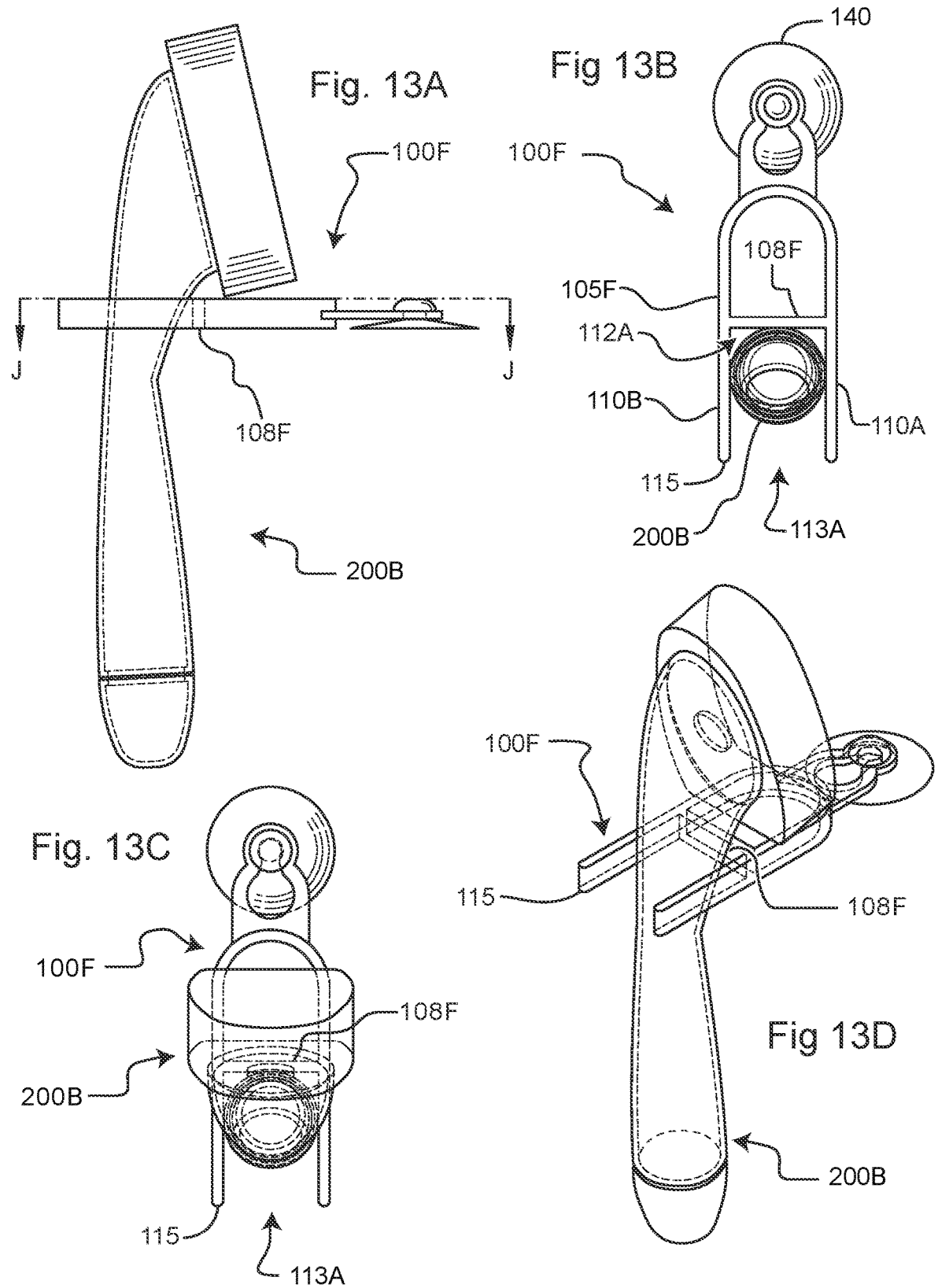

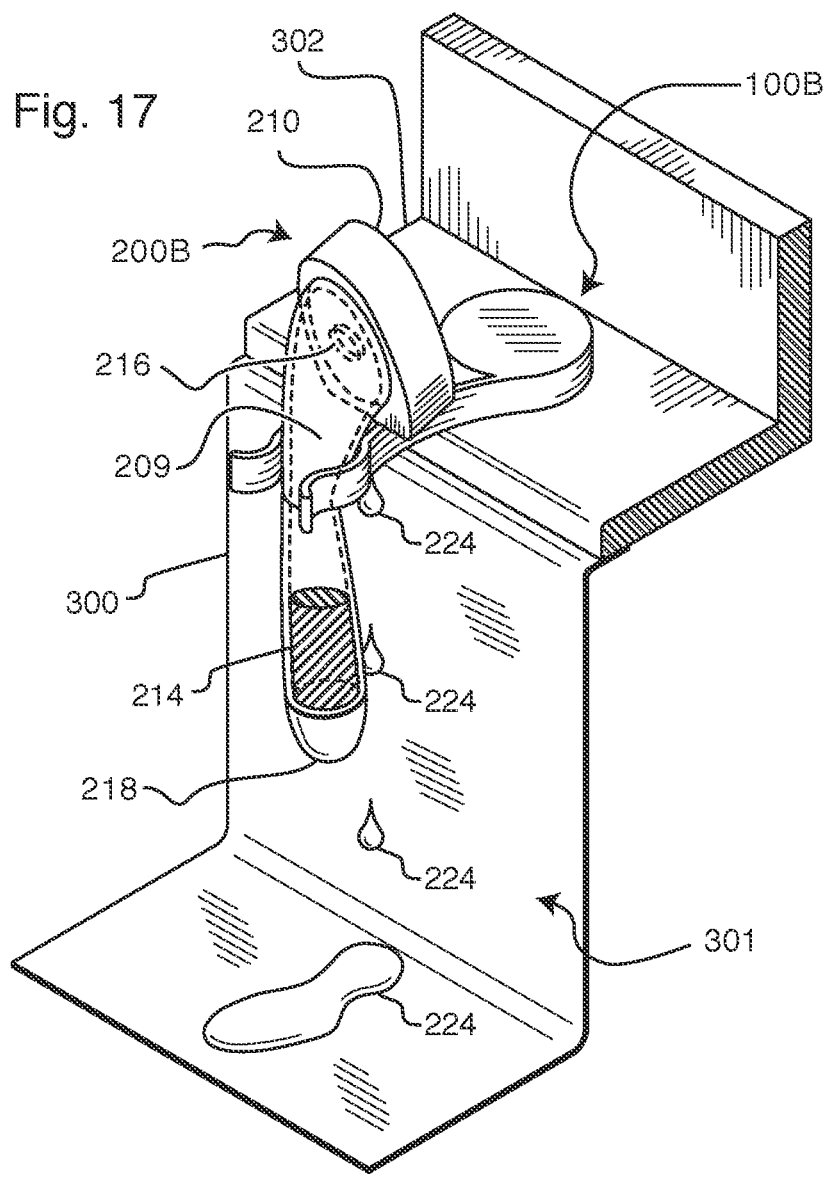

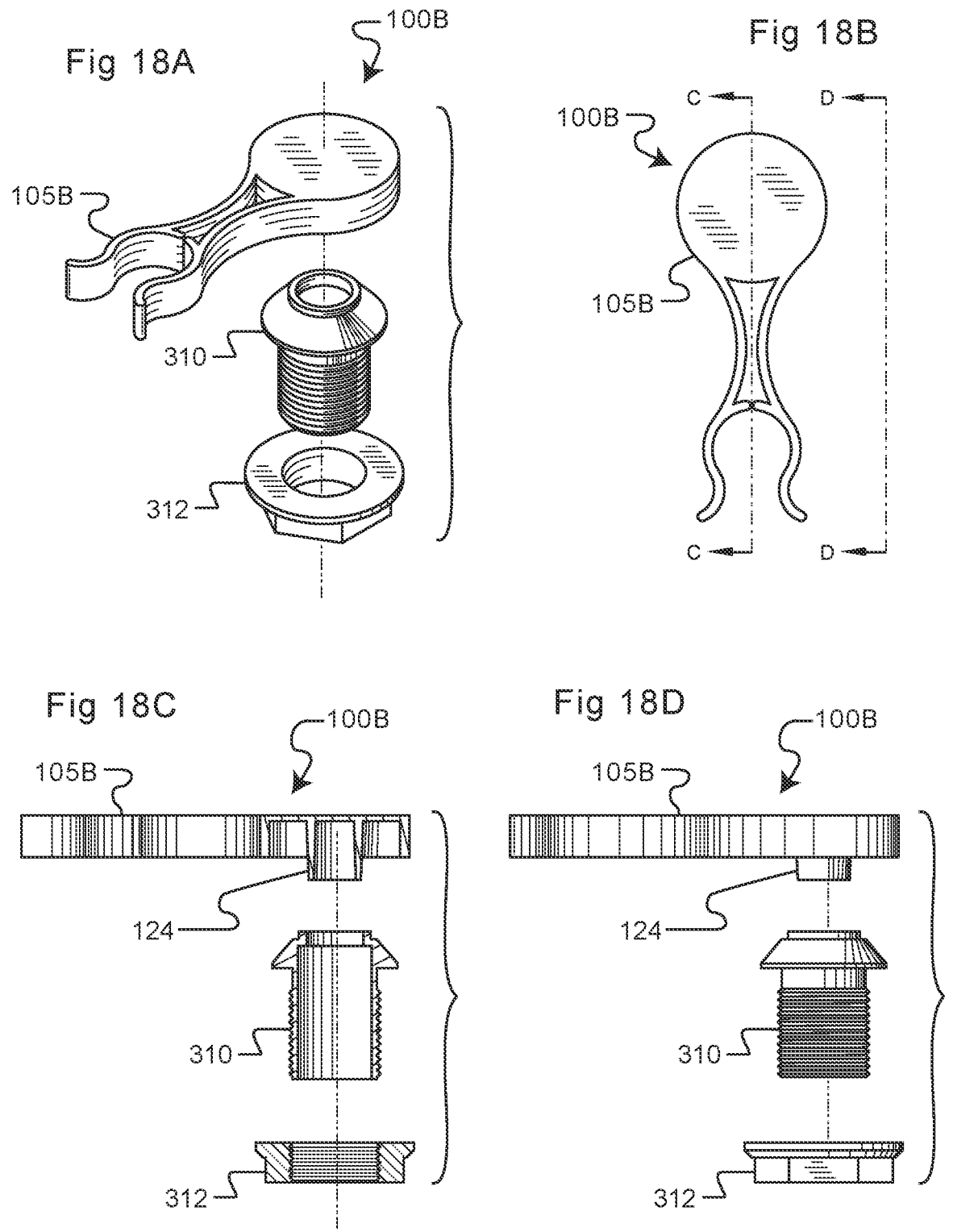

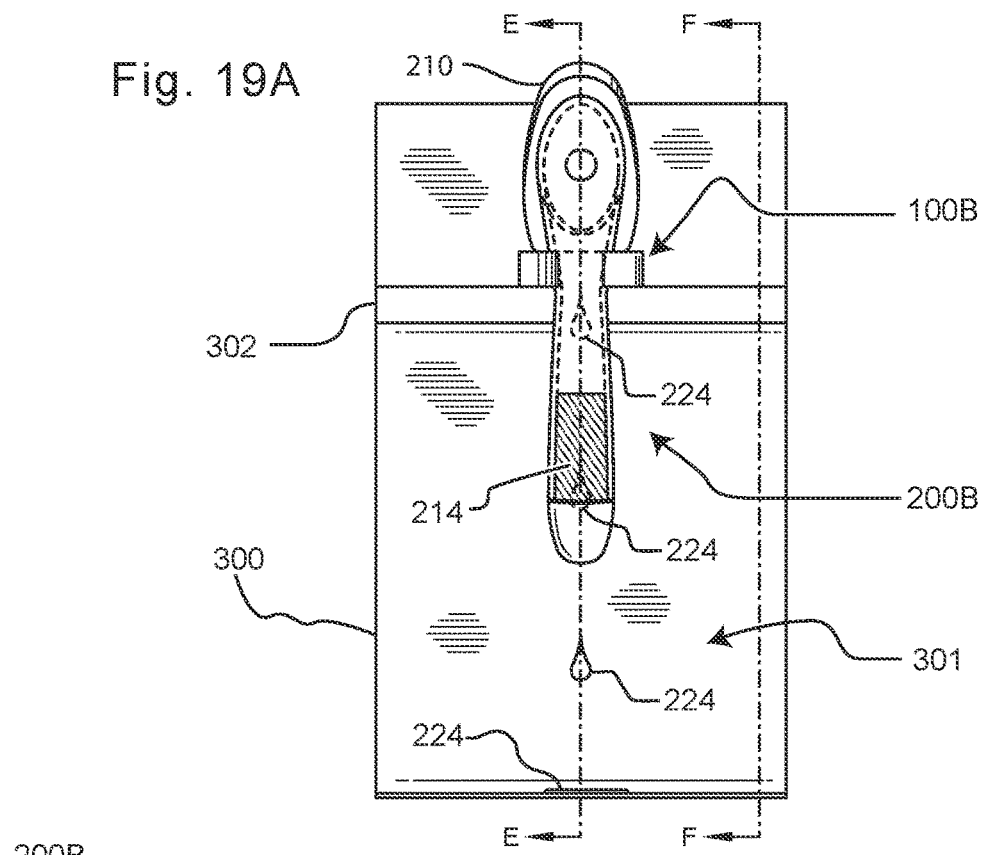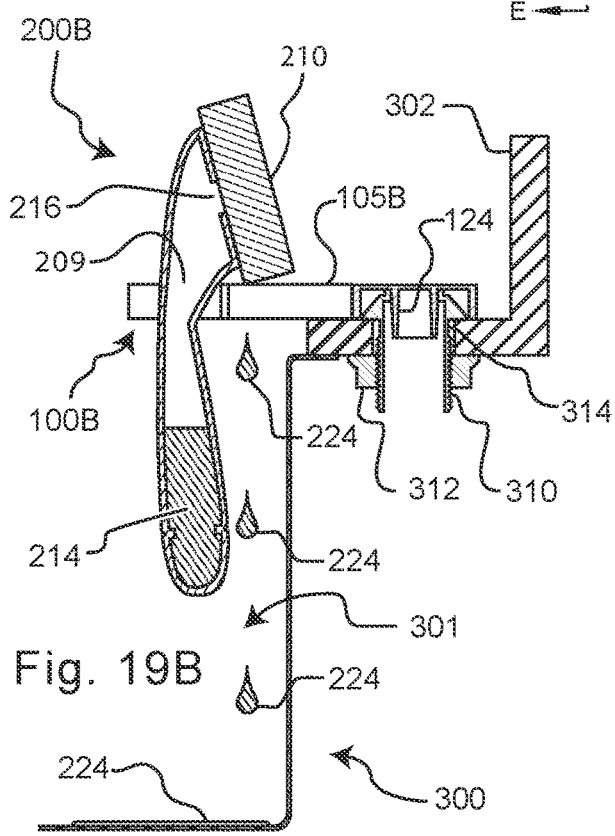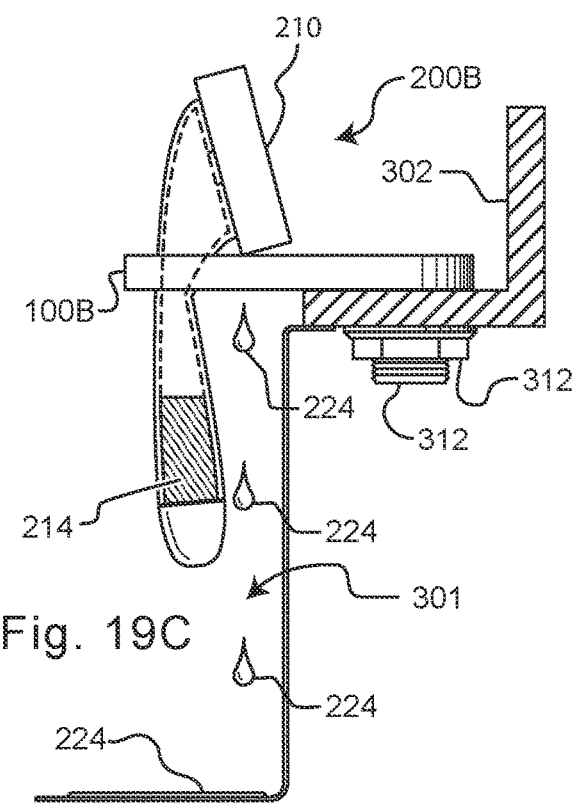

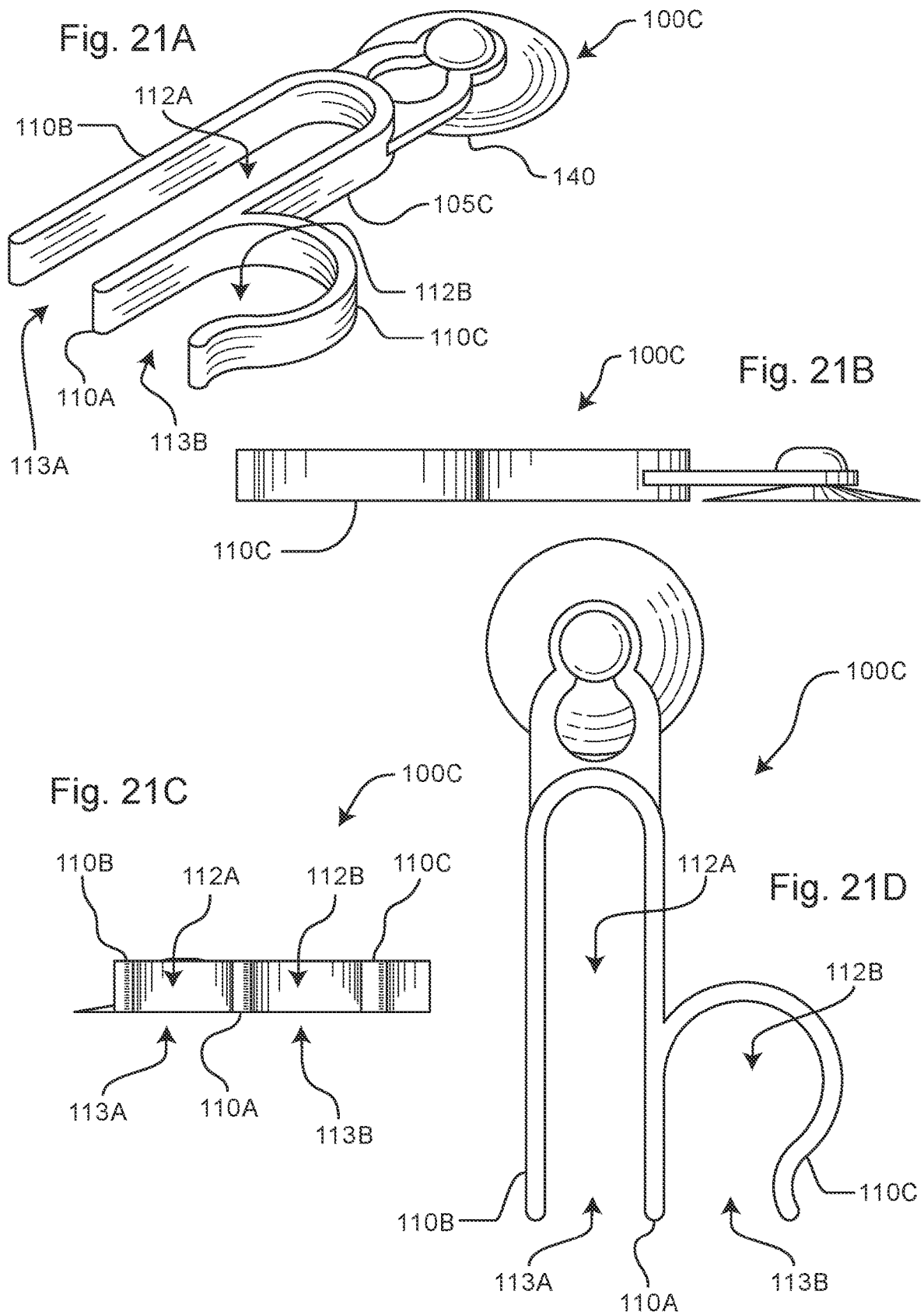

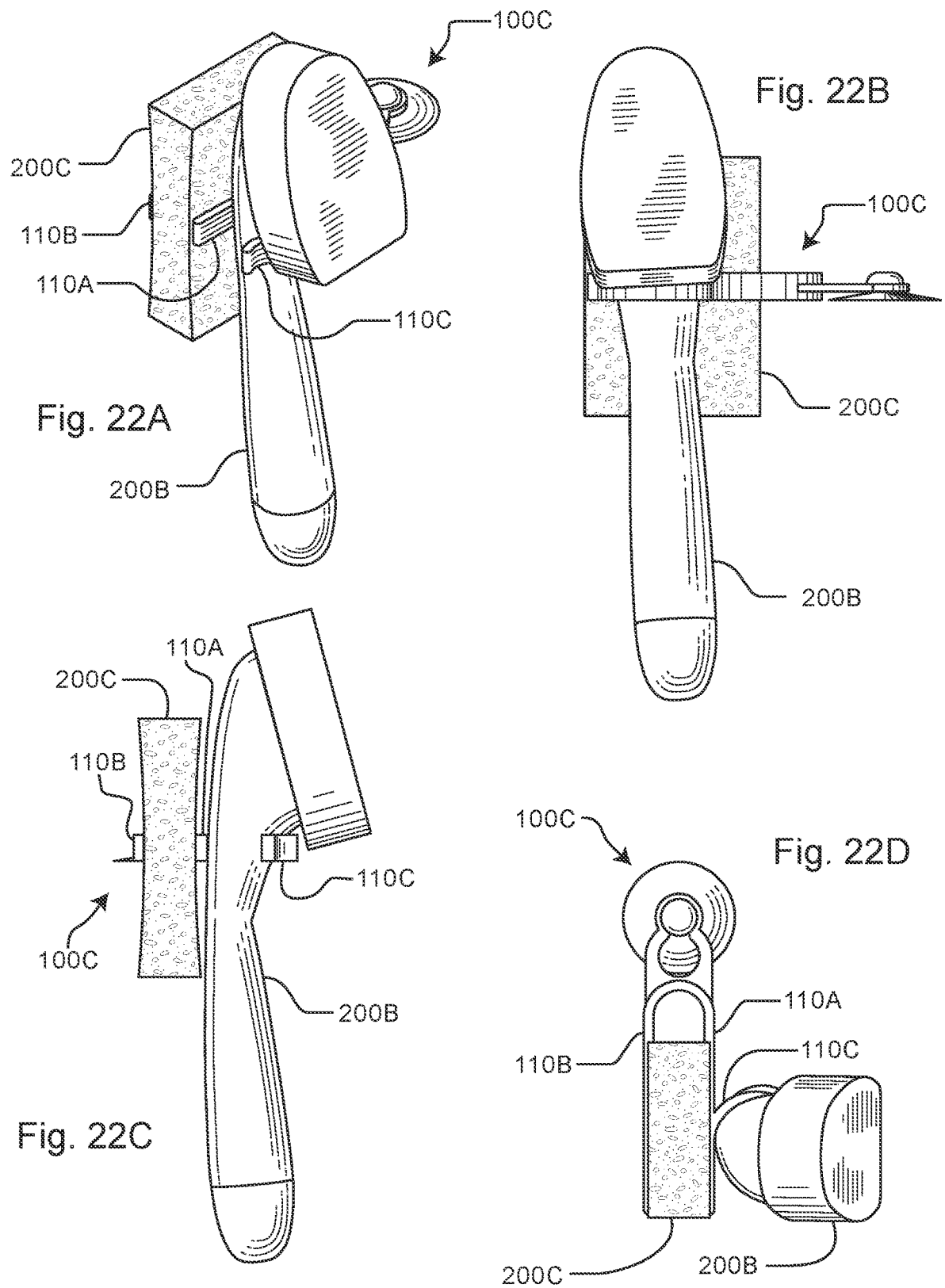

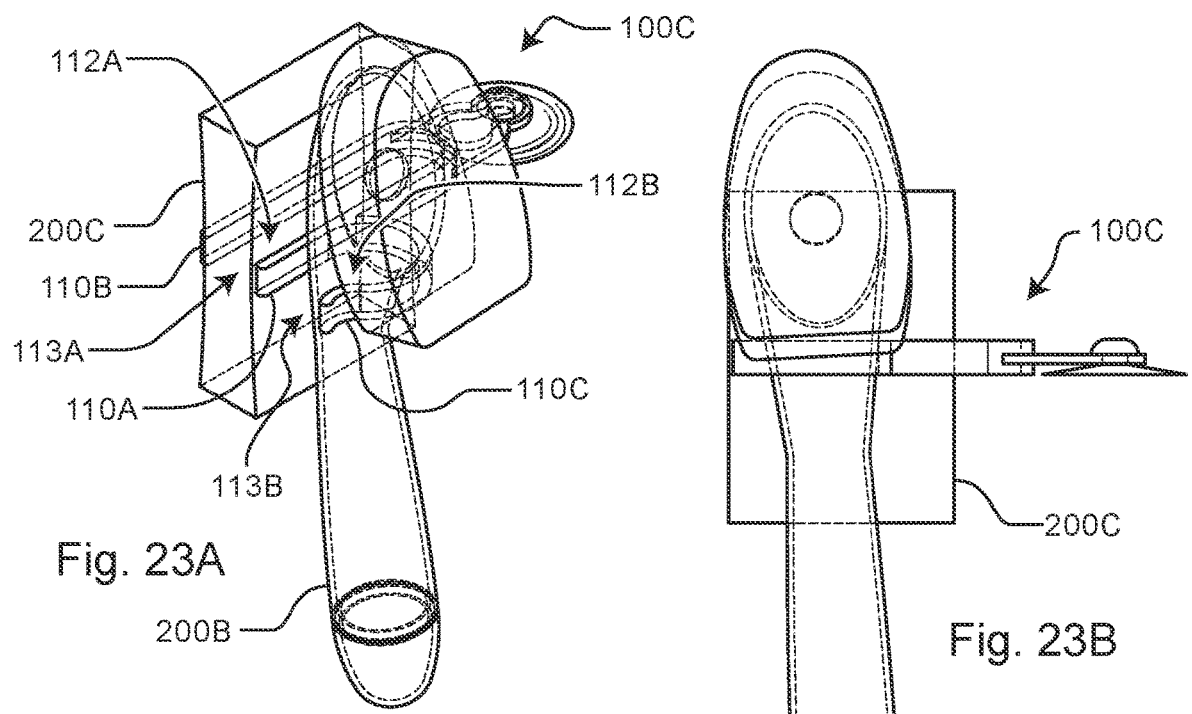
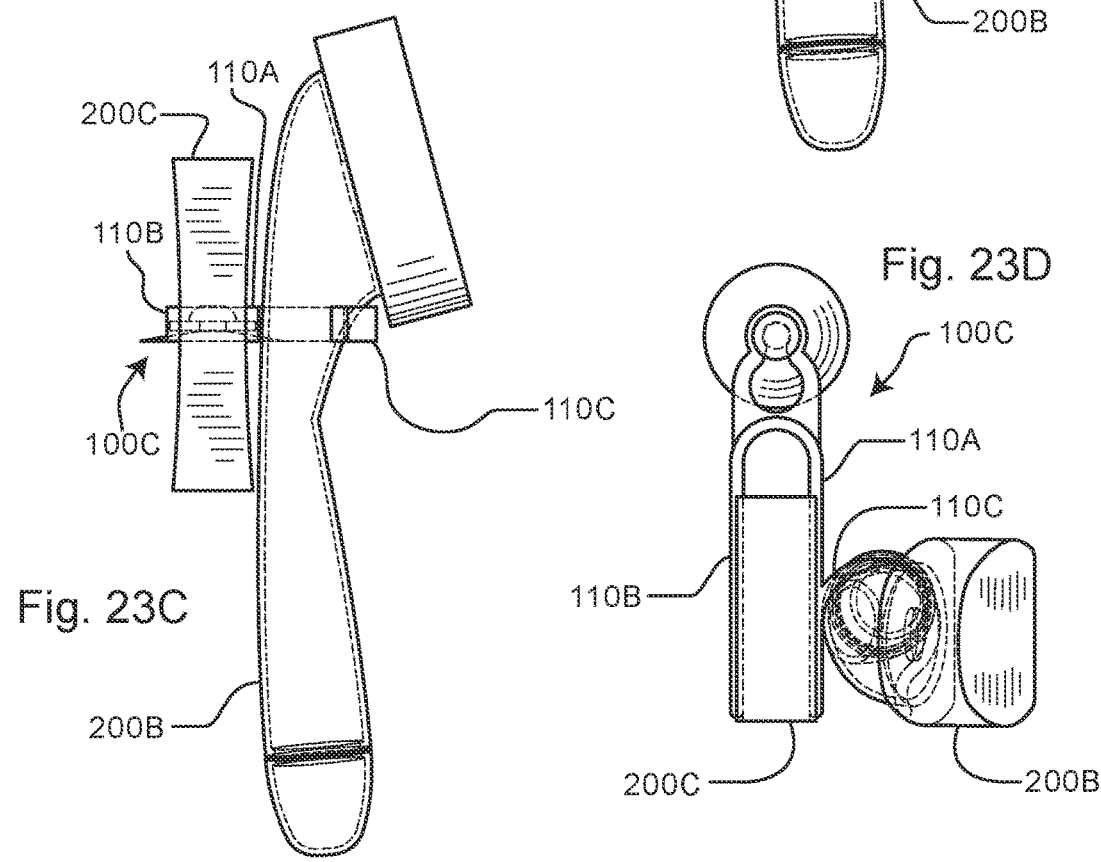

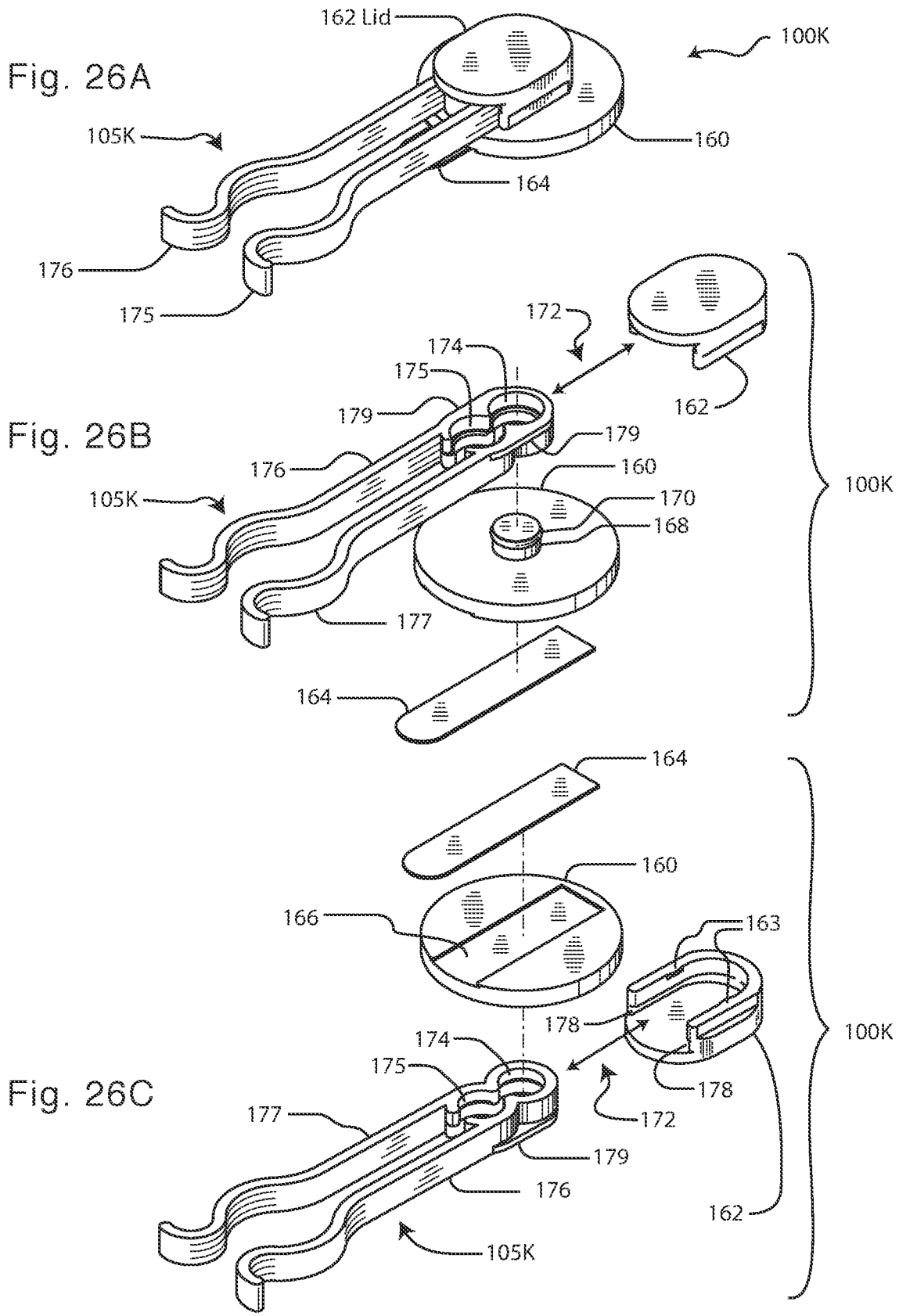

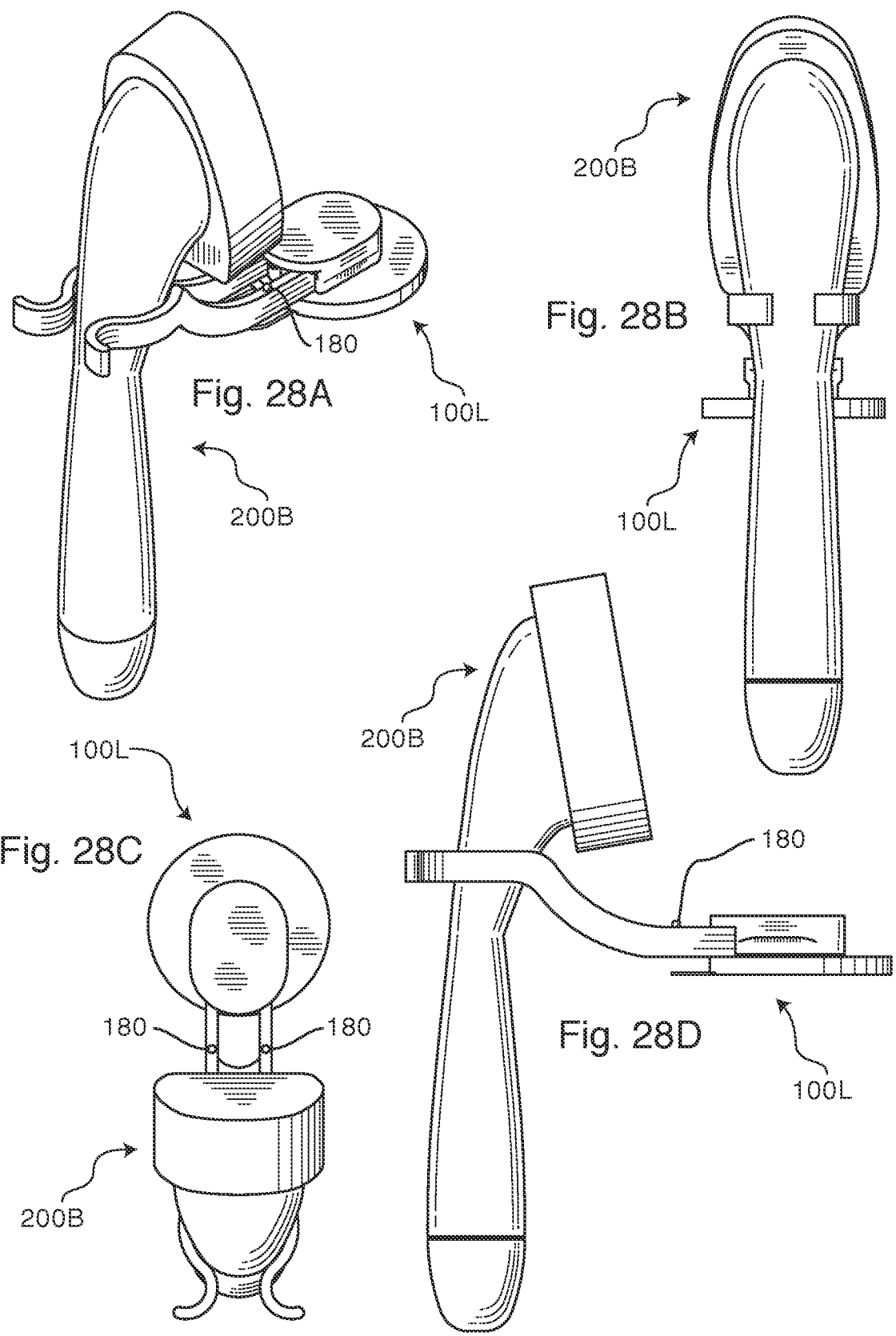

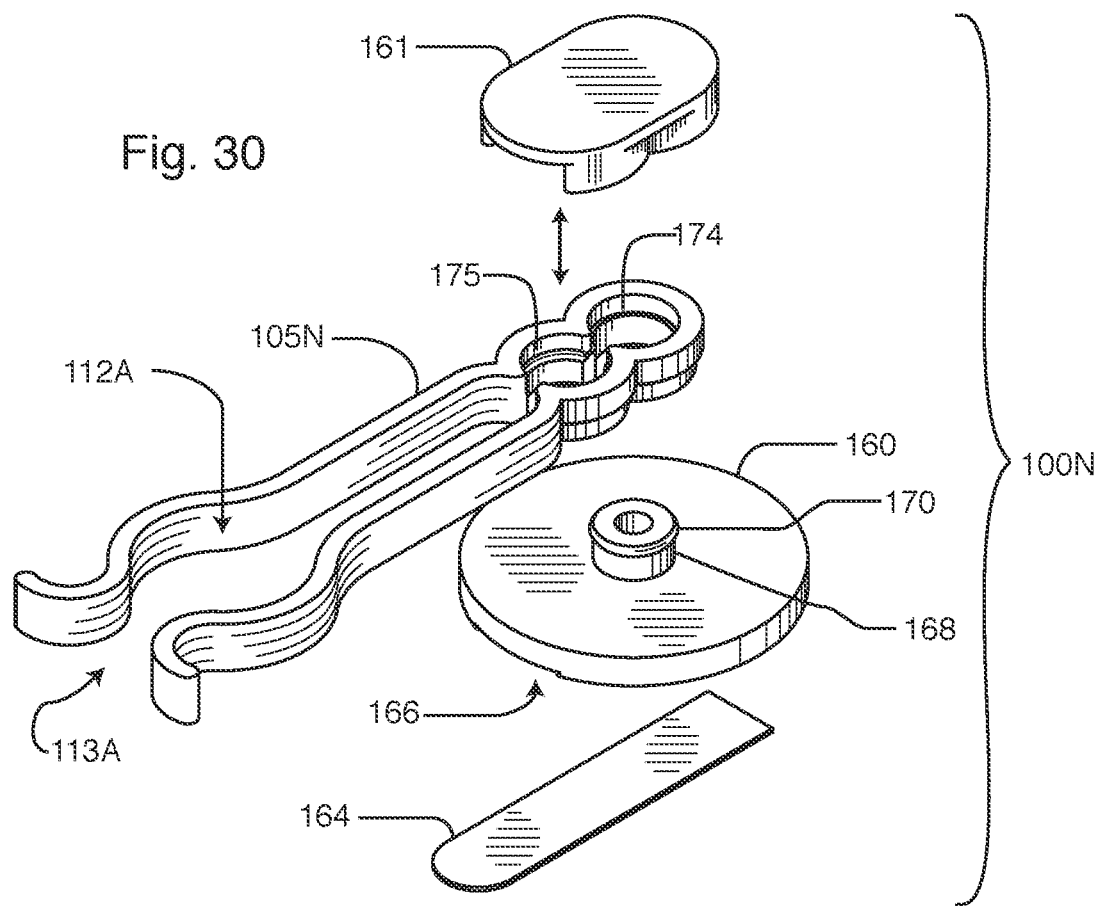

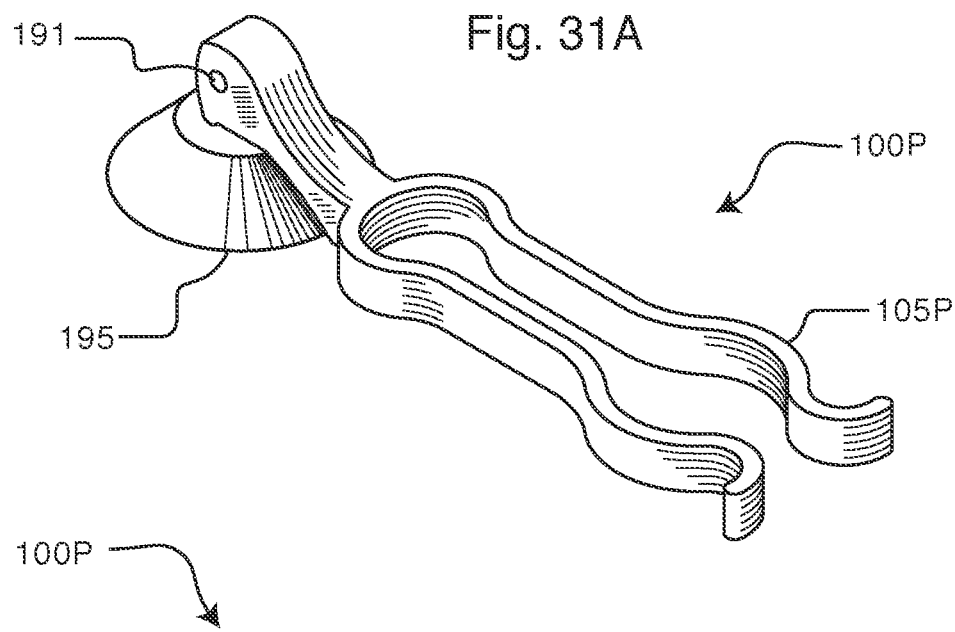
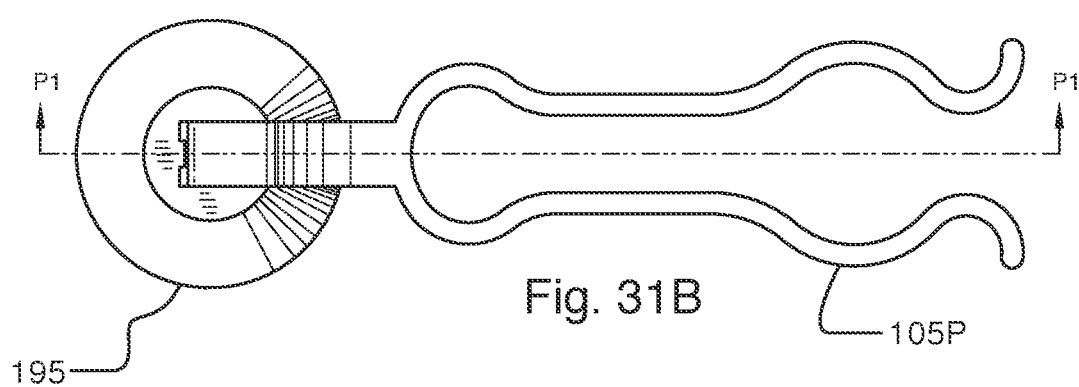
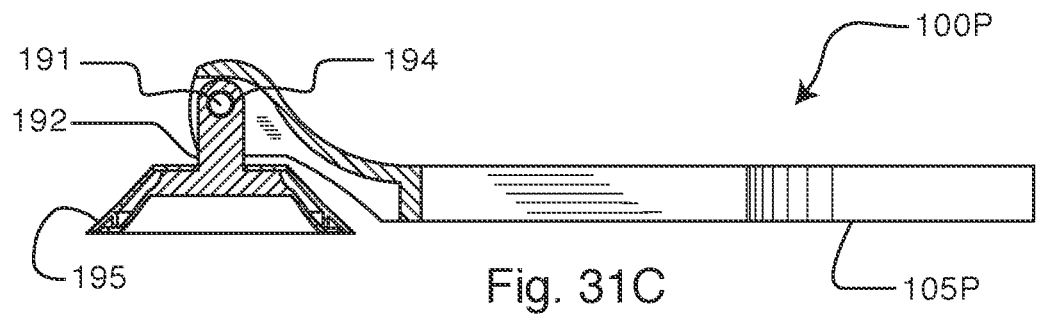

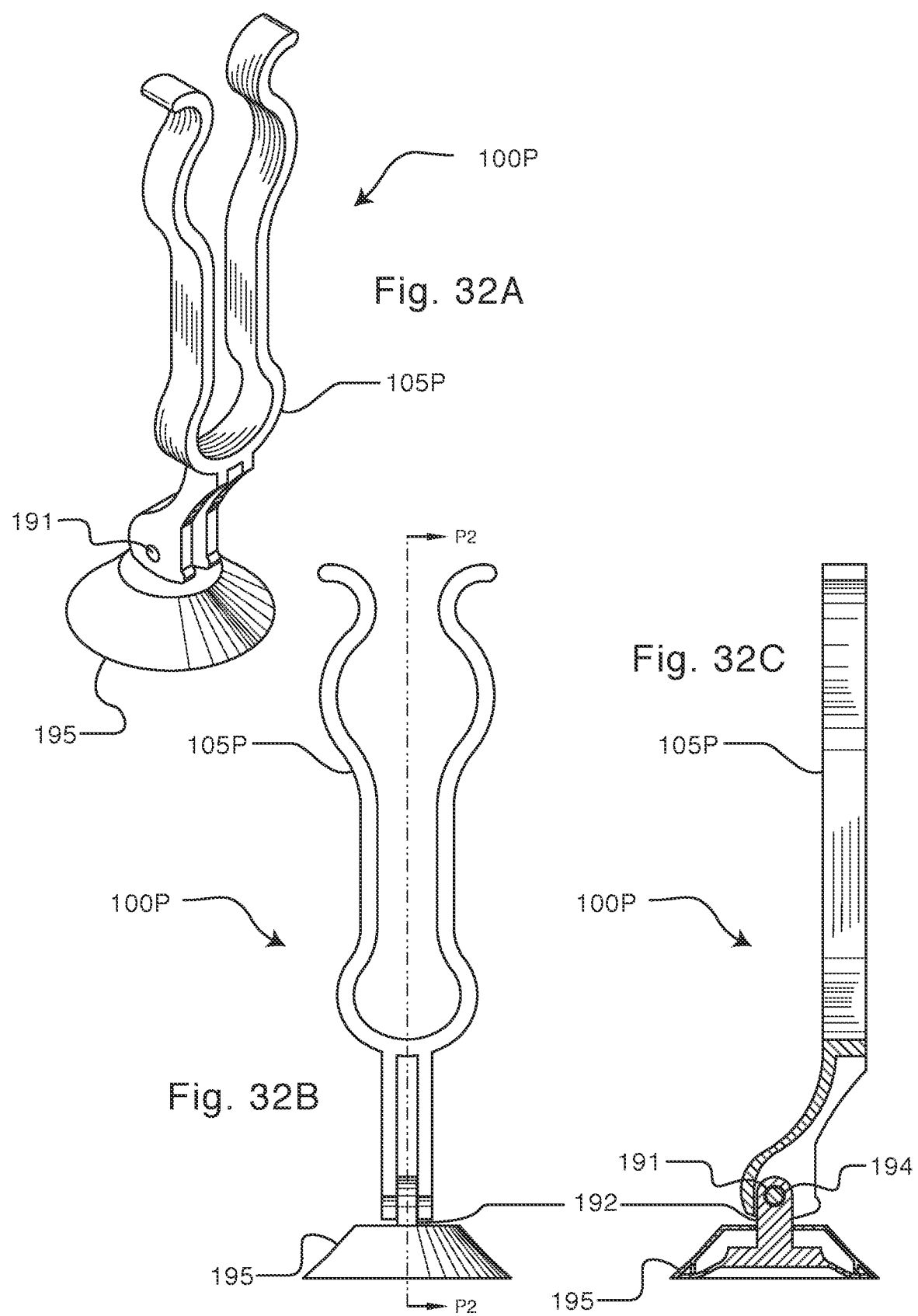

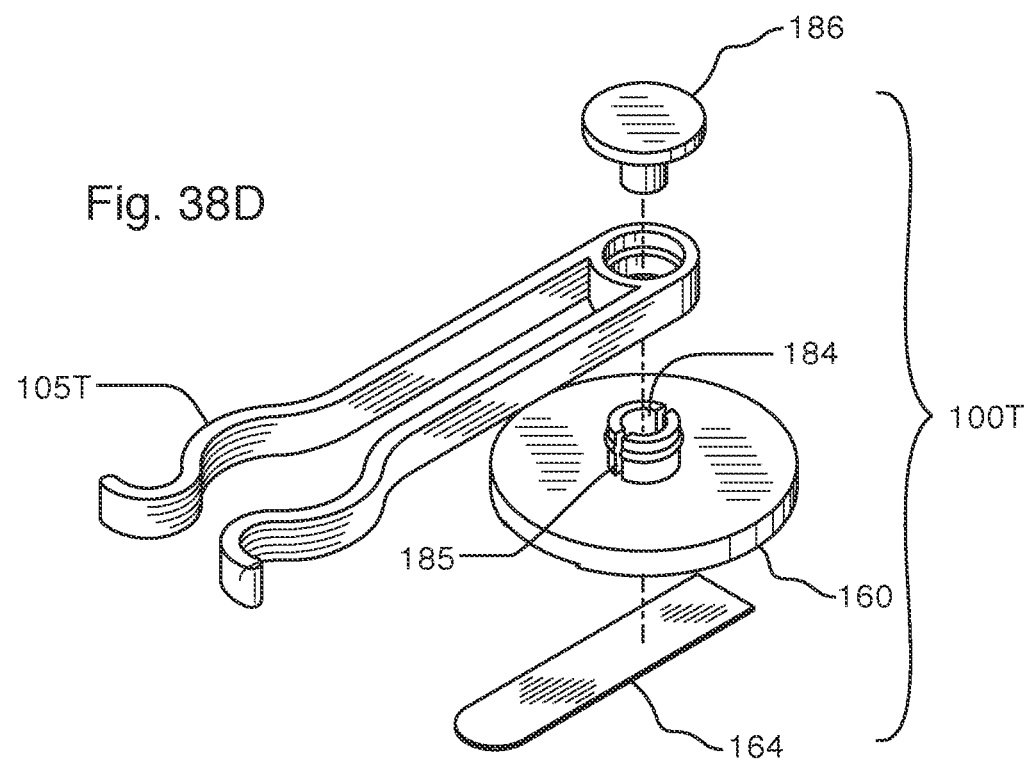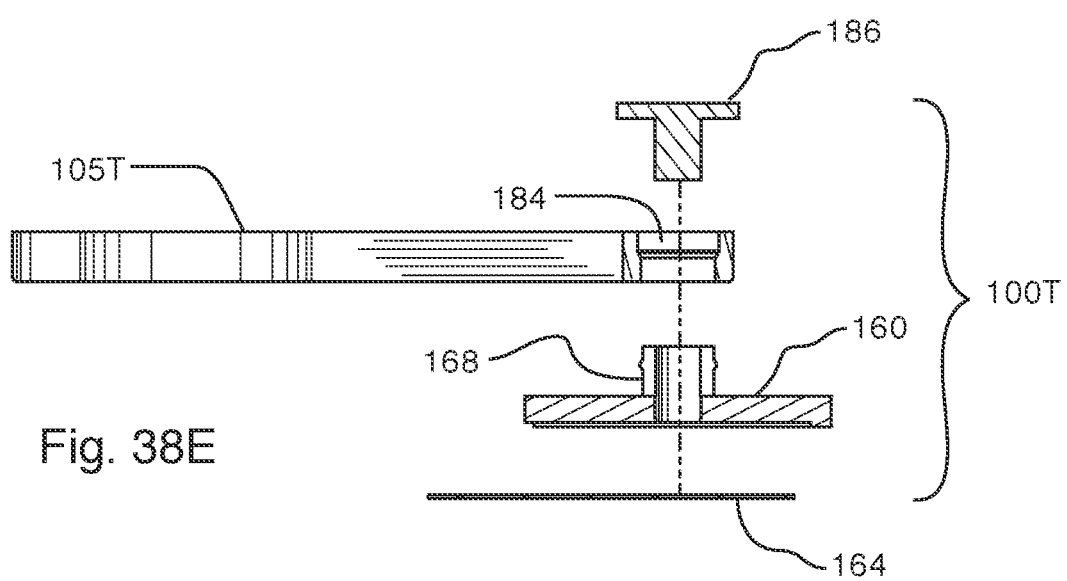

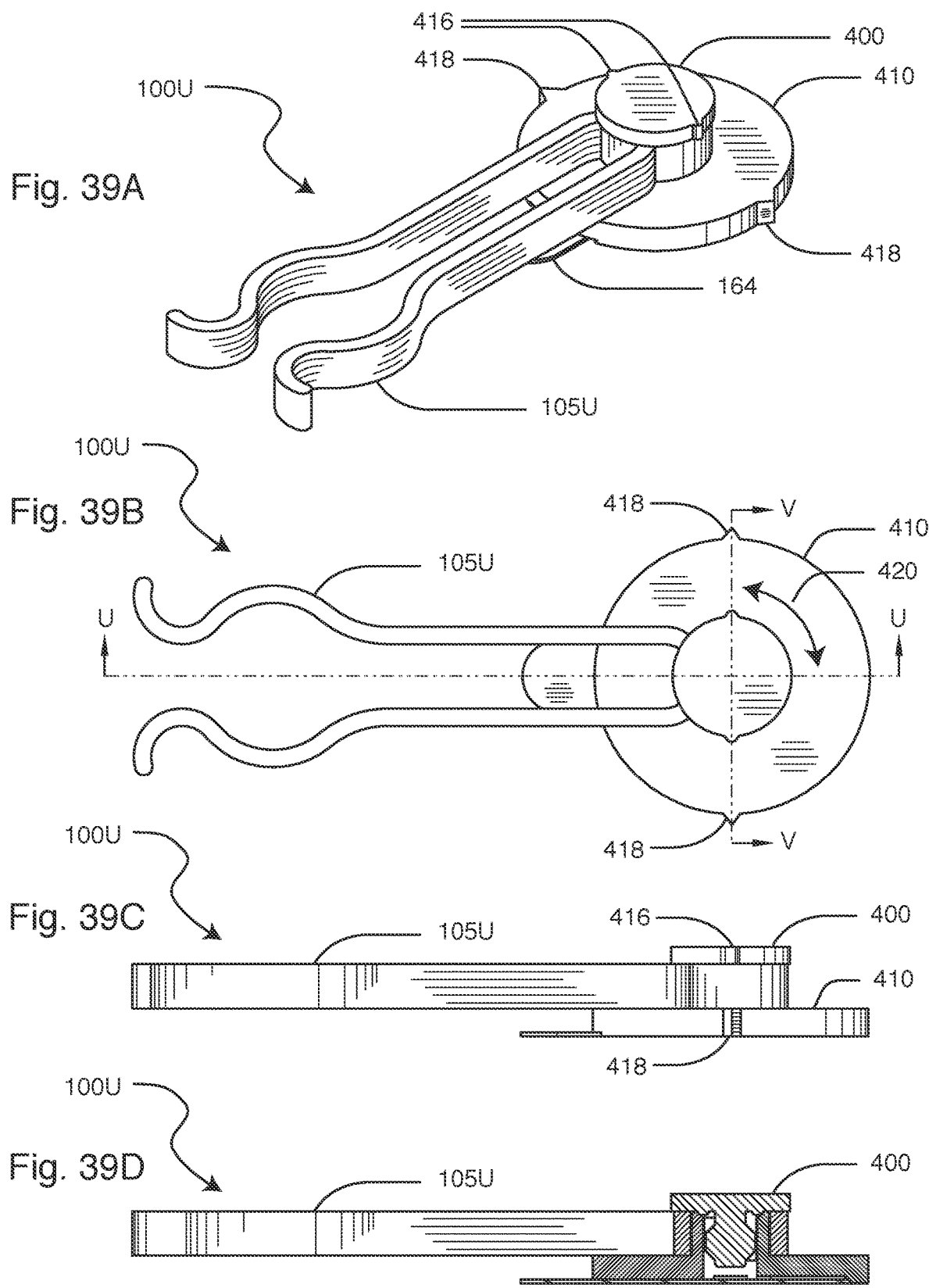

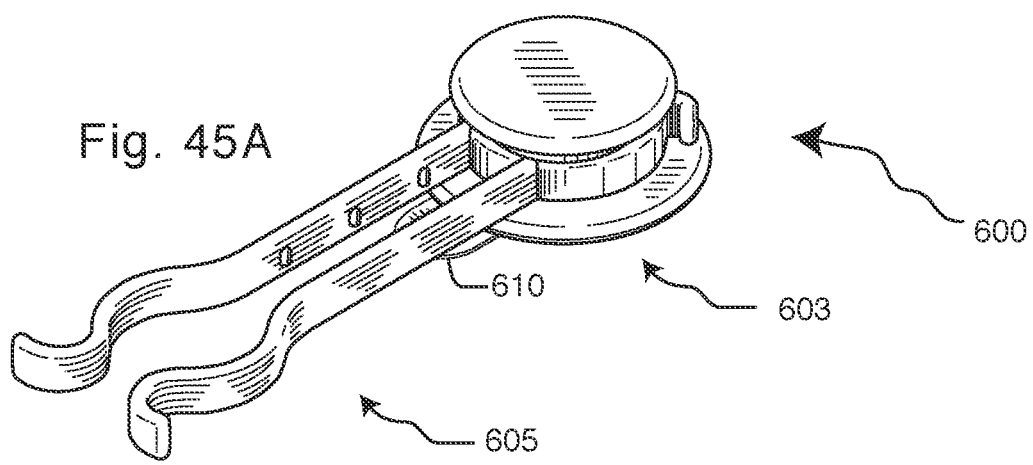
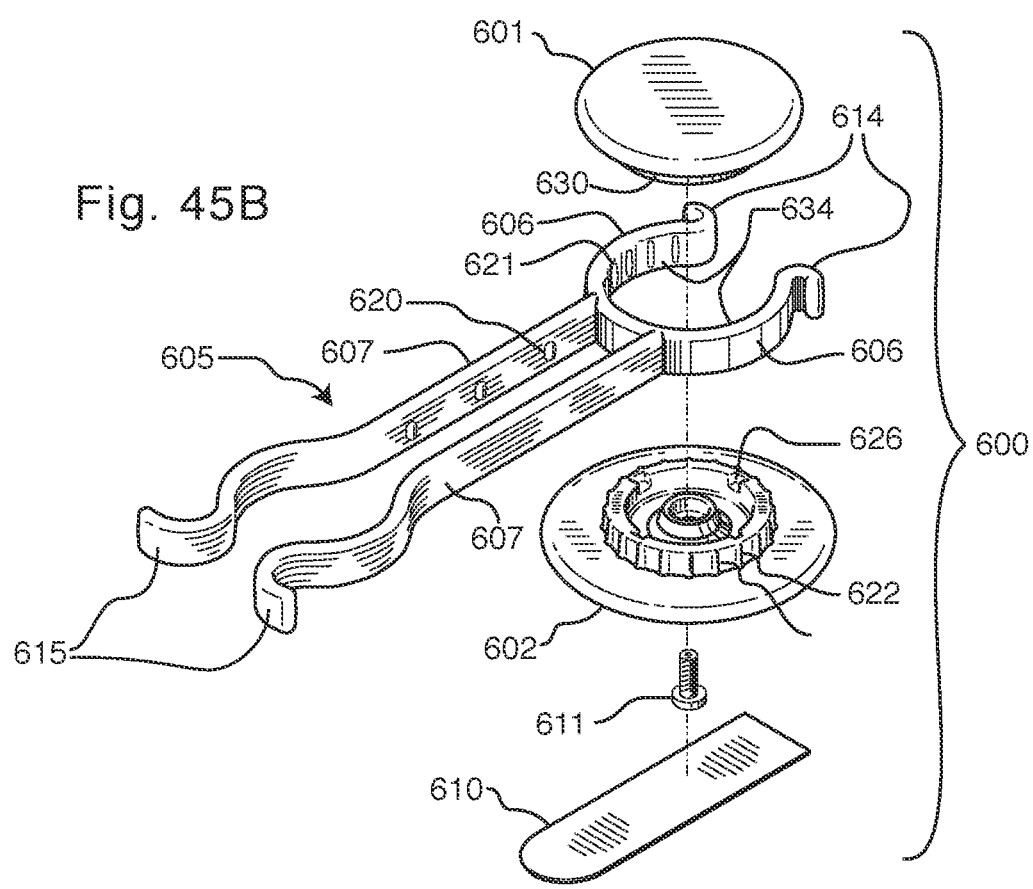

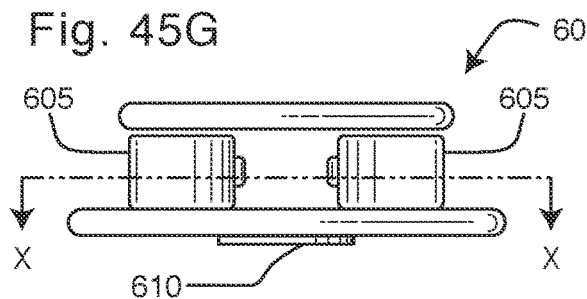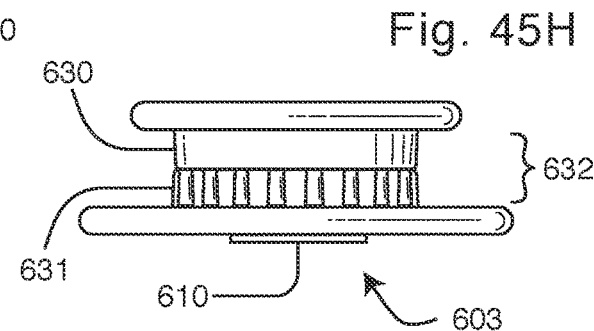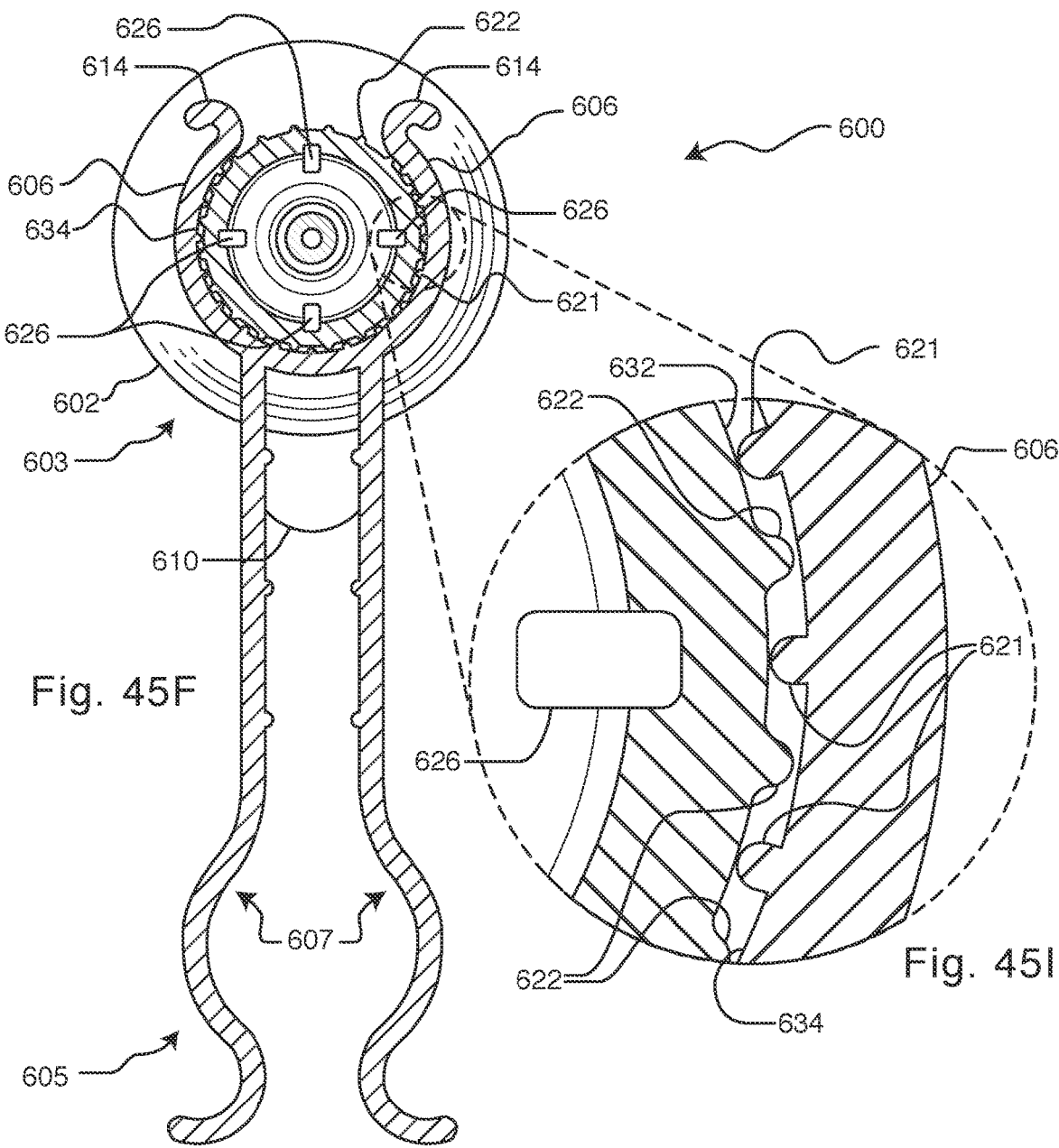

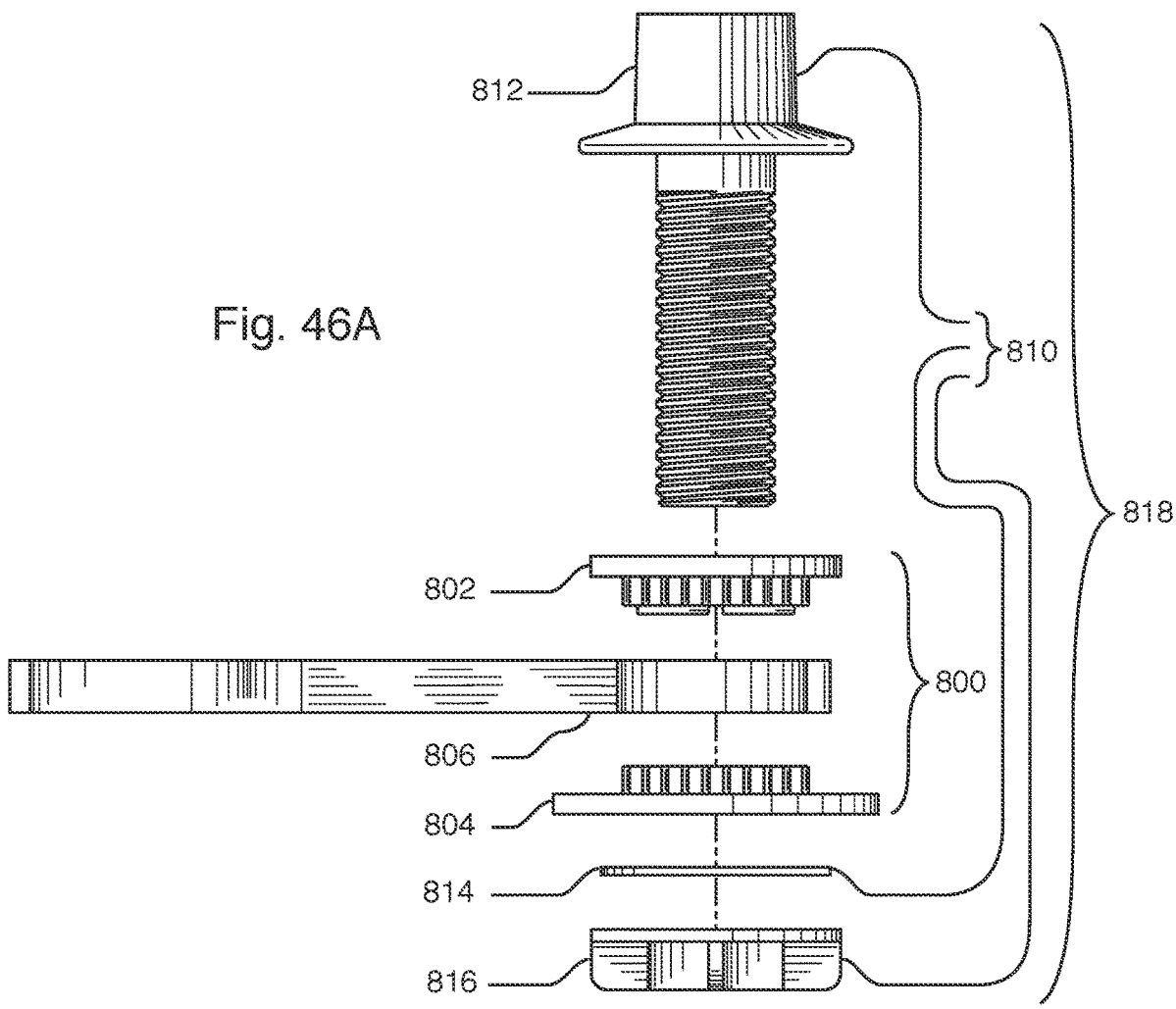

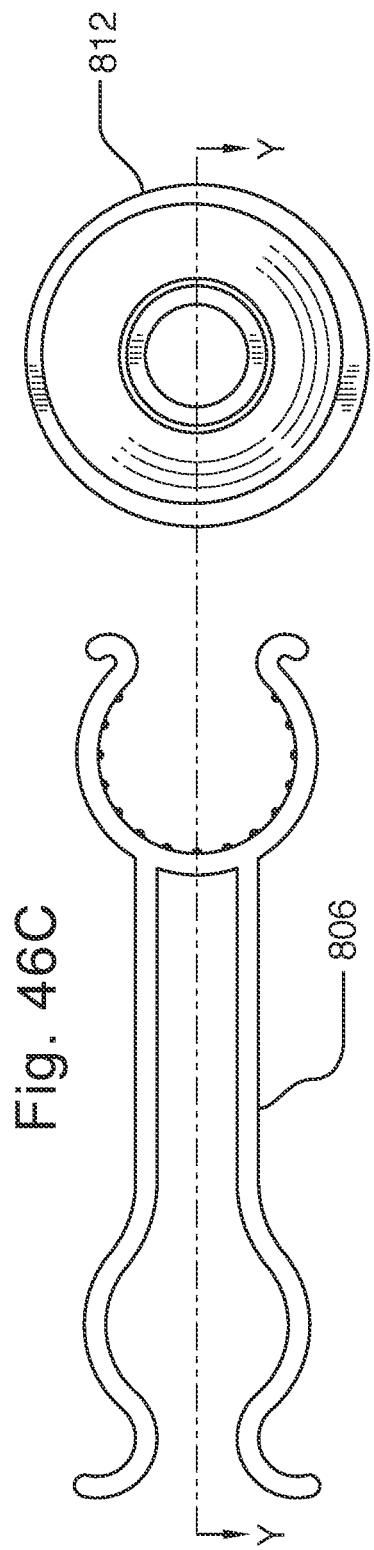
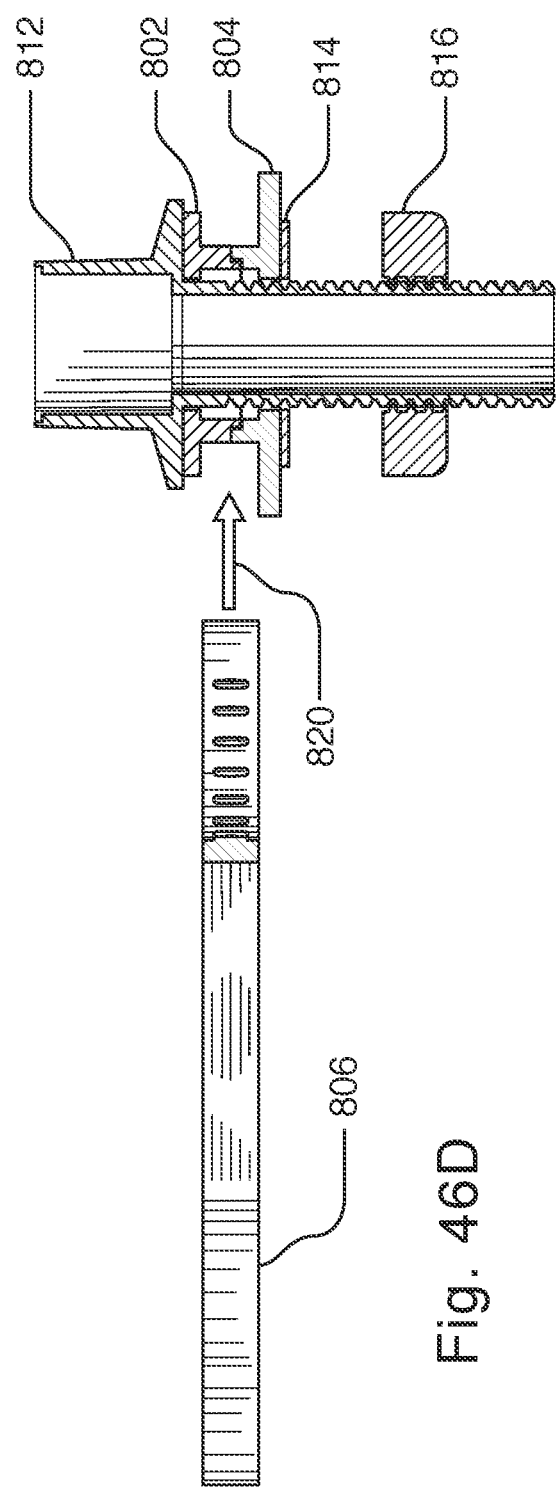

SINK UTENSIL HOLDER

The present invention relates generally to a holder for supporting a cleaning utensil and, more particularly, to a holder for supporting a cleaning utensil such that fluids in or on the utensil head or body can be selectively drained or retained.

SUMMARY OF THE INVENTION

The present invention is a holder for a cleaning utensil, and more particularly for utensils used at a sink. Such utensils are often wet, and sometimes have cleaning fluids in a hollow handle. Other utensils, such as sponges, pads or brushes, are cleaning tools which can be wet and drip when not in use. Also, sinks often have refuse, dirty dishes or other things in them which can soil or obscure cleaning utensils. A hanger would be handy for parking a utensil above the sink floor for easy access. Additionally, it should allow selective and directed drainage of the utensil's fluids between uses. In other words, it is desirable to have the utensil in a position to prevent any inner cleaning fluids leaking out, while also allowing other fluids, such as water in a sponge head, to drain into the sink. Moreover, a hanger can help the user to organize utensils, thus reducing time spent searching.

It is meaningful to contrast the various means of access of the invention of the present disclosure with other existing devices for storing utensils some of which have only top down access, for instance baskets or cups. Such devices can obscure the utensil's handle thus requiring the user to awkwardly change their grip between the utensil's handle to the head during insertion or removal. Other devices rely on having the utensil in one particular orientation for insertion and parking which again can require some intermediate change of grip.

The invention of the present disclosure includes an easier and more natural way to park a utensil. Insertion in a generally horizontal motion via the types of openings shown in the present disclosure is more convenient than other methods because one can insert and remove the utensil without having to awkwardly change one's grip. In other words, the user is less constrained to adjust their normal, familiar working motions to utilize the invention of the present disclosure. Additionally, in some embodiments the present invention can offer the choice of inserting or removing a utensil horizontally or from the top.

The term "park" or "parking" is used because the present invention can accommodate holding a variety of utensils in a variety of ways. For example, a sponge may be squeezed to be held while a dish wand head may be resting on the upper surface of the holder while a dish cloth may be draped. Use of the terms "park" or "parking" are intended to include such variations.

Accordingly it is an object of this invention to solve the problems previously described which are not presently addressed by prior art, by providing a variety of embodiments of utensil holders that:

A. can be releasably attached adjacent a sink with a variety of convenient means, such as a suction cup or cooperatively engaging with sink or countertop holes,
B. can be attached in a variety of locations around the rim of a sink,
C. allows installation of a holder without the need of tools or specialized knowledge,
D. allows insertion, parking and removal of a wide variety of utensils,
E. can continue to be useful as utensil shapes evolve or preferences change,
F. allows configurations for parking one or more utensils on a single platform,
G. allows positioning utensil(s) so they selectively retain some fluids in the utensil(s) while selectively draining other fluids into the sink,
H. allows utensils to drain and dry thus creating a less hospitable environment for bacteria and fungus,
I. does not require a drainage conductor or drainage channel to guide fluids into the sink,
J. allows flexible orientations of a utensil during insertion and parking,
K. allows swiveling the holder to facilitate re-positioning of the holder end of the platform,
L. can allow positioning the holder outside the sink basin to make the entire sink available for use without detaching the holder,
M. can be configured to increase the usual suction power of a suction cup attachment means,
N. allows for left- or right-handed use,
O. can be configured to positively retain a utensil,
P. utilizes a minimum of space adjacent a sink and in some cases utilizes wasted space (such as with an existing un-used hole in a sink lip or countertop),
Q. allows the platform to be manufactured by low-cost means such as injection molding or wire bending,
R. provides a holder that promotes cleanliness and efficiency by keeping utensils elevated in an easy-to-access spot,
S. requires a minimum of force and thought to use resulting in more attention available for other tasks at hand.

The holder will make the user's experience with utensils more pleasant, efficient, clean and tidy. Further objects and advantages of this invention will become more apparent from a consideration of the drawings and ensuing descriptions.

BRIEF DESCRIPTION OF THE DRAWINGS

FIG. 1A is a perspective section view along lines A-A and B-B of FIG. 2C of the first embodiment 100A of this invention in relation to a sink and counter.

FIG. 1B is an exploded perspective view of the version in FIG. 1A.

FIG. 2B is a section view along section line A-A of FIG. 2C.

FIG. 2C is a top down view of FIG. 2A showing section lines A-A and B-B.

FIG. 3A is a top down view of the version of the holder in FIG. 1A with the utensil in an example of an alternate orientation.

FIG. 3B is a perspective view of FIG. 3A.

FIG. 4A is a top down view of the holder of FIG. 1A retaining utensil 200C, in this case a sponge.

FIG. 4B is a perspective view of FIG. 4A.

FIG. 4C is a side view of FIG. 4A.

FIG. 5A is a perspective view of embodiment 100A.

FIG. 5B is a top down view of FIG. 5A showing section line G-G.

FIG. 5C is a section view of FIG. 5B along lines G-G with the suction cup and connector in its default position.

FIG. 5D is a section view of FIG. 5B along lines G-G with a downward force being exerted.

FIG. 5E is a cross-section of FIG. 5B along lines G-G with an upward force being exerted.

FIG. 5F is a cross-section of FIG. 5B along lines G-G with the suction cup in isolation being shown for clarity of part numbering/identification.

FIG. 6A is a perspective view of utensil 100A swiveled over counter.

FIG. 6B is a top down view of FIG. 6A.

FIG. 7B is a top down view of FIG. 7A.

FIG. 7C is a portion of a view of FIG. 7D along lines K-K and L-L enlarged for magnification purposes.

FIG. 7D is a section view of FIG. 7A along lines K-K and L-L.

FIG. 9A is a perspective view of holder 100A with two fillets.

FIG. 9B is a perspective view of holder 100A with two scoops (one removed from each arm).

FIG. 9C is a side view of FIG. 9B.

FIG. 9D is a perspective view of holder 100A with two bump added.

FIG. 9E is a side view of FIG. 9D.

FIG. 10A is an exploded perspective view of version 100D of the invention.

FIG. 10B is a perspective view of FIG. 10A.

FIG. 10C is a top down view of FIG. 10A.

FIG. 11A is a perspective view of version 100D including a utensil 200B, in this case a dish wand.

FIG. 11B is a front view of FIG. 11A.

FIG. 11C is a side view of FIG. 11A.

FIG. 12A is a perspective view of version 100E which includes a funnel opening configured for and shown with a utensil, in this case a sponge 200C.

FIG. 12B is a top down view of FIG. 12A.

FIG. 12C is a side view of FIG. 12A.

FIG. 12D is an end on view of FIG. 12A.

FIG. 13A is a side view of version 100F which includes an intermediate crossbar 108F and lines J-J.

FIG. 13B is a top down section view along lines J-J of FIG. 13A.

FIG. 13C is a top down view of FIG. 13A showing hidden lines.

FIG. 13D is a perspective view of FIG. 13A showing hidden lines.

FIG. 17 is a perspective view of in-hole embodiment 100B showing draining liquid.

FIG. 18A is an exploded view of in-hole version 100B of FIG. 17 plus escutcheon 310 and escutcheon nut 312.

FIG. 18B is a top down view of in-hole version 100B of FIG. 18A.

FIG. 18C is a side section view of in-hole version 100B along lines C-C from FIG. 21B.

FIG. 18D is a side view of in-hole version 100B along lines D-D from FIG. 21B.

FIG. 19A is a front view of in-hole version of FIG. 17.

FIG. 19B is a side section view along lines E-E of FIG. 19A.

FIG. 19C is a side section view along lines F-F of FIG. 19A.

FIG. 21A is a perspective view of multiple utensil holder 100C.

FIG. 21B is a side view of FIG. 21A.

FIG. 21C is a front view of FIG. 21A.

FIG. 21D is a top down view of FIG. 21A.

FIG. 22A is a perspective view of multiple utensil holder 100D with dish wand 200B and sponge 200C.

FIG. 22B is a side view of FIG. 22A.

FIG. 22C is a front view of FIG. 22A.

FIG. 22D is a top down view of FIG. 22A.

FIG. 23A is FIG. 22A showing hidden lines.

FIG. 23B is a side view of FIG. 22B showing hidden lines.

FIG. 23C is a front view of FIG. 22C showing hidden lines.

FIG. 23D is a top down view of FIG. 22D showing hidden lines.

FIG. 26A is a perspective view of holder 100K (assembled).

FIG. 26B is an exploded right-side up view of holder 100K.

FIG. 26C is an exploded up-side down view of holder 100K.

FIG. 28A is a perspective view of holder 100L with dishwand 200B.

FIG. 28B is a front view of holder 100L with dishwand 200B.

FIG. 28C is a top down view of holder 100L with dishwand 200B.

FIG. 28D is a side view of holder 100L with dishwand 200B.

FIG. 30 is an exploded view of holder 100N.

FIG. 31A is a perspective view of holder 100P in locked position.

FIG. 31B is a top down view of holder 100P in locked position.

FIG. 31C is a side section view of holder 100P along lines P1-P1 from FIG. 31B.

FIG. 32A is a perspective view of holder 100P in unlocked position.

FIG. 32B is a front view of holder 100P in unlocked position.

FIG. 32C is a side section view of holder 100P along lines P2-P2 from FIG. 32B.

FIG. 38D is a perspective exploded view of holder 100T.

FIG. 38E is a side section exploded view of holder 100T along lines T1-T1.

FIG. 39A is a perspective view of holder 100U.

FIG. 39B is a top down view of holder 100U.

FIG. 39C is a side view of holder 100U.

FIG. 39D is a side section view of holder 100U along lines U-U from FIG. 39B.

FIG. 40A is a perspective exploded view of holder 100U.

FIG. 40B is a side section view of holder 100T along lines T1-T1 from FIG. U.

FIG. 41A is a perspective view of holder 100W.

FIG. 41B is a top down view of holder 100W.

FIG. 41C is a side section view of holder 100W along lines W-W from FIG. 41B.

FIG. 42A is a perspective exploded view of holder 100W.

Figure 42A:
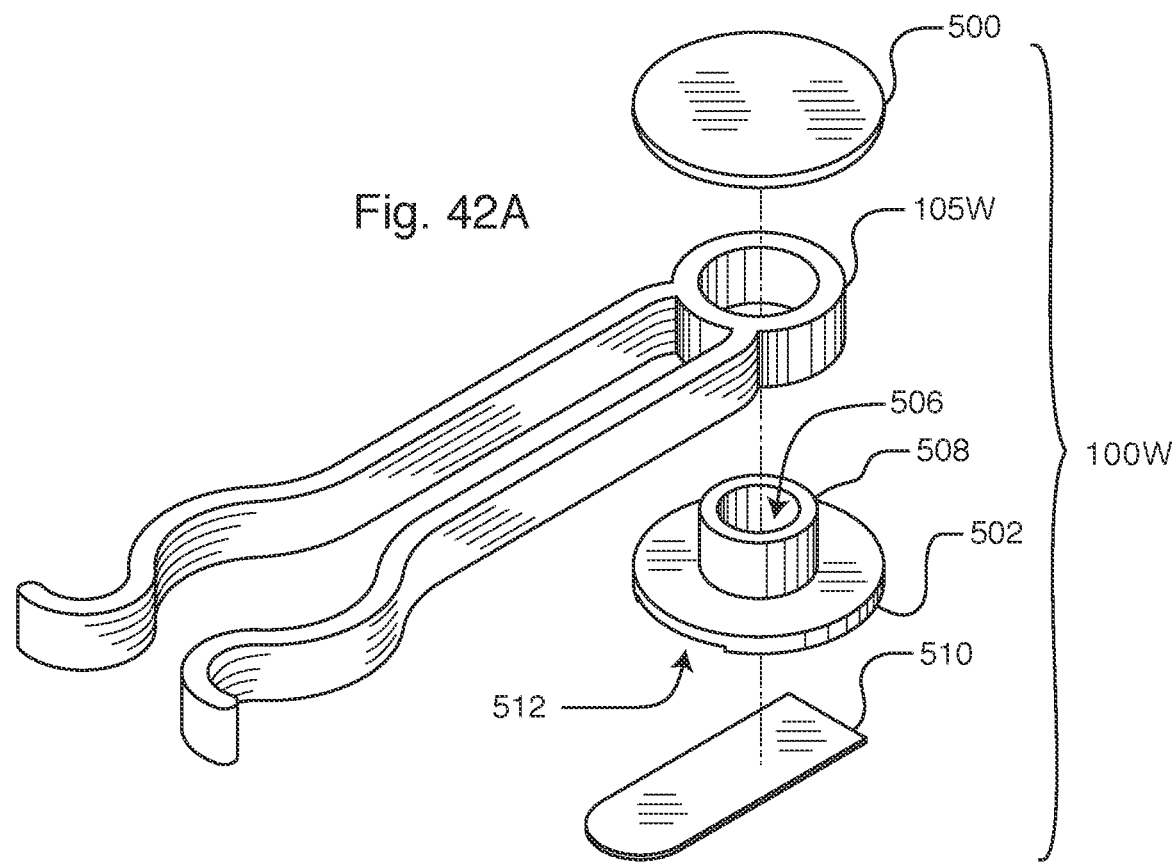
Figure 42B:
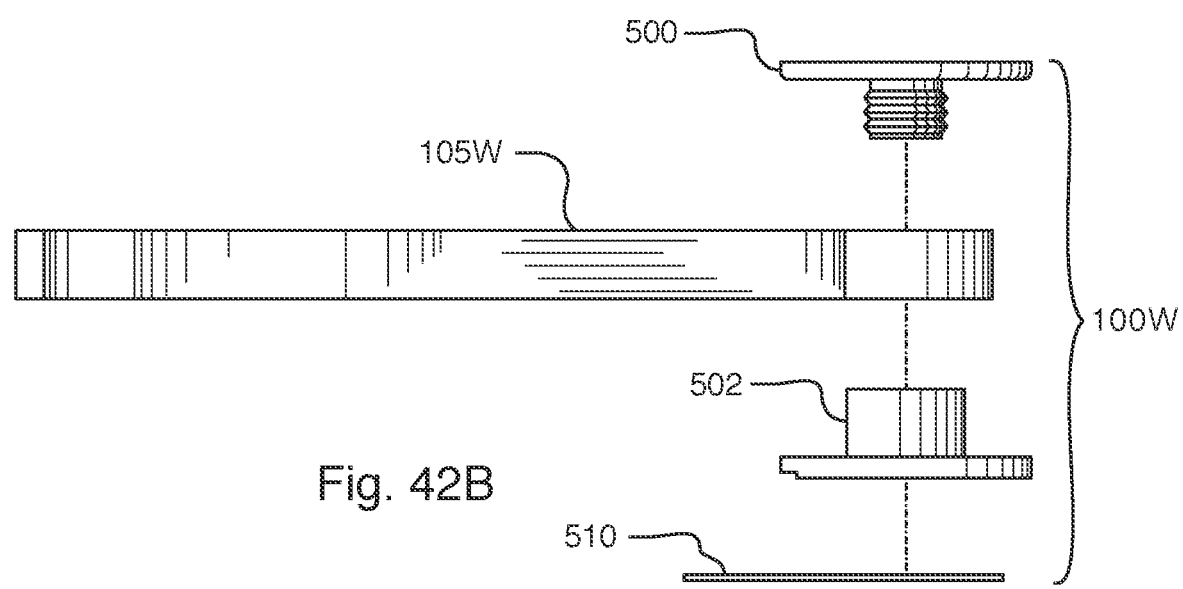

FIG. 42B is a side exploded view of holder 100W.

Figure 43A:
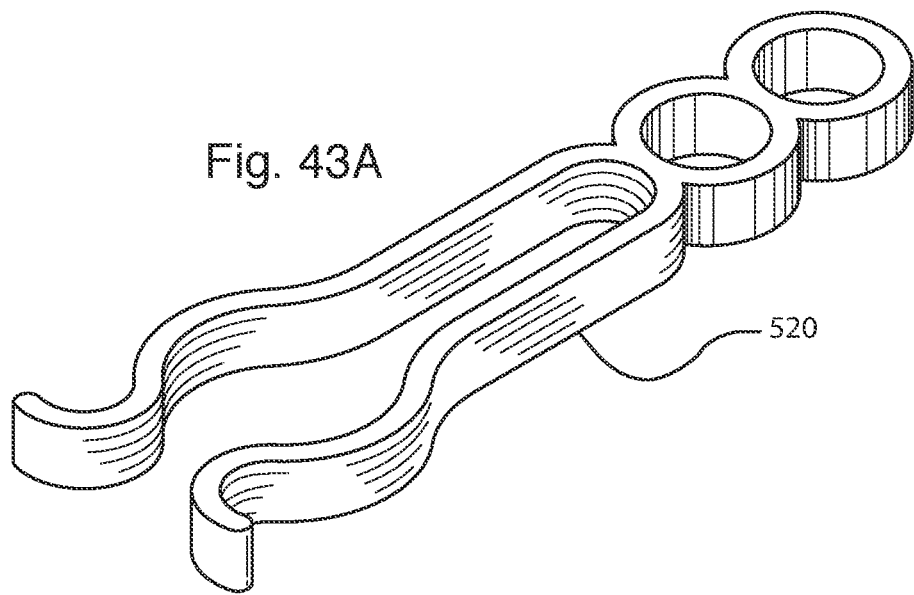

FIG. 43A is a perspective view of platform 520.

Figure 43B:
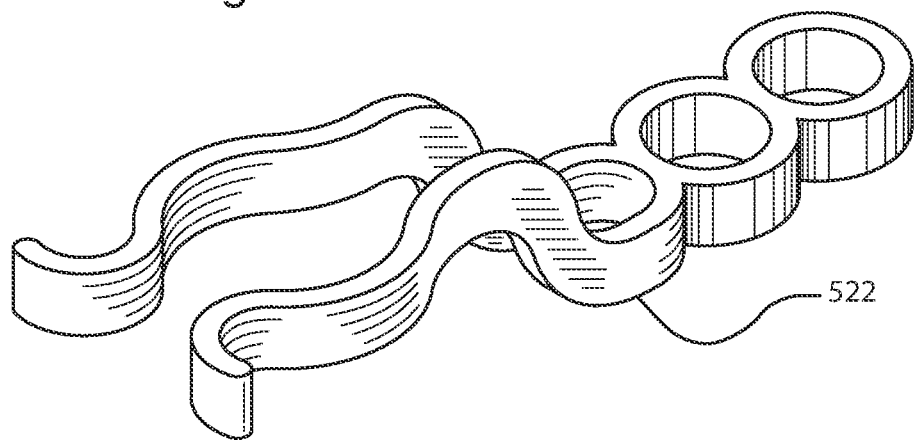

FIG. 43B is a perspective view of arched platform 522.

Figures 44A, 44B, 44C, 44D:
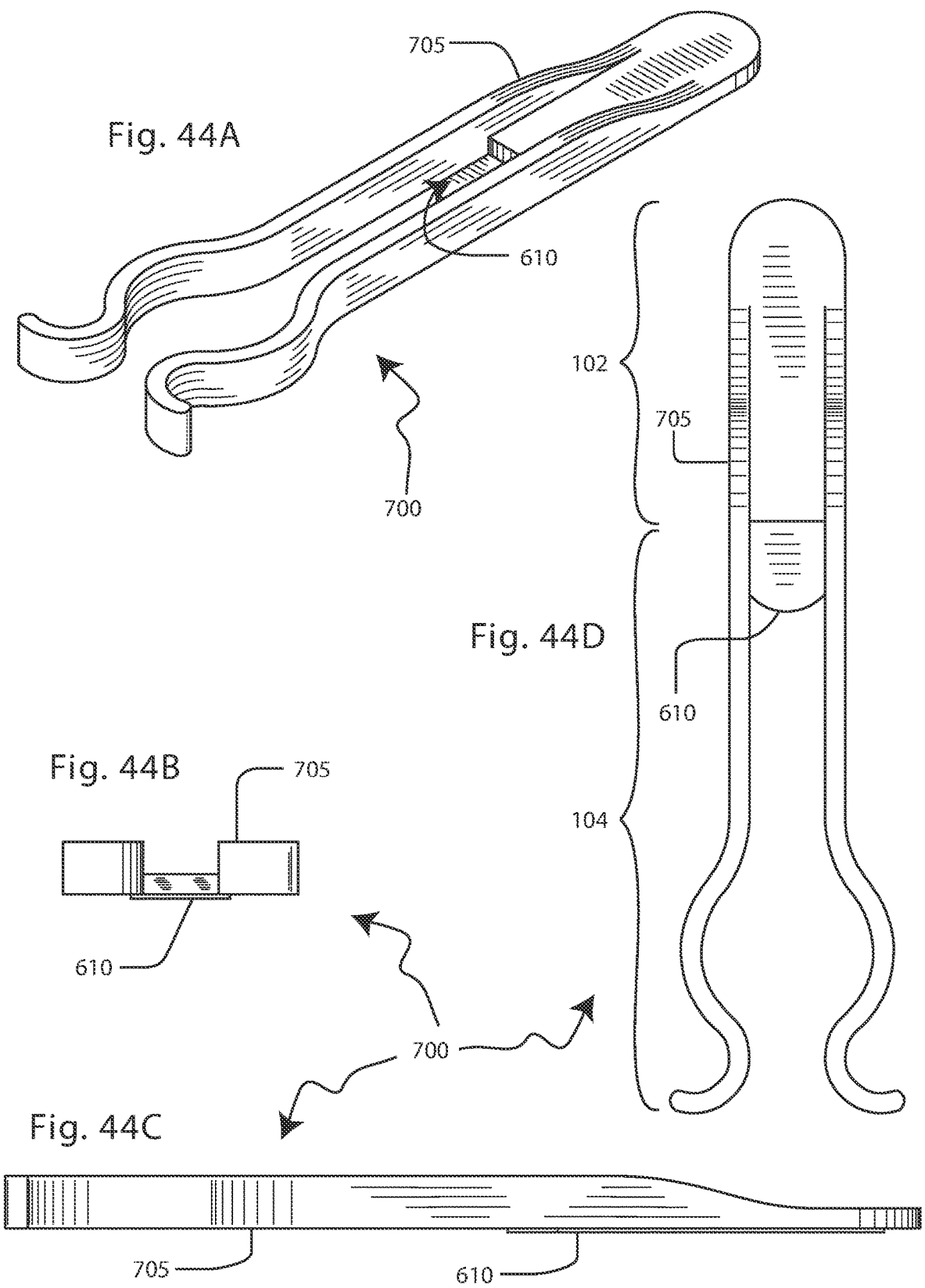

FIG. 44A is a perspective view of holder 700.

FIG. 44B is a top down view of holder 700.

FIG. 44C is a front view of holder 700.

FIG. 44D is a side view of holder 700.

FIG. 45A is a perspective view of holder 600.

FIG. 45B is an exploded perspective view of holder 600.

Figure 45C:
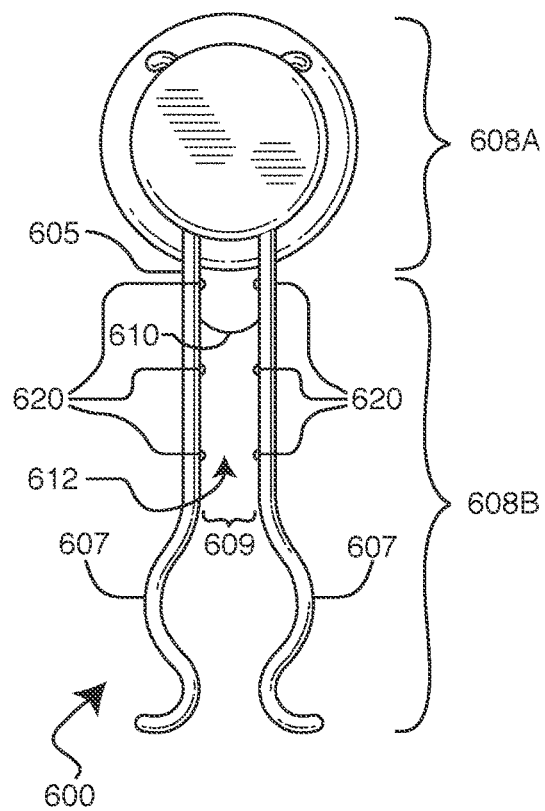

FIG. 45C is a top down view of holder 600.

Figure 45D:
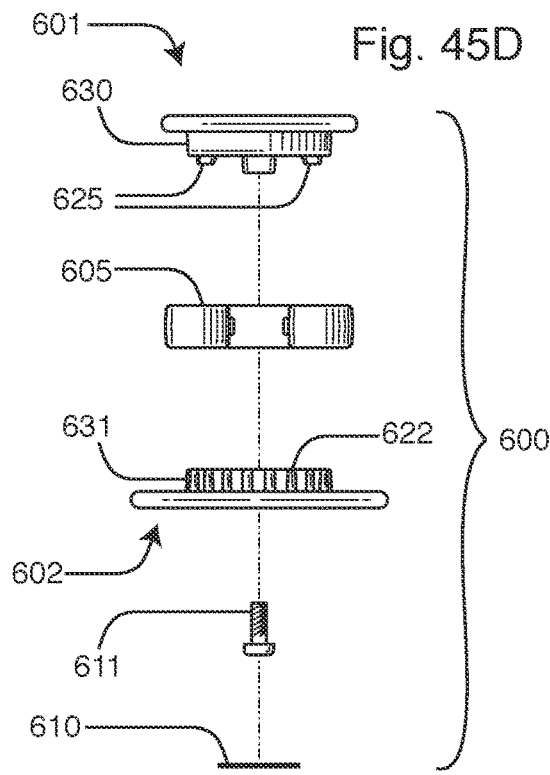

FIG. 45D is an exploded front view of holder 600.

Figure 45E:
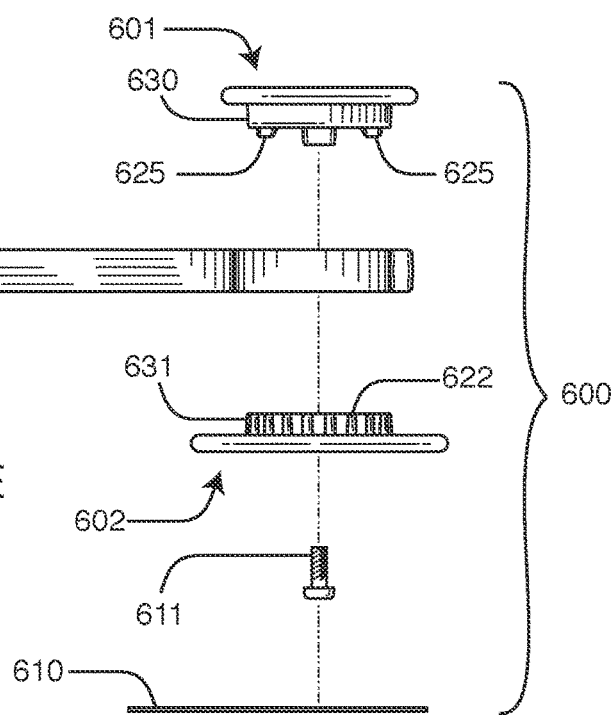

FIG. 45E is an exploded side view of holder 600.

FIG. 45F is a section view along line X-X.

FIG. 45G is a front view with section line X-X.

FIG. 45H is a side view of hub 603.

FIG. 45I is a portion of a view of FIG. 45F enlarged for magnification purposes.

Figure 45J:
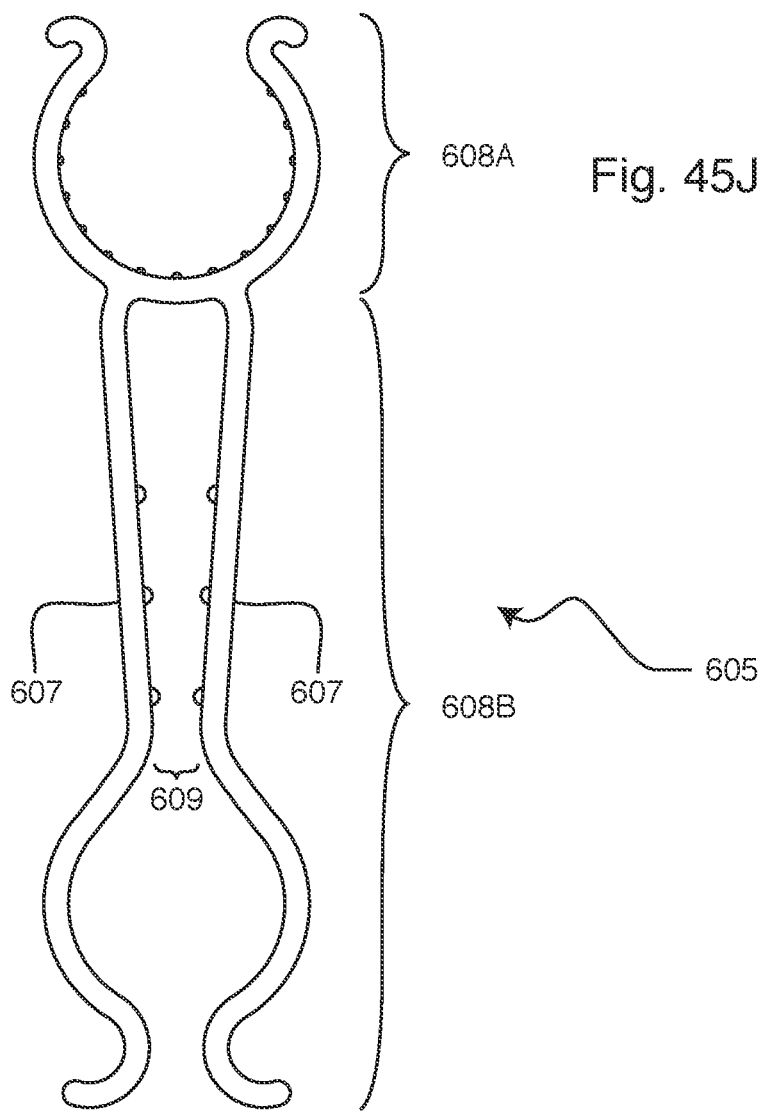

FIG. 45J is a top down view of a variation of platform 605.

Figure 45K:
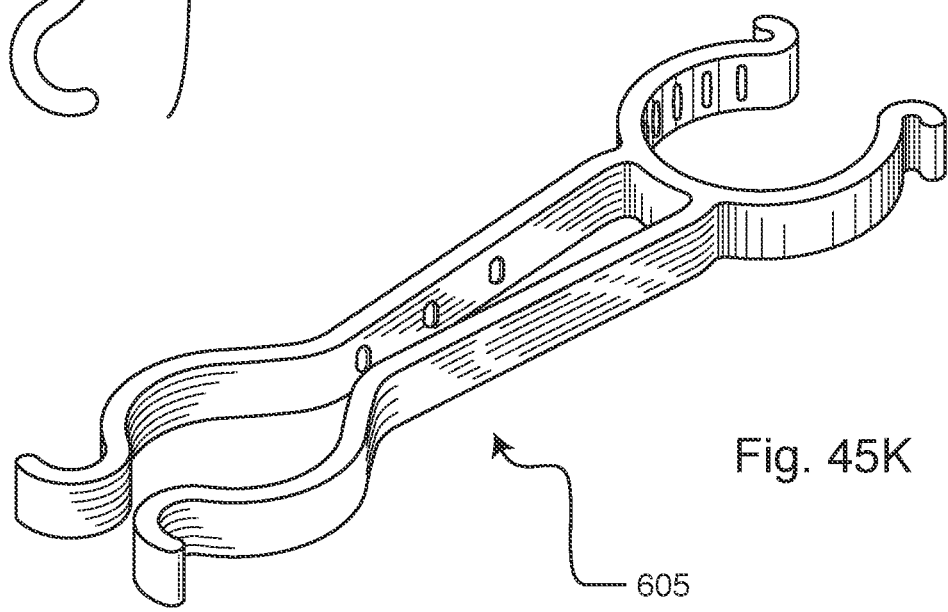

FIG. 45K is a perspective view of platform 605 in FIG. 45J.

FIG. 46A is an exploded view of assemblage 818.

Figure 46B:
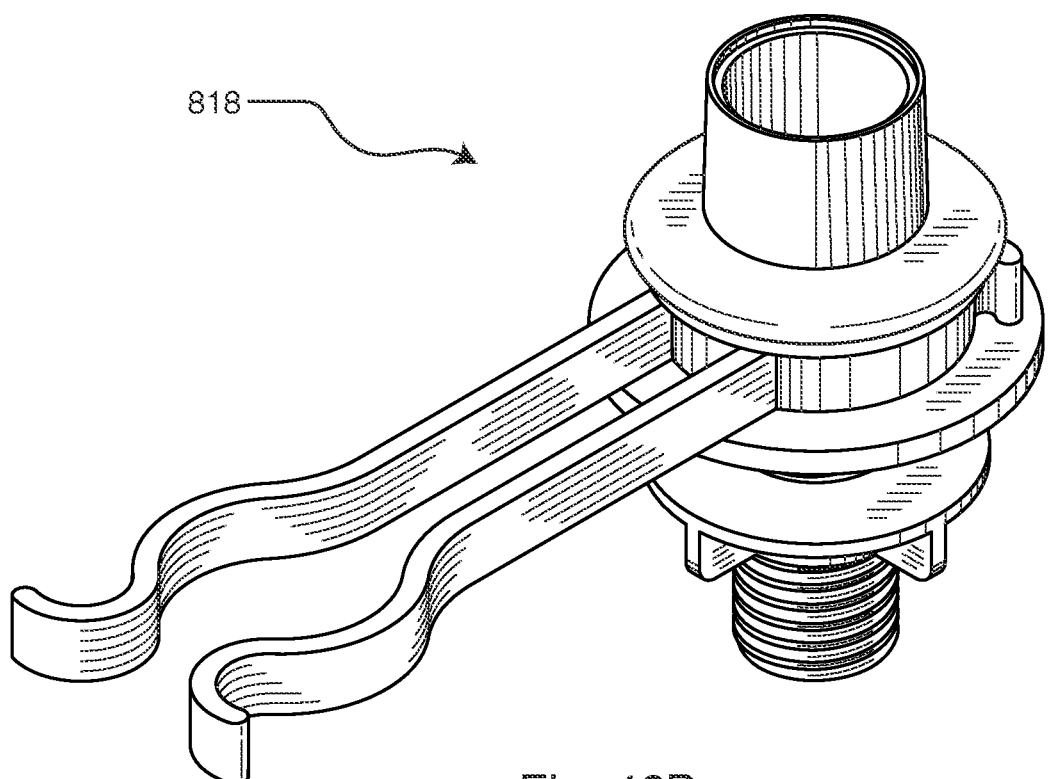

FIG. 46B is a perspective view of assemblage 818.

FIG. 46C is a top down view of of assemblage 818 with section line Y-Y.

FIG. 46D is a section view of assemblage 818 along line Y-Y.

DETAILED DESCRIPTION OF THE INVENTION

Nomenclature

| REF. NO. | NAME |
| --- | --- |
| 100B | In-hole Utensil holder (second embodiment of this invention) (FIG. 17) |
| 100C | Multiple utensil holder |
| 100D | U-shaped utensil holder with suction cup (third embodiment of this invention) |
| 100E | U-shaped utensil holder 100D plus funnel 120 (FIG. 12A) |
| 100F | U-shaped utensil holder 100D plus intermediate crossbar 108F (FIG. 13 A) |
| 100G | U-shaped utensil holder 100D plus narrowing of mouth 118 (FIG. 14A) |
| 100H | U-shaped utensil holder 100D plus split crossbar and narrowing of mouth 118 and funnel 120 (FIG. 15A) |
| 100J | Wire frame utensil holder with suction cup |
| 100K | Slide-on utensil holder with removable adhesive strip 164 |
| 100L | Slide-on utensil holder with removable adhesive strip 164 with arched platform 105L |
| 100M | In-hole Utensil holder (one-piece plus nut) (FIG. 20A) |
| 100N | Snap-on utensil holder with removable adhesive strip 164 |
| 100P | Lever holder, fixed |
| 100Q | Lever holder, rotating |
| 100R | Holder (shown with elastic band in FIGs. 36A, 36B and 36C) |
| 100S | Holder (shown with clip in FIGs. 37A and 37B |
| 100T | Snap on holder with optional plug (shown in FIGs. 38A through 38E) |
| 100U | Holder with twist cap (shown in FIGs. 46, 47, and 48) |
| 100W | Holder with rubber plug |
| 102 | Securing portion |
| 104 | Holding portion |
| 105A | Platform of holder 100A (curved first embodiment 100A) |
| 105B | Platform of holder 100B (In-hole 100B) |
| 105C | Platform of holder 100C (multiple utensil 100C) |
| 105D | Platform of holder 100D (simple U-shape 100D) |
| 105E | Platform of holder 100E (simple U-shape plus funnel 120) (FIG. 12A) |
| 105F | Platform of holder 100F (simple U-shape plus intermediate crossbar 108F) (FIG. 13A) |
| 105G | Platform of holder 100G (simple U-shape plus narrowing of mouth 118) (FIG.14B) |
| 105H | Platform of holder 100H (simple U-shape plus split crossbar plus narrow opening plus funnel) (FIG. 15A) |
| 105J | Platform of holder 100J (wire frame) |
| 105K | Platform of holder 100K |
| 105L | Arched platform of holder W0L |
| 105M | Platform of holder 100M |
| 105N | Platform of utensil holder 100N |
| 105P | Platform of utensil holder 100P |
| 105Q | Platform of utensil holder 100Q |
| 105R | Platform of utensil holder 100R |
| 105S | Platform of utensil holder 100S |
| 105T | Platform of utensil holder 100T |
| 105U | Platform of utensil holder 100U |
| 105V | intensionally omitted |
| 105W | Platform of holder 100W |
| 106 | Suction cup connector |
| 108C | Split crossbar (part of 100H in FIG. 15A-D) |

-continued

| REF. NO. | NAME |
|---|---|
| 108F | Intermediate crossbar (part of 100F in FIG. 13A 13B 13C 13D) |
| 109 | Narrowing of void distal to the portion where a utensil such as a dish wand 200B parks (shown in FIG. 1C) |
| 110A | First arm (right or center) |
| 110B | Second arm (left) |
| 110C | Third arm (for defining second void 112B with arm 110A) |
| 112A | Void (first void if there are two or more voids) |
| 112B | Second void |
| 113A | Mouth of void 112A |
| 113B | Second mouth (of second void 112B) |
| 114 | Distal end of utensil holder (securing end) |
| 115 | Proximal end of utensil holder (holder end) |
| 118 | Narrowing of mouth (Portion of arms 110A and 110B at the proximal end 115 surrounding more than half of a portion of utensil handle 208) |
| 120 | Funnel |
| 124 | Extension of holder 100A which is, for example, interoperable with escutcheon 310 in FIG. 21C and 21D |
| 126 | Fillet |
| 128 | Scoop |
| 130 | Bump |
| 132A | Clockwise arrow (indicating swiveling motion of platform) |
| 132B | Anti-clockwise arrow (indicating swiveling motion of platform) |
| 140 | Suction cup |
| 142 | Suction cup knob |
| 144 | Suction cup disc |
| 146 | Suction cup post |
| 148 | Space under suction cup disc 144 (the volume of that space) |
| 150 | Downward force on suction cup |
| 152 | Upward force on suction cup |
| 160 | Pad of holder 100K |
| 161 | Snap-on lid of holder 100N |
| 162 | Snap-on lid of holder 100K |
| 163 | Snap-on catches on lid 162 |
| 164 | Removable adhesive strip |
| 166 | Recess for adhesive strip in pad 160 |
| 168 | Post on pad 160 |
| 170 | Ring on post 168 |
| 172 | Two-way arrow (indicating motion of snap-on lid of holder 100K) |
| 173 | Two-way arrow (indicating motion of snap-on lid of holder 100N) |
| 174 | Post hole 1 |
| 175 | Post hole 2 |
| 176 | First arm of platform 105K |
| 177 | Second arm of platform 105K |
| 178 | Lid channels |
| 179 | Platform rails |
| 180 | Drip stop |
| 182 | Elastic band |
| 183 | Clip |
| 184 | Hole in post |
| 185 | Slot in post |
| 186 | Plug (goes in post hole 184) |
| 190 | Lever |
| 191 | Pin |
| 192 | Suction cup with post 193 and pinhole 192 |
| 193 | Post of suction cup 192 |
| 194 | Pinhole in post 193 of suction cup 192 |
| 195 | Bell housing |
| 196 | Retainer |
| 197 | Hole in retainer 196 |
| 200B | Utensil, dish wand |
| 200C | Utensil, sponge |
| 200D | Utensil, scrubbing pad |
| 208 | Utensil handle portion |
| 209 | Hollow in handle (Utensil reservoir) |
| 210 | Utensil head portion |
| 214 | Utensil cleaning solution |
| 216 | Cleaning fluid outlet |
| 218 | Utensil removable cap |
| 224 | Liquid draining (drops and puddle) |
| 300 | Sink |
| 301 | Sink opening or basin |
| 302 | Countertop |

-continued

| REF. NO. | NAME |
|---|---|
| 306 | Faucet |
| 310 | Escutcheon for sink sprayer hose guide |
| 312 | Escutcheon nut for sink sprayer hose guide |
| 313 | Nut for holder 100M |
| 314 | Hole in countertop |
| 315 | Threaded portion of holder 100M |
| 400 | Twist cap |
| 401 | Shaft of cap |
| 402 | Wings on twist cap |
| 406 | Interlocking protrusions |
| 408 | Interlocking recesses |
| 410 | Pad of holder 100U |
| 412 | Post of pad of holder 100U |
| 413 | Keyhole in post |
| 416 | Alignment indicators on cap |
| 418 | Alignment indicators on pad |
| 420 | Two-headed arrow (indicating swiveling motion of twisting cap) |
| 422 | Ring round post |
| 424 | Hole in ring 422 |
| 426 | Stops for wings 402 |
| 500 | Rubber plug of holder 100W |
| 502 | Pad of holder 100W |
| 504 | Ring of platform 105W |
| 506 | Hole in ring 504 of holder 100W |
| 508 | Post of pad 502 |
| 510 | Removable adhesive strip |
| 512 | Recess for adhesive strip in pad 502 |
| 520 | Platform with two rings for holder 100W |
| 522 | Arched platform with two rings for holder 100W |
| 600 | Utensil holder |
| 601 | Top of hub |
| 602 | Base of hub |
| 603 | Hub (top and base assembled as one part |
| 605 | Platform of holder 600 |
| 606 | Distal arms of platform |
| 607 | Proximal arms of platform |
| 608A | Securing portion |
| 608B | Holding portion |
| 609 | Narrowing of void distal to the portion where a utensil such as a dish wand parks |
| 610 | Adhesive strip |
| 611 | Screw |
| 612 | Void between proximal arms 607 |
| 614 | Distal end of platform |
| 615 | Proximal end of platform |
| 620 | Proximal platform nubs (sponge nubs) |
| 621 | Distal platform nubs |
| 622 | Nubs on the hub |
| 625 | Protrusion for interlock corresponding to recess 626 |
| 626 | Recess for interlock corresponding to protrusion 625 |
| 630 | Face of top |
| 631 | Face of base |
| 632 | Face of hub comprising 630 and 631 |
| 634 | Inside face of distal end of platform 614 |
| 700 | One-piece utensil holder with adhesive strip |
| 705 | Platform of holder 700 |
| 800 | Holder |
| 802 | Top |
| 804 | Base |
| 806 | Platform |
| 810 | Sink sprayer hose guide |
| 812 | Threaded escutcheon |
| 814 | Washer |
| 816 | Nut |
| 818 | Assemblage of holder 800 and sink hose drain guide 810 |
| 820 | Arrow |

Construction and Use

Figure 1C:
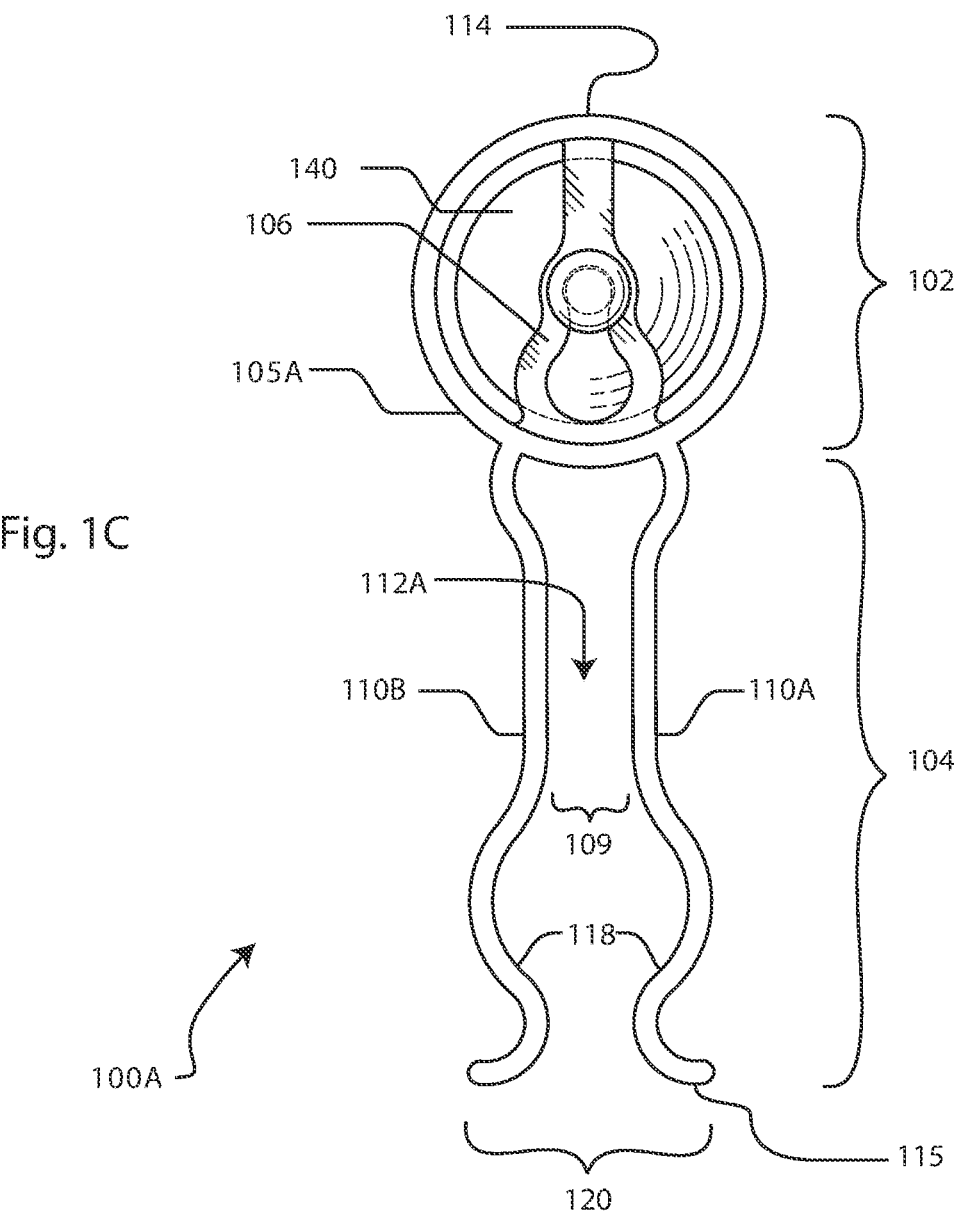
FIG. 1C is a top down view of the version in FIG. 1A.

FIG. 1A shows an example of the invention of the present disclosure, utensil holder 100A, attached to countertop 302 with a dish wand 200B suspended over sink 300. Referring now to FIG. 1C, holder 100A can be considered as a platform 105A with distal end 114 and proximal end 115. Adjacent the distal end 114 is a securing portion 102 which (as shown for example in FIG. 1A) is secured to a horizontal surface surrounding the sink basin 301, such as a countertop 302 or sink lip (not shown). Further designated in FIG. 1C, adjacent the proximal end 115 is a holding portion 104 for holding a cleaning utensil 200B (as shown in FIG. 1A). The holding portion 104 of the platform 105A (as shown in FIG. 1C) can be cantilevered over the sink opening 301 (as shown in FIG. 1A). This holding portion 104 is configured for holding a utensil, as shown in FIG. 1A with the example of dish wand 200B.

As shown in FIG. 1C the holding portion 104 has a first arm 110A and a second arm 110B which help to define a void 112A. As shown in FIG. 3A and FIG. 3B the shape of this void 112A can be configured such that a portion of utensil 200B which is larger than a portion of the handle 208 is supported by one or more of the surrounding holder arms 110A and 110B. This void 112A can also be configured to retain a utensil by squeezing, such as with a sponge 200C, as shown in FIG. 4A and FIG. 4B and FIG. 4C.

FIG. 13A through FIG. 13D show holder 100F with intermediate crossbar 108F to limit the depth to which a utensil 200B can be inserted into the void 112A. FIG. 13B shows platform 105F and suction cup 140 of holder 100F. FIG. 15A through FIG. 15E show a split crossbar 108C. As particularly shown in FIG. 15D, said split crossbar facilitates separating arms 110A and 110B to create a larger void 112A and/or larger mouth of the void 113A as designated in FIG. 15B.

FIG. 1C shows narrowing 109 of the void 112A distal to the portion where a utensil such as a dish wand 200B parks (as shown for example in FIG. 3A and FIG. 3B). This narrowing 109 functions to limit how far a utensil such as a dish wand 200B can penetrate void 112A and assists in positioning the dish wand head 210 (shown in FIG. 1A) so as to drain into sink basin 301.

As shown for instance in FIG. 1C the shape of void 112A distal to narrowing 109 is configured to receive and retain other types of utensils such as a sponge 200C (as shown in FIG. 4A, FIG. 4B and FIG. 4C) or scrubbing pad 200D (as shown in FIG. 7A through 7D).

Figure 14A:
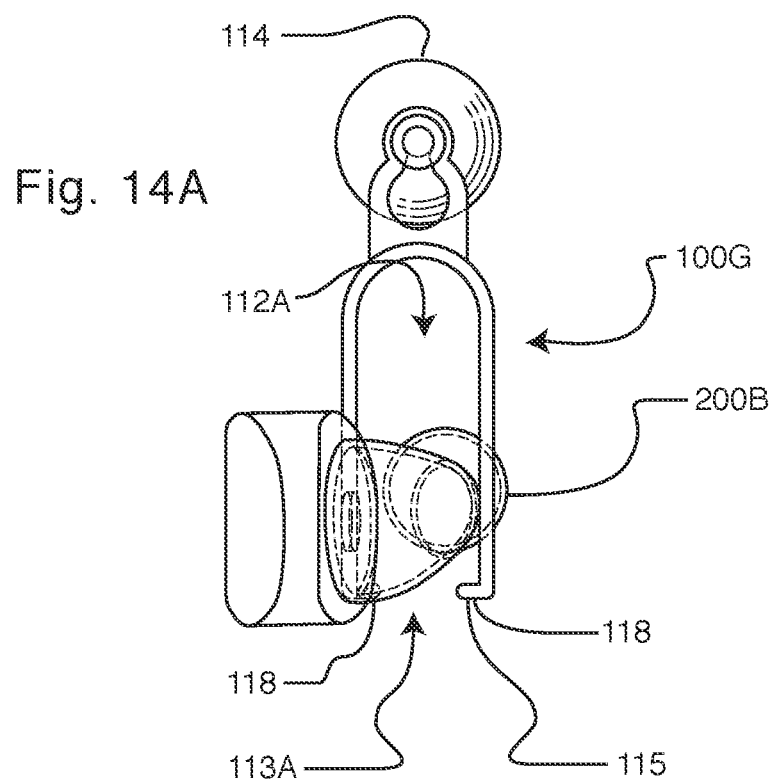
FIG. 14A is a top down view of version 100H further showing a dish wand 200B in an alternate orientation.
Figure 14B:
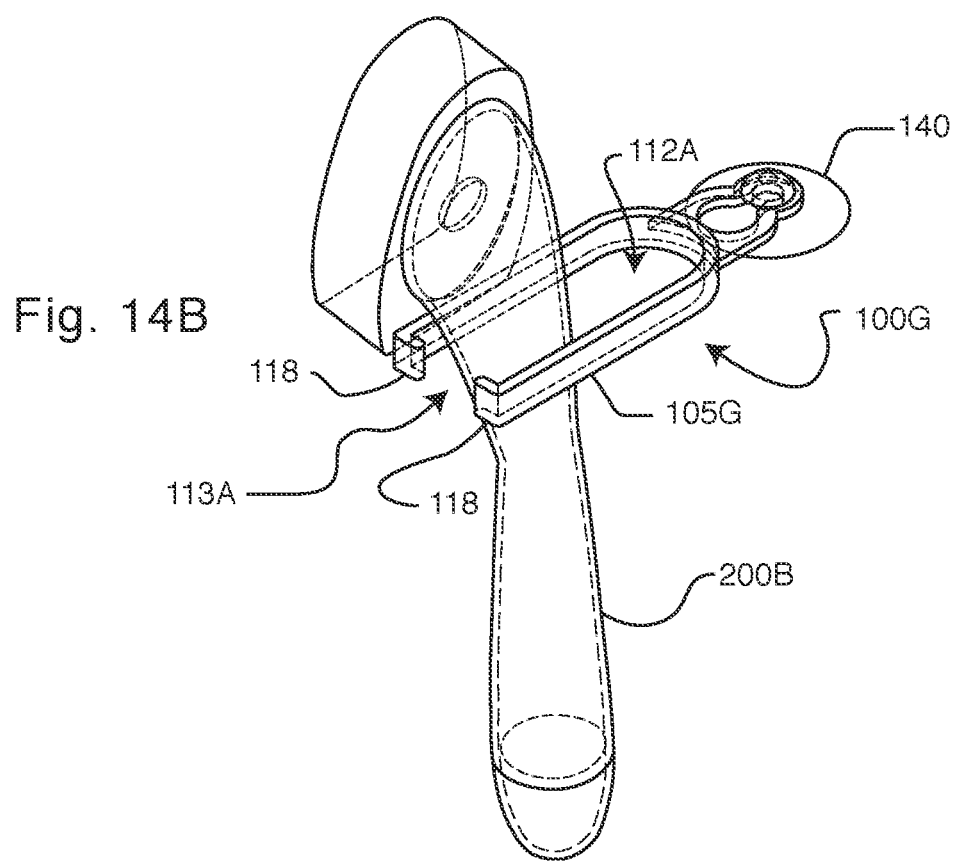
FIG. 14B is a perspective view of FIG. 14A.

As shown in FIG. 3A and FIG. 3B, if desired, void 112A can be defined with a narrowing at the mouth 118 of void 112A of holder 100A so as to surround more than half of handle 208 to more effectively retain utensil 200B. FIG. 14A and FIG. 14B also show a variation in holder 100G with a narrowing of mouth 118 of void 112A. FIG. 14B shows platform 105G and suction cup 140 of holder 100G. FIG. 15A through FIG. 15E show another holder version 100H which has, as designated in FIG. 15A, both a narrowing of the mouth 118 combined with a funnel 120 to facilitate both insertion, retention, and removal of utensil 200B (shown in FIG. 15B).

Figure 15A:
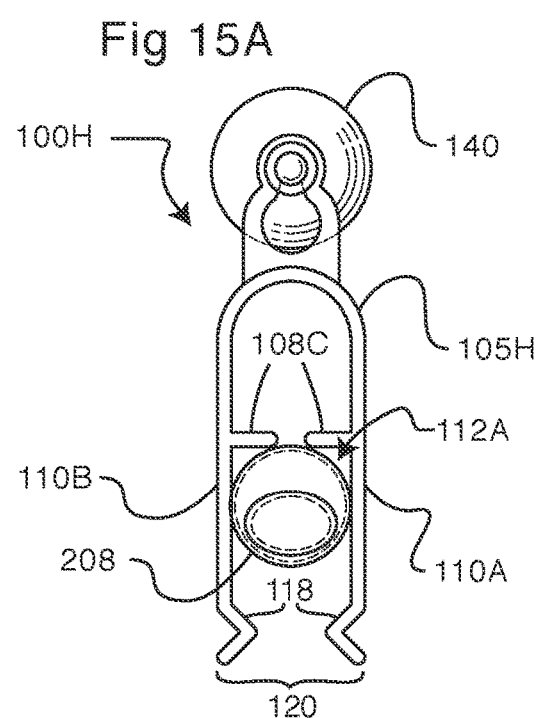
FIG. 15A is a top down section view along line H-H of FIG. 15B.
Figure 15B:
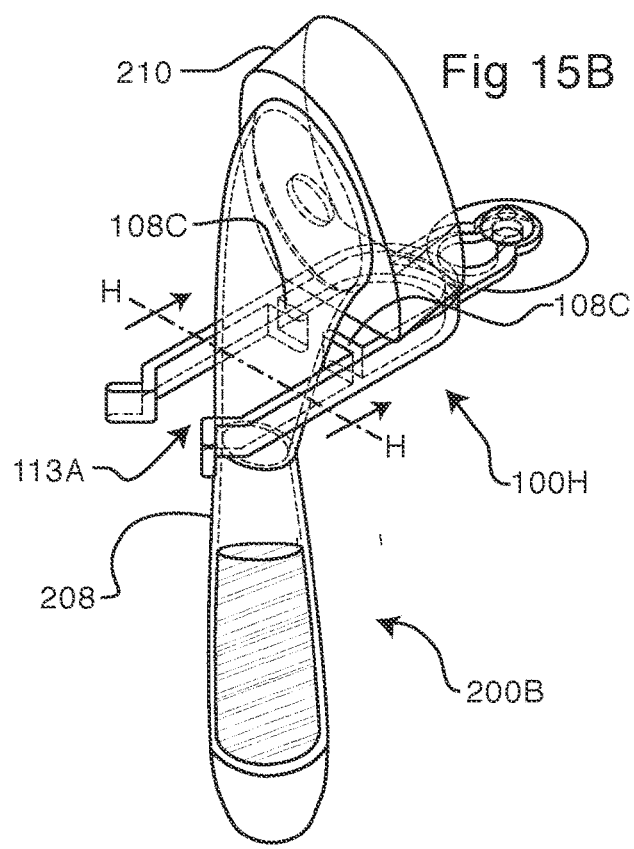
FIG. 15B is a perspective view of version 100H showing hidden lines.

FIG. 15A shows platform 105H and suction cup 140 of holder 100H. FIG. 15A further shows split crossbar 108C. Also shown is a narrowing of mouth 118 of void 112A and a funnel 120. FIG. 15B shows utensil 200B held by holder 100H.

Figure 15C:
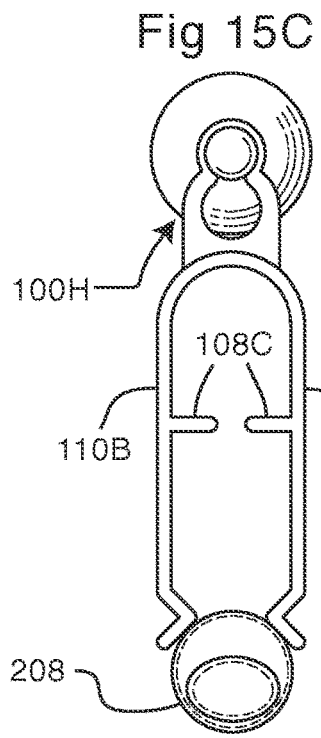
FIG. 15C is a top down section view along line H-H of FIG. 15B with utensil 200B's handle contacting funnel 120.
Figure 15D:
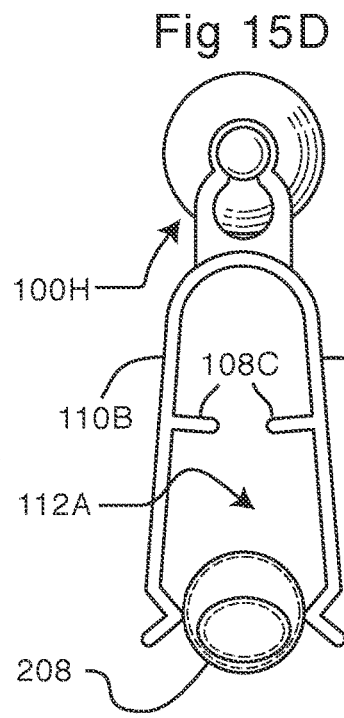
FIG. 15D is a top down section view along line H-H of FIG. 15B with utensil 200B's opening funnel 120.
Figure 15E:
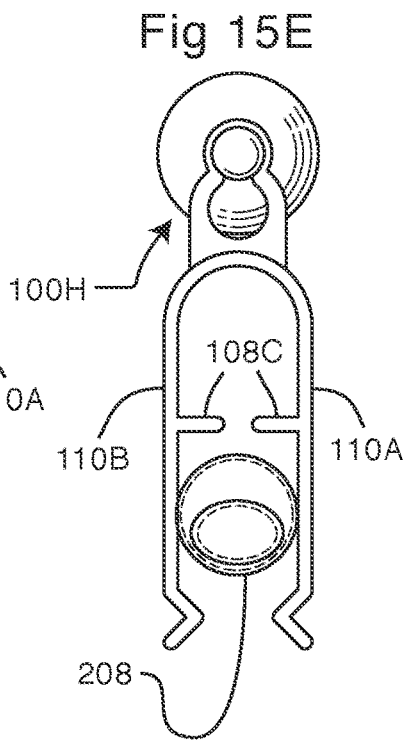
FIG. 15E is a top down section view along line H-H of FIG. 15B with utensil 200B inserted into holder 100H.

Referring now to FIG. 15C through FIG. 15E (which are section views along lines H-H of FIG. 15B) showing the opening and closing of the holder arms 110A and 110B to receive and retain said utensil 200B (as designated in FIG. 15B), as represented by utensil handle portion 208.

FIG. 15C shows a section of a utensil handle 208 contacting the funnel opening 120 (designated in FIG. 15A). FIG. 15D shows arms 110A and 110B spreading to allow utensil handle 208 to enter void 112A. FIG. 15D also shows a split crossbar 108C which allows the arms 110A and 110B to spread while inserting handle 208. As shown in FIG. 15D arms 110A and 110B can have a spring action which allows them to deflect outwards when inserting or removing utensil handle 208. As shown in FIG. 15B split crossbar 108C can limit how far handle 208 can enter thus helping to position utensil head 210. As shown in FIG. 15E holder 100H retains utensil handle 208 after insertion partly because arms 110A and 110B snap back and return more or less to their default shape and position (as shown in FIG. 15C).

While FIG. 15D shows basically the entirety of arms 110A and 110B bending, shown in FIG. 13B is a solid intermediate crossbar 108F which limits the flexing of arms 110A and 110B to the portion of said arms from said crossbar to their proximal end 115 said flexing enlarging mouth of void 113A. The position of intermediate crossbar 108F is presented as an example of one position said crossbar can occupy vis a vis distal end 115. The amount or strength of spring action in example holder 100F can be regulated by positioning intermediate crossbar 108F further from or closer to distal end 115 (or by eliminating intermediate crossbar 108F entirely as shown in FIG. 10A, FIG. 10B and FIG. 10C).

Figure 36A:
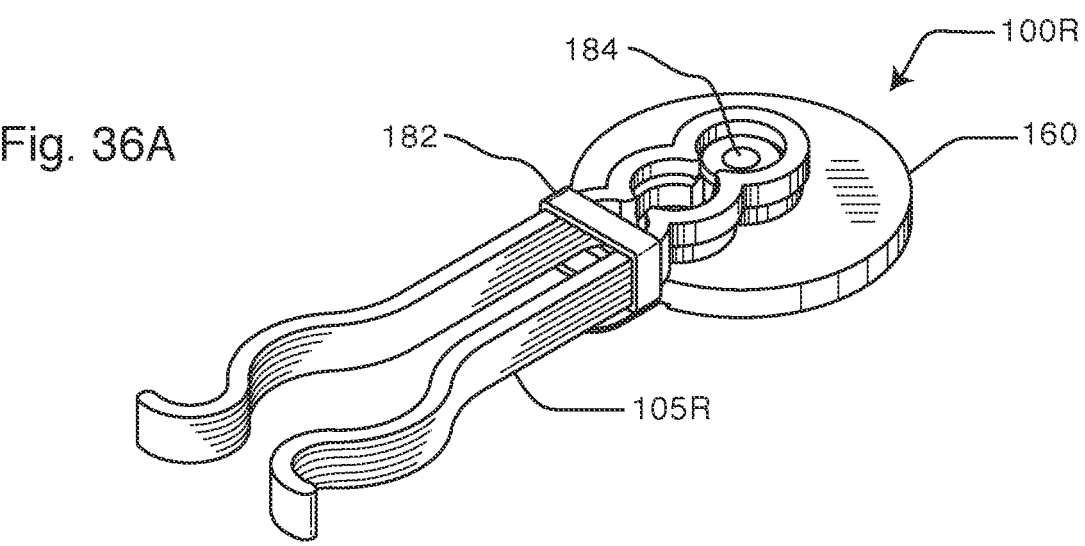
FIG. 36A is a perspective view of holder 100R.
Figure 36B:
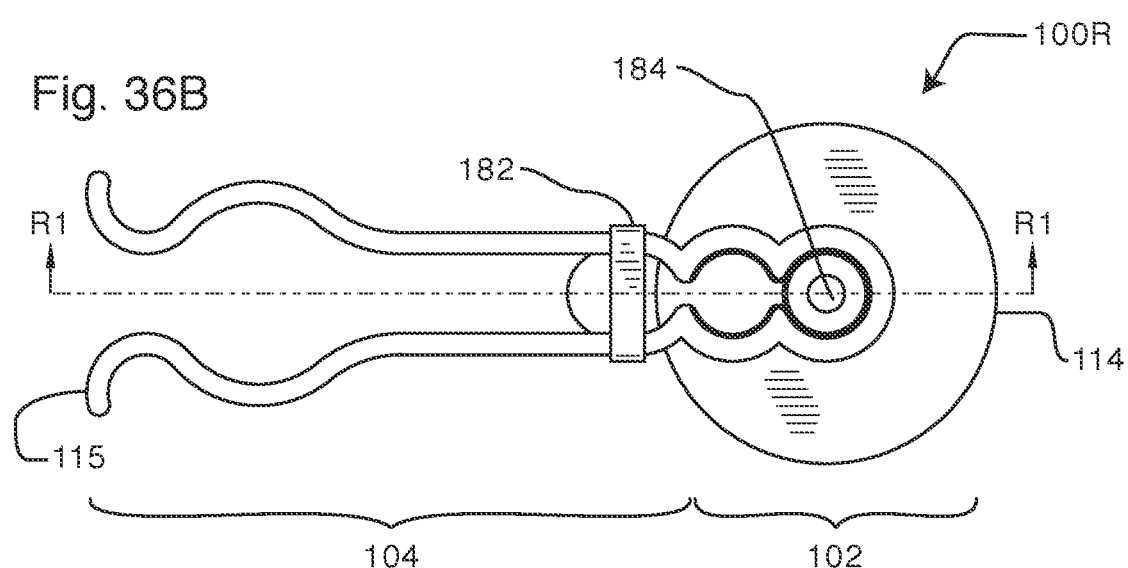
FIG. 36B is a top down view of holder 100R.
Figure 36C:
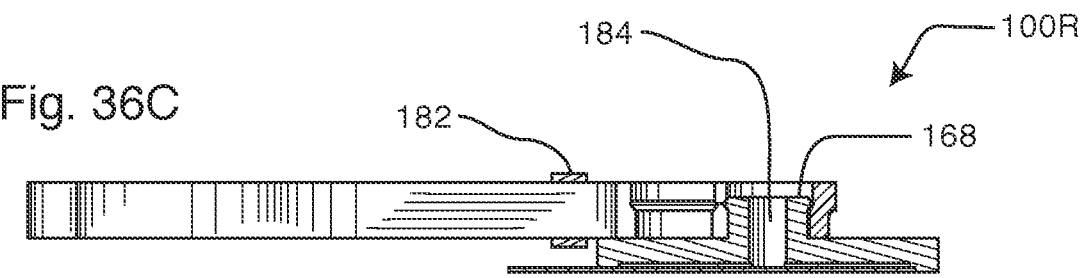
FIG. 36C is a side section view of holder 100R along lines R1-R1 from FIG. 36B.
Figure 37A:
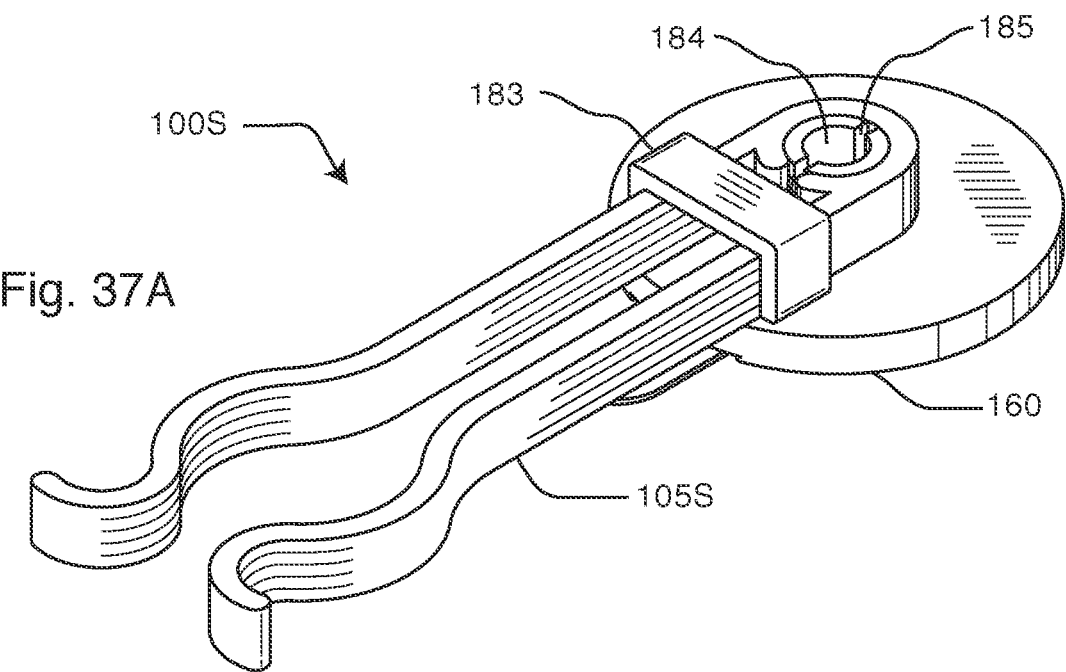
FIG. 37A is a perspective view of holder 100S.
Figure 37B:
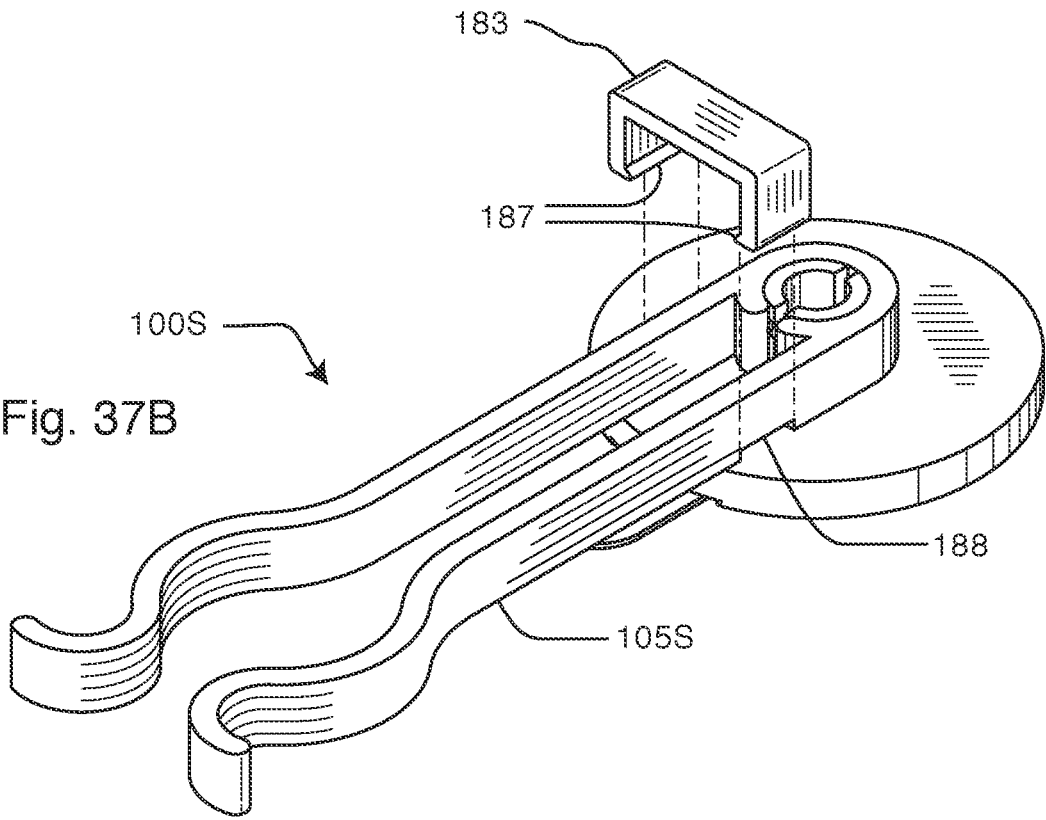
FIG. 37B is a perspective exploded view of holder 100S.
Figure 38A:
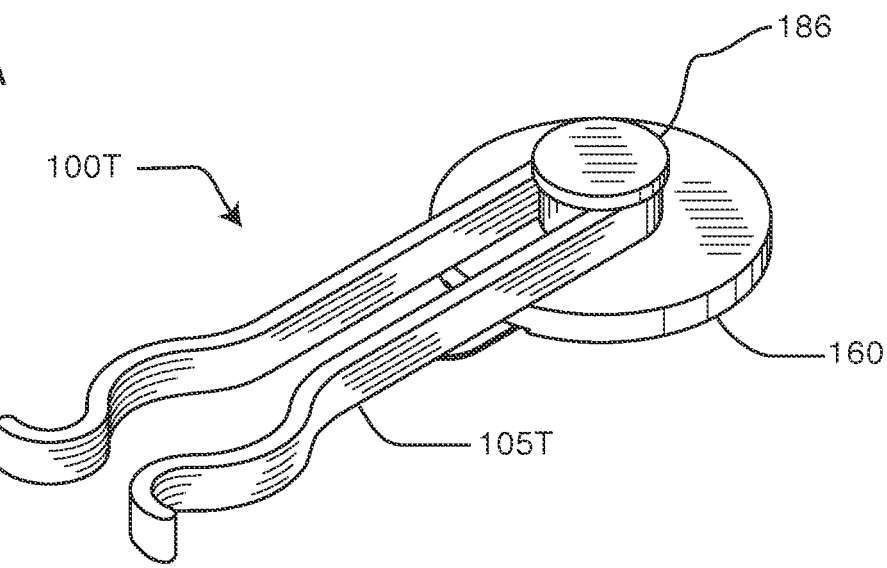
FIG. 38A is a perspective view of holder 100T.
Figure 38B:
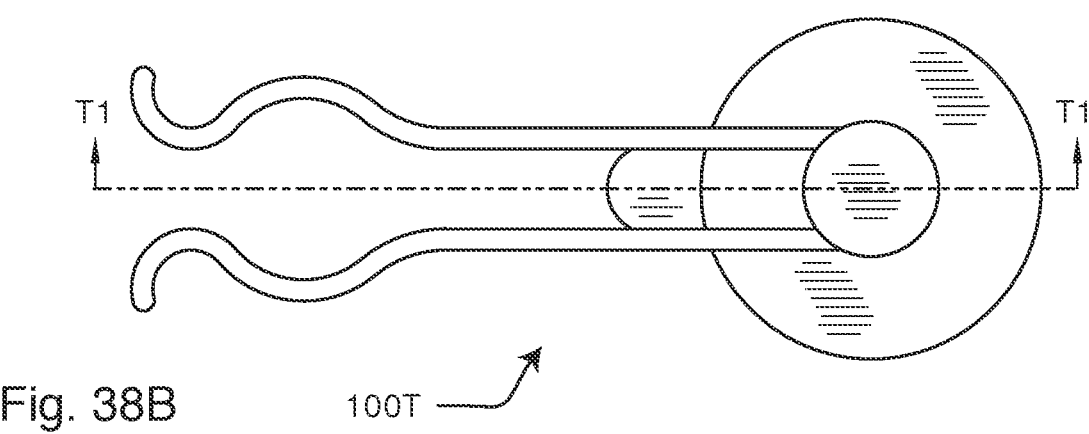
FIG. 38B is a top down view of holder 100T.
Figure 38C:
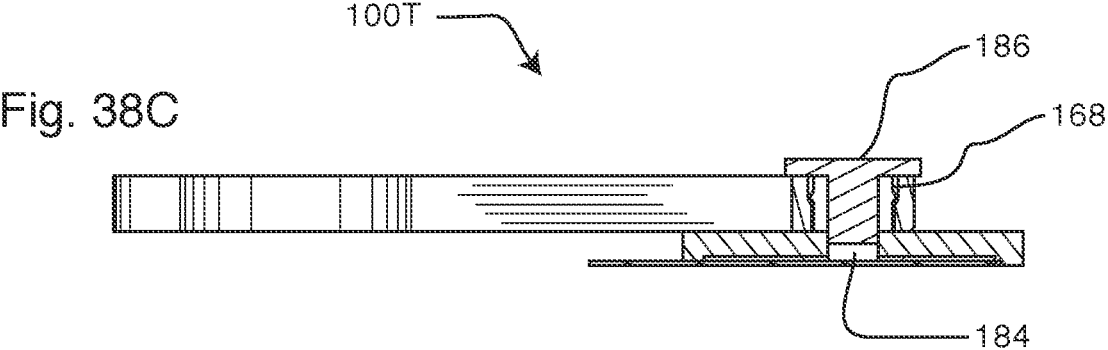
FIG. 38C is a side section view of holder 100T along lines T1-T1 from FIG. 38B.
Figure 40A:
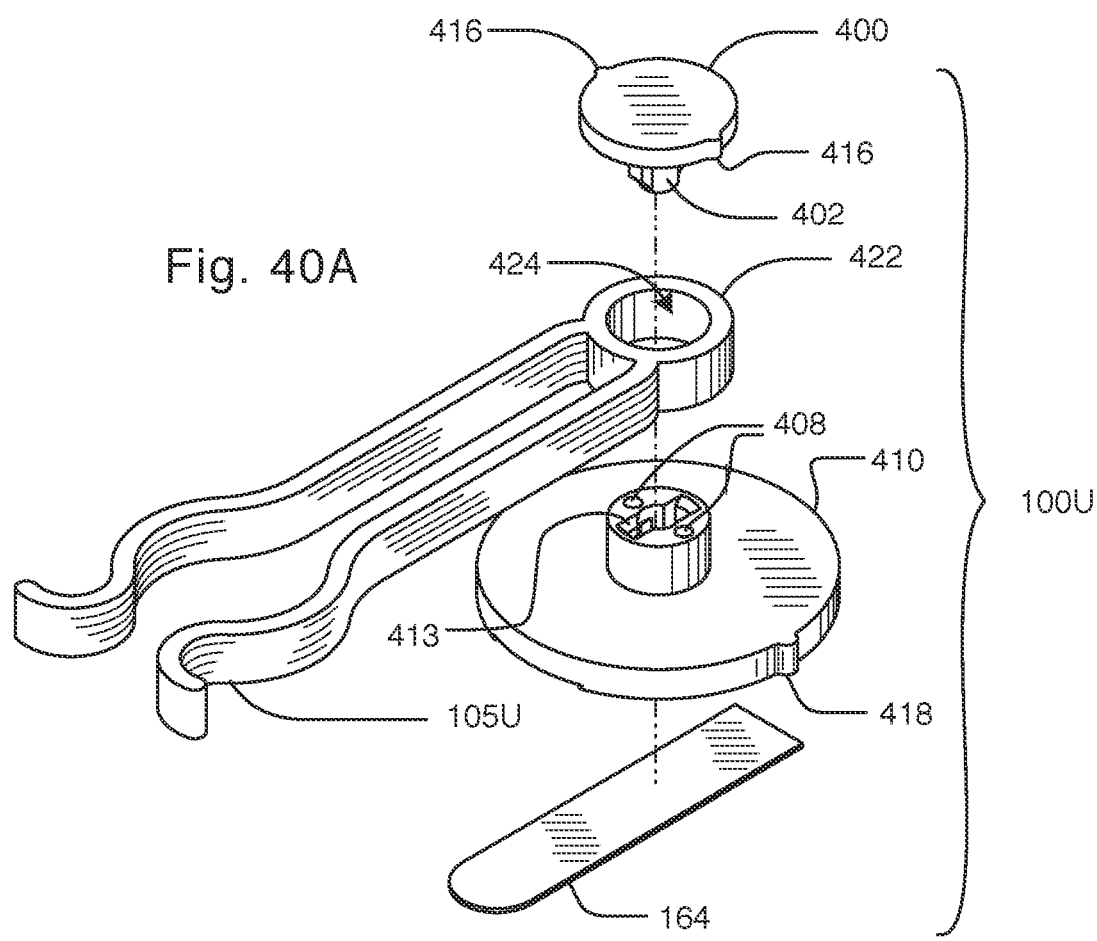
Figure 40B:
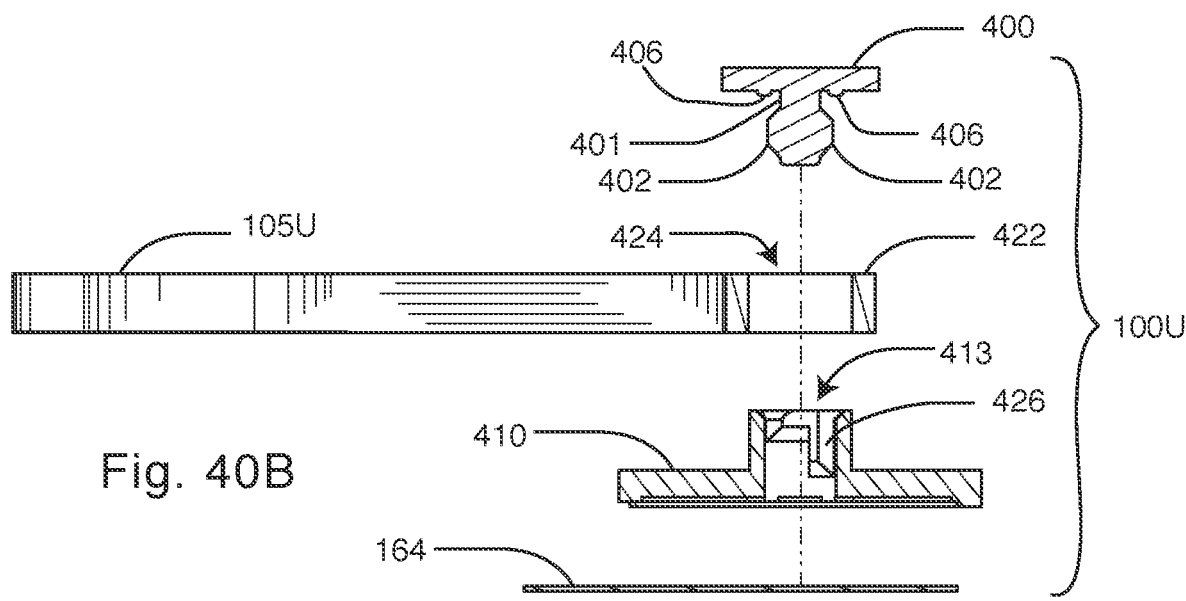
Figure 41A:
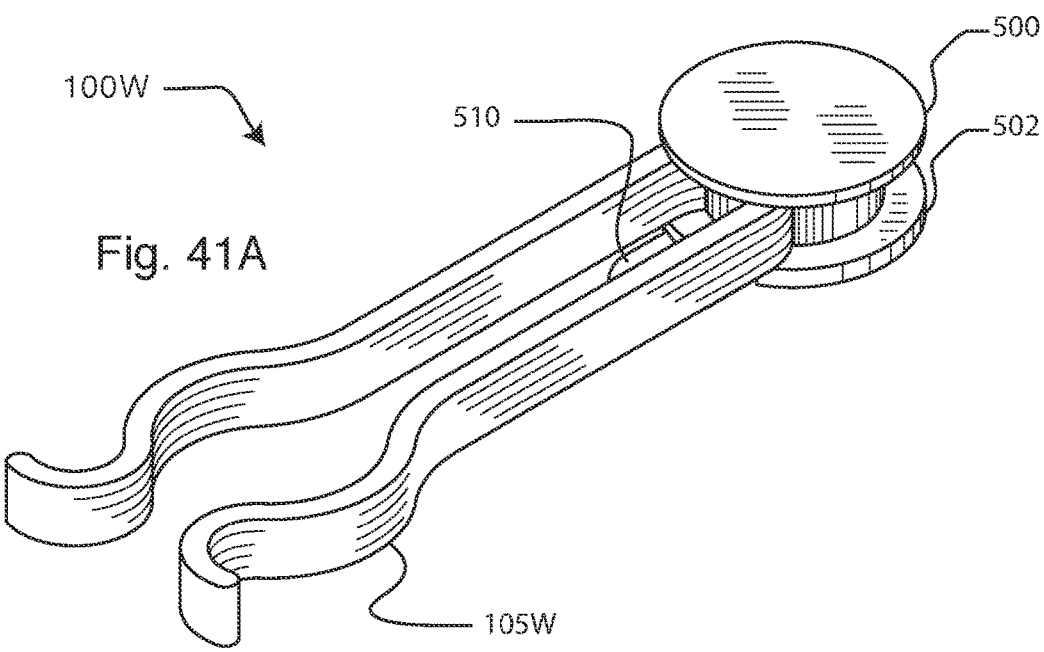
Figure 41B:
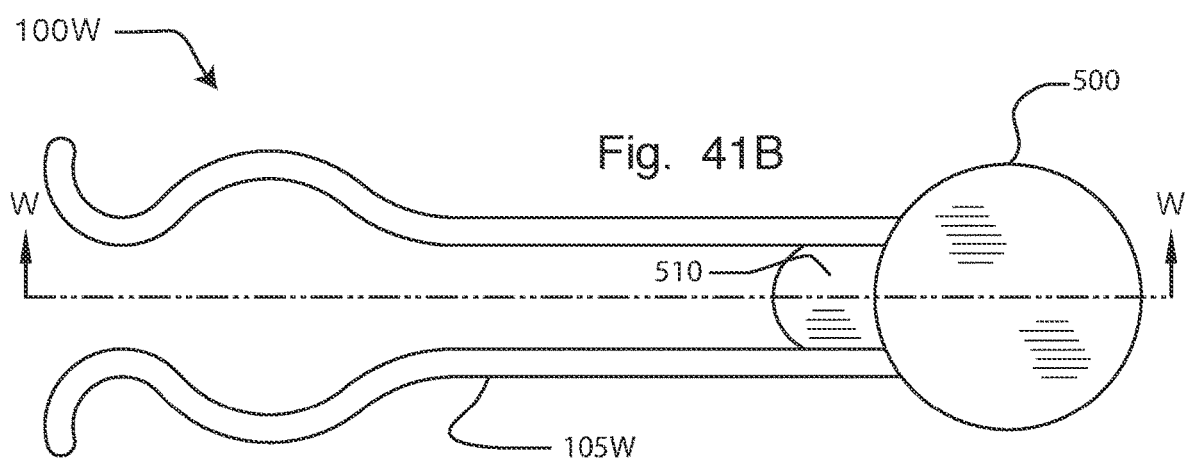
Figure 41C:
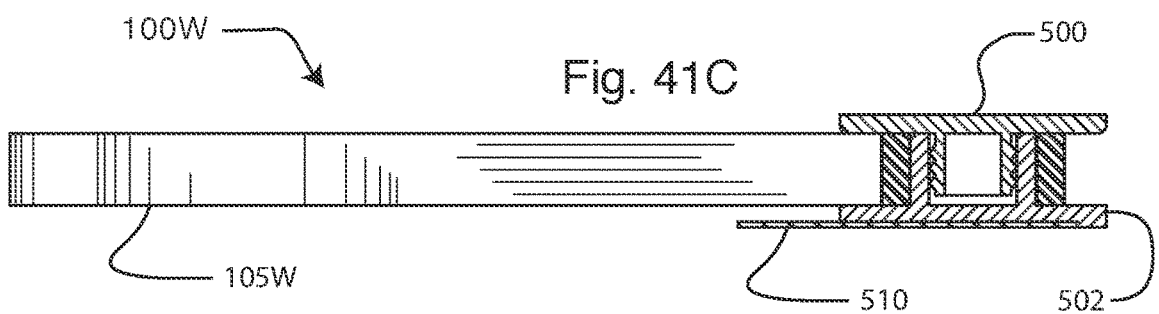

FIG. 36A, FIG. 36B and FIG. 36C show holder 100R with the optional addition of elastic band 182. This is an example of how to augment the amount or strength of the spring action which can be augmented, for example, by an elastic band or clip placed around platform 105R where the holding portion 104 and securing portion 102 meet or nearer to proximal end 115. Another example is shown in FIG. 37A and FIG. 37B where a clip 183 snaps over main platform 105S with snaps 187 mating with recesses 188. Such methods can also serve to increase the grip of main body 105S around post 168.

As shown in FIG. 15A through FIG. 15E, the opening can be funnel shaped, facilitating entry of the utensil handle 208 into the holding portion 104 (shown in FIG. 1C). This function is also included in several of the drawings in this document without being designated, for instance, FIG. 1C shows and designates funnel 120 whereas FIG. 18B does not specifically designate a funnel though it is shown. Referring now to FIG. 15D which shows how the design allows the holder arms 110A and 110B to flex apart allowing the utensil handle 208 to gradually enter void 112A. As shown in FIG. 15E subsequent to the handle 208 passing the opening 113A (designated in FIG. 15B), the holder arms 110A and 110B return to their default position to retain utensil handle 208 in holder 100H.

As shown in FIG. 15C and FIG. 15D when passing narrowing of mouth 118 (as designated in FIG. 15A) there is a tactile quality experienced which allows the user to be aware of where they are in the process of insertion, parking and removal. In other words, the user gets continual haptic feedback. This means less attention is demanded and one can better concentrate on the greater task at hand.

A holder such as described in the present disclosure is also more convenient because it does not require much care or attention to park or retrieve the utensil when compared with holders which require the user to hook the utensil head onto some sort of catch (not shown). When trying to place a utensil onto such a catch there can be contact bounce so the utensil jumps back out. The present invention's holder such as holder 100A in FIG. 1A and 100H in FIG. 15A can anticipate such contact bounce by snapping shut to limit the utensil's motion after it is snapped into holder arms 110A and 110B.

FIG. 1C shows such a funnel 120 which also incorporates a narrowing of the mouth 118 to enable entry, retention and removal of a utensil (not shown). Such a retained utensil 200B is shown in a sideways orientation in FIG. 3A and FIG. 3B.

Also, one wants to be able to quickly and easily store and retrieve a utensil. As shown in FIG. 15A through FIG. 15E, the present invention's design allows the user to horizontally insert and remove the utensil 200B (as particularly shown in FIG. 15B) orthogonally without having to deal with a catch or guiding the handle into a closed opening from above. In other words, one simply pushes the utensil handle 208 in, lets go and the utensil 200B is parked. Similarly, to remove utensil 200B the user simply grabs the handle 208, pulls and is ready to work. This means one can park and remove the utensil 200B with the handle 208 and head 210 in the orientation the user prefers for use (as particularly shown in FIG. 15B and FIG. 14B). This saves time, effort and mental calculation (such as thinking about where to put said utensil, positioning it or searching for it). Further, the present invention allows the user to deposit a utensil in multiple different ways, for instance in a horizontal motion or a top down vertical motion as the user desires.

Figure 2A:
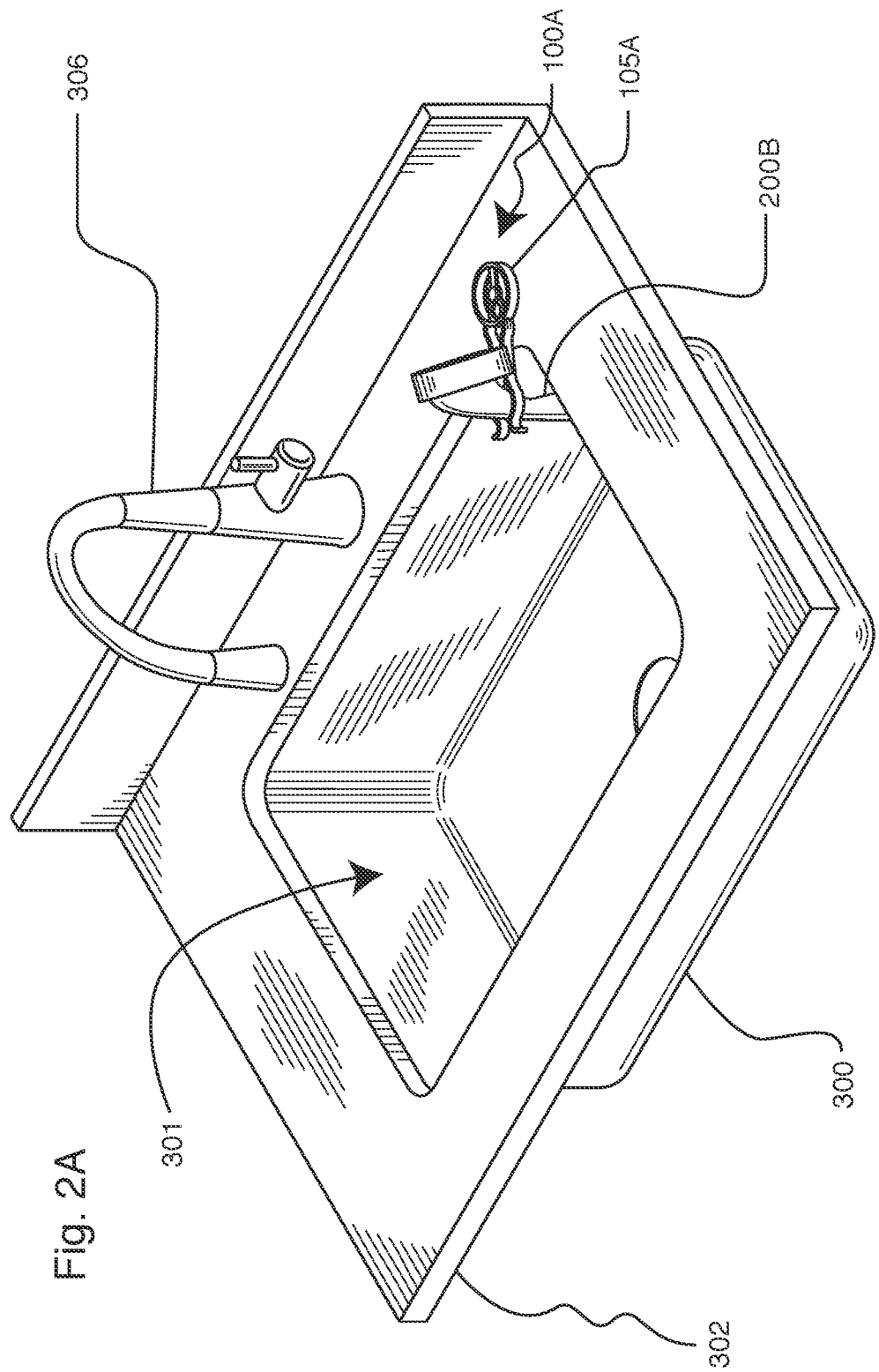
FIG. 2A is a perspective view of a sink with utensil holder 100A and the utensil 200B of FIG. 1A.
Figure 7A:
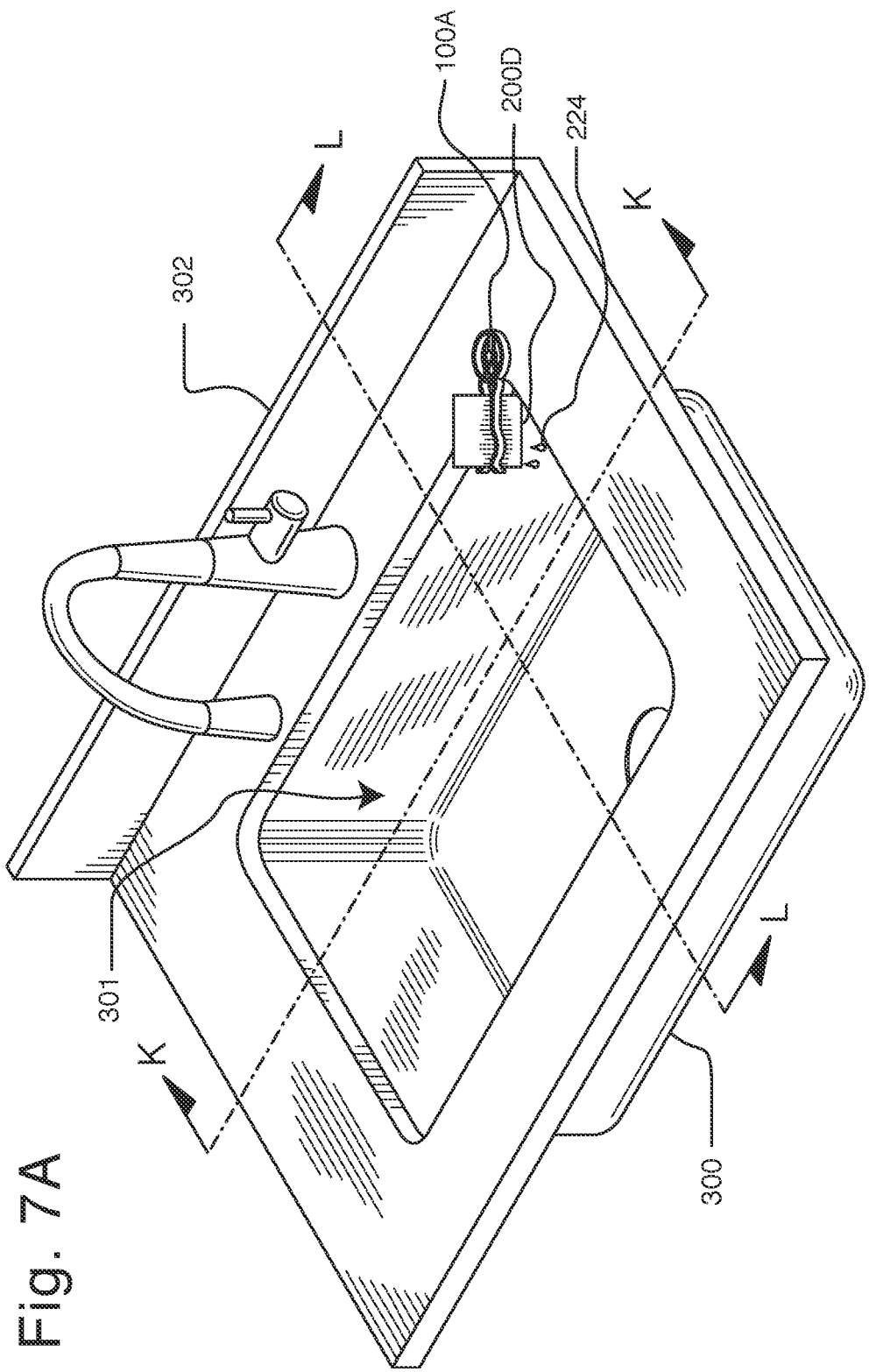
FIG. 7A is a perspective view of embodiment 100A with a scrubbing pad 200D.

As sinks are used in various ways for sundry tasks, it is preferable for a hanger to be out of the way when, for instance, washing a large pot or shampooing one's hair. Anything, such as baskets or hangers, which remains in or over the sink basin area 301 (as shown in FIG. 2A and FIG. 2B), can compete for the limited work space available.

As shown in FIG. 6A and FIG. 6B, the present invention (showing for example the version of holder 100A) can include the ability to swivel platform 105A so as to be located out-of-the-way, for example over the countertop 302 as opposed to obscuring the sink basin 301.

FIG. 19B shows a hole 314 in countertop 302. A sink 300 or countertop 302 usually have one or more holes 314 in them for installing items such as a faucet 306 (as shown in FIG. 2A), sprayer or soap dispenser (not shown). Sometimes three holes are allowed for a faucet, but one may choose to install a faucet which only utilizes two of those holes which results in an un-used hole. Such a hole can be filled with a cap, but it can be utilized for other functions, such as a hand cream or soap dispenser. There are also existing escutcheons 310 with accompanying escutcheon nuts 312 which are usually used with sprayers. Having more choices of useful items to fill such un-used holes is desirable.

FIG. 18A through FIG. 18D show holder 100B with platform 105B which interacts cooperatively with escutcheon 310 and its accompanying escutcheon nut 312. Holder extension 124 is simply placed into the escutcheon 310 and held by a friction fit. Subsequently the holder 100B can be pivoted according to the user's needs. Although holder 100B is configured for a dish wand 200B (as shown in FIG. 17), it can be configured for a variety of utensils which are not shown.

Figure 20A:
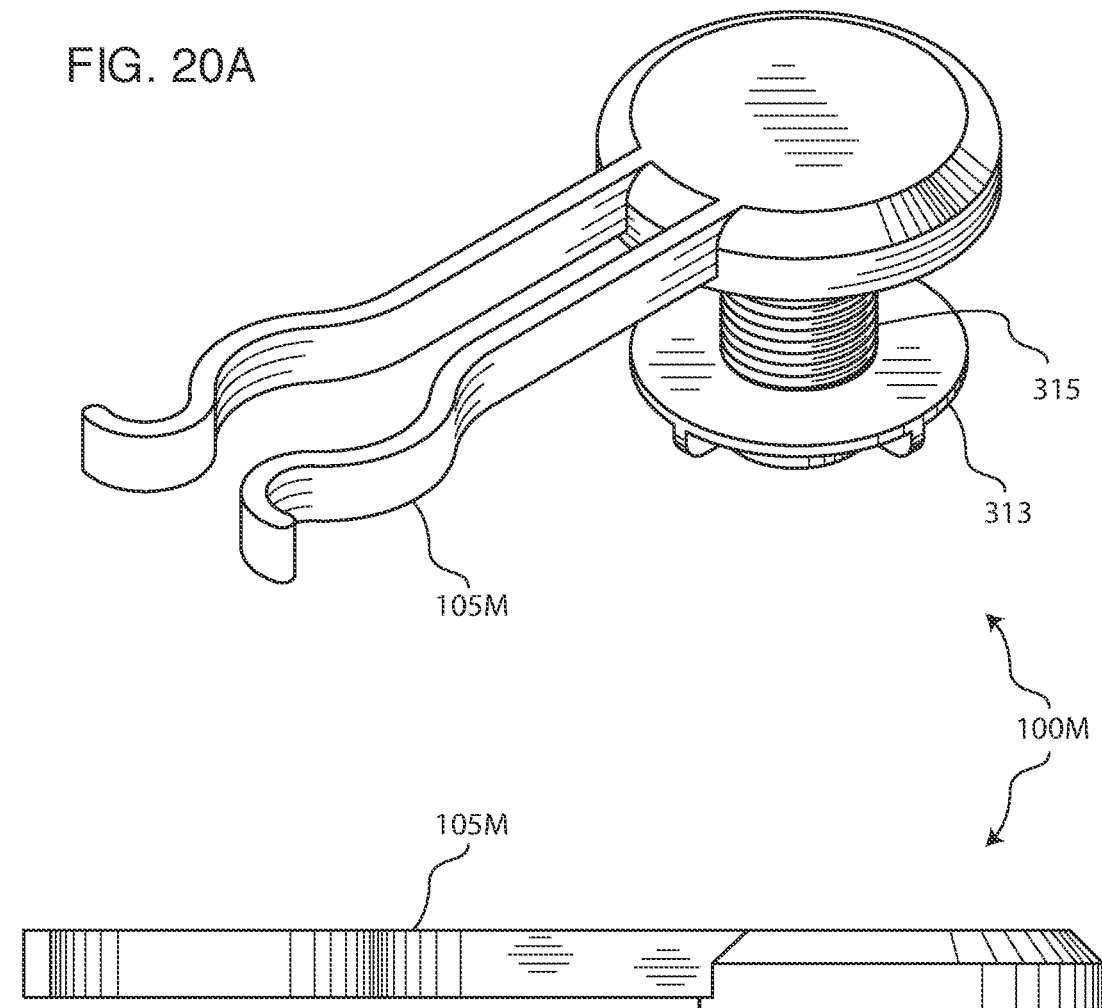
FIG. 20A is a perspective view of utensil holder 100M.
Figure 20B:
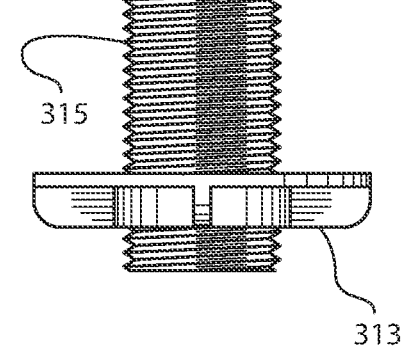
FIG. 20B is a side view of utensil holder 100M.

Shown in FIG. 20A and FIG. 20B is an embodiment of holder 100M wherein the platform 105M includes a threaded portion 315 and nut 313. This configuration is presented to show one of many possible variations in design which can be imagined within the scope of the invention of this disclosure.

FIG. 10C shows securing portion 102, holding portion 104, distal end 114 and proximal end 115 of holder 100D. Although FIG. 1C and FIG. 10C both show the securing portion 102 being secured with a suction cup 140, they could be secured by other means such as Velcro™ or temporary or permanent adhesive strips as shown, for example, in FIG. 26B showing holder 100K. Alternatively, as shown in FIG. 19B holder 100B can be secured by an extension 124 which cooperatively interacts with hole 314 in an adjacent horizontal surface, such as countertop 302.

A countertop 302 or sink 300 can have a smooth or textured surface which can affect the choice of securing means. While a suction cup 140, such as is shown in FIG. 1B, is an economical and effective choice for smooth, non-porous surfaces, other means can accommodate non-smooth surfaces. For instance, as shown for example in FIG. 22B the present invention can have a center core extension 124 which fits into a hole 314 in the countertop 302 or sink 300. Two other examples of alternative attachment means are removable adhesives such as 3M Command Strips™ (as shown, for example, in FIG. 26B showing holder 100K) or various types of Velcro™ (not shown). Less convenient, perhaps, would be means such as using a bolt or screw to secure the invention of this disclosure to a generally horizontal surface (not shown). Also, the invention can be designed to cooperatively interact with existing functional apparatus, such as soap dispensers (not shown).

An advantage with some of these arrangements, such as is shown in FIG. 5C with a suction cup 140, is the ability to swivel platform 105A with the pivot being the center knob 142 said swiveling being shown in one position in FIG. 2A and FIG. 2C and alternately positioned in FIG. 6A and FIG. 6B. Such swiveling allows the user to choose a multitude of various orientations for the holding portion 104 (designated in FIG. 1C) without having to remove and re-secure the entire platform 105A. As shown in FIG. 6A and FIG. 6B swiveling also allows the user to remove the utensil such as dish wand 200B (not shown) and then position the platform 105A so it is not extending into the sink opening 301 allowing the user complete and unfettered access to sink basin 301.

Figure 16A:
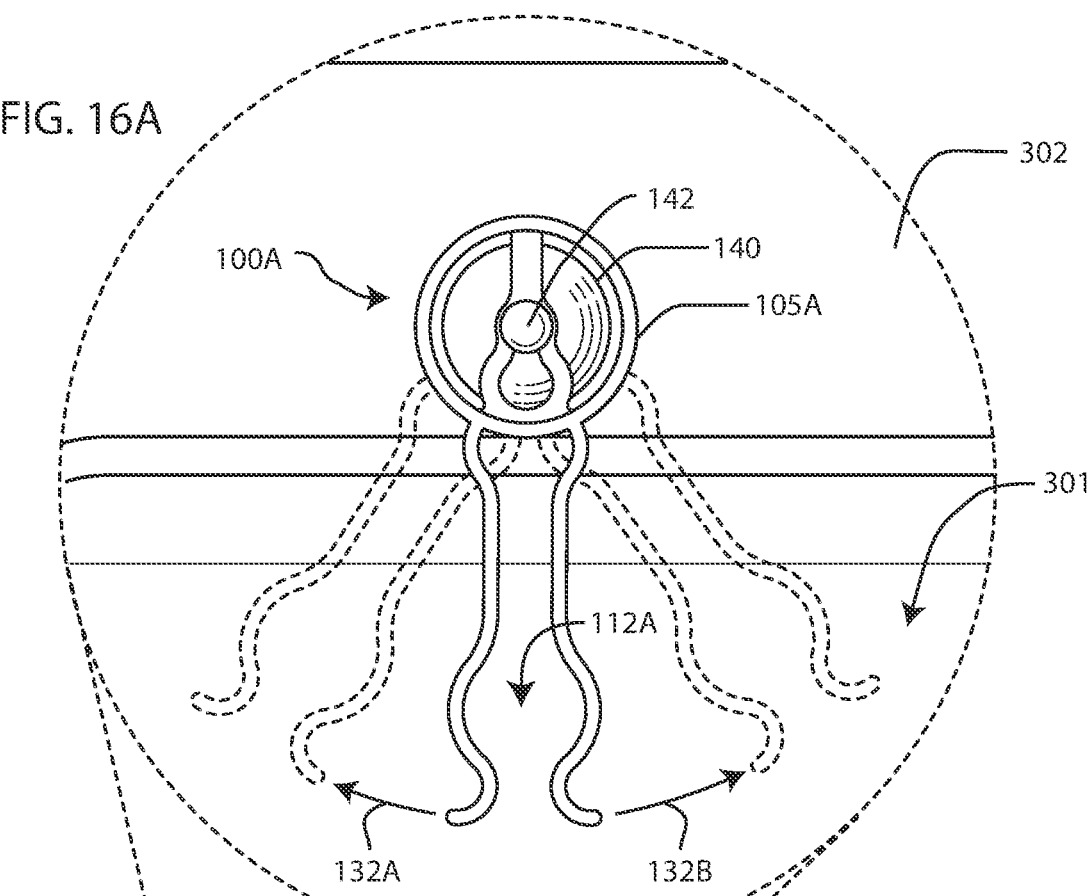
FIG. 16A is a magnified partial view of FIG. 16B.
Figure 16B:
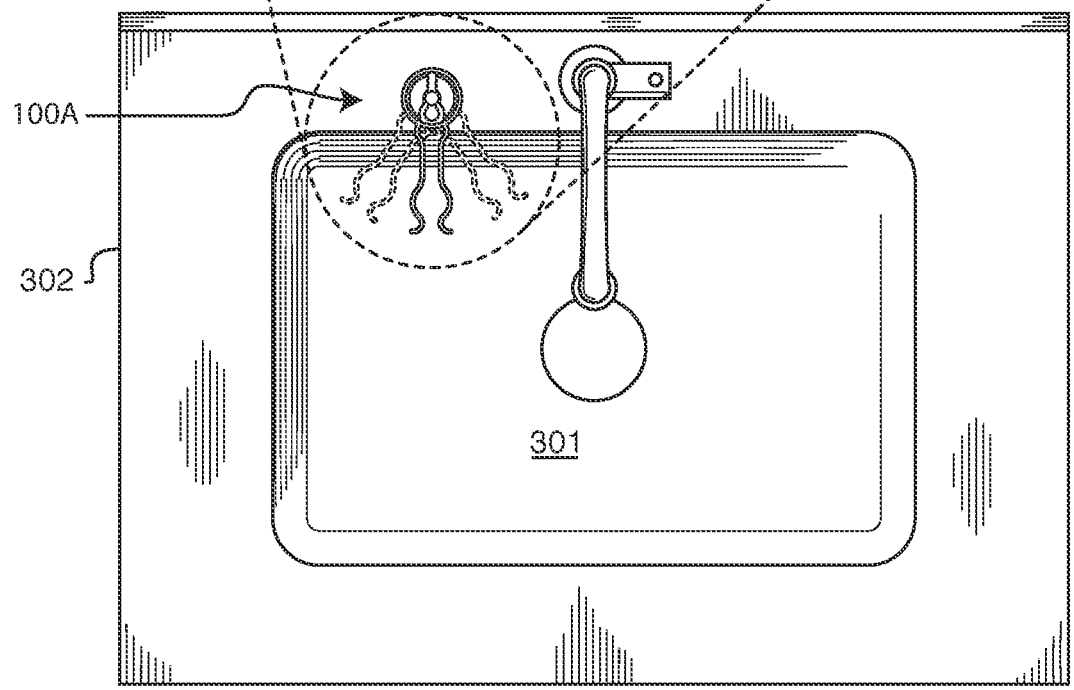
FIG. 16B is a top down view of holder 100A with phantom lines indicating swiveled positions.

Additionally, as particularly shown in FIG. 16A (which is a magnified partial view of FIG. 16B) this allows swiveling the platform 105A of holders such as holder 100A to be moved from side to side in directions indicated by clockwise arrow 132A and anti-clockwise arrow 132B to reposition void 112A as desired. The two phantom outlines and one solid outline of platform 105A indicate three possible positions, but it is understood many other positions can be achieved which are not shown.

Further, as shown in FIG. 1A and FIG. 3A, many utensils such as dish wand 200B can be inserted and retained in many orientations, thus freeing the user from having to conform to some artificial or awkward restrictions.

FIG. 5C shows a section view of FIG. 5B along section lines G-G with suction cup 140 and platform 105A in their default, unattached positions.

Referring now to FIG. 5A through FIG. 5F, in some configurations the suction power of the suction cup 140 can be increased by exerting an upward force 152 to pull up on suction cup knob 142 after attachment. In normal use one places a suction cup, such as suction cup 140, against a flat, non-porous surface (such as countertop 302 shown in FIG. 1A) and presses down with downward force 150 on knob 142 which in turn presses down on post 146 which in turn presses down on disc 144 to force out the air from space 148 under the disc 144. This results in a lower pressure area (also known as a "partial vacuum") beneath the cup disc 144 in space 148 which is in turn acted upon by the higher surrounding ambient air pressure and the result of this combination is the accepted explanation for a suction cup's holding power.

Upon release of knob 142 the "memory" of the rubber disc 144 causes it to want to return to its former, natural, expanded shape thus contributing to upward force 152.

Concurrently, as particularly shown in FIG. 5D, when pressing down knob 142 suction cup connector 106 can be deformed downward and, when released, wants to return to its original shape which contributes to upward force 152. Such an upward force 152, by pulling on disc 144 via post 146 and knob 142 results in an expansion of the volume of space 148 under disc 144 and thus creating an even lower pressure in space 148 and thus greater holding power.

Referring now to FIG. 5C, FIG. 5D, FIG. 5E and FIG. 5F, in use one realizes this additional suction power by simply pressing down on the suction cup knob 142 hard enough to deflect the suction cup connector 106 downward. At the same time one can separately press out additional air from the suction cup disc 144, for instance by rubbing the suction cup disk 144 with one's fingertip (not shown). Then one simply removes the downward pressure and the partial vacuum should increase proportionally to the upward deflection of the suction cup connector 106.

An additional variation is to have suction cup disc 144 extend below the bottom of platform 105A so that when the disc is set down it compresses slightly, even without being pressed via knob 142, to be more nearly even with the bottom of platform 105A which gives it a "head start" to allow it to be more fully compressed when knob 142 is depressed (not shown).

An additional novel effect (not shown) is produced when a utensil is placed in the cantilevered holder as it tends to produce a "see-saw" leveraging effect where the proximal end is pulled down by gravity which in turn pulls up on the distal end (the fulcrum being where the holder contacts the counter in-between). As noted elsewhere in this disclosure such an upward force can actually increase the attachment power of a suction cup. At first glance an observer might incorrectly assume the opposite, being misled by "common sense" to believe that the weight of the utensil would tend to pull the suction cup off.

One can utilize other types of suction devices such as a lever- or snap-type activated suction cup or other mechanisms known to those skilled in the art. Lever- or snap-lock levers pre-load the cup with the mechanism of the snap device, resulting in a greater pressure differential between the outside and underside of the suction cup. FIG. 31A shows a perspective view of a lever-lock-type embodiment of holder 100P in a locked position. FIG. 31B shows a top down view with lines P1-P1. FIG. 31C is a section view along lines P1-P1 showing how main body 105P acts as a lever cam to pull up on suction cup with post 193 by pressing down on bell housing 195 pivoting on pin 191 which is in pinhole 194. FIG. 32A shows a perspective view of holder 100P in an unlocked position. FIG. 32B is a front view showing section lines P2-P2. FIG. 32C is a section view along lines P2-P2 which shows how the main body 105P no longer contacts the top of the bell housing 195 so the suction cup 192 can drop down.

Figure 33A:
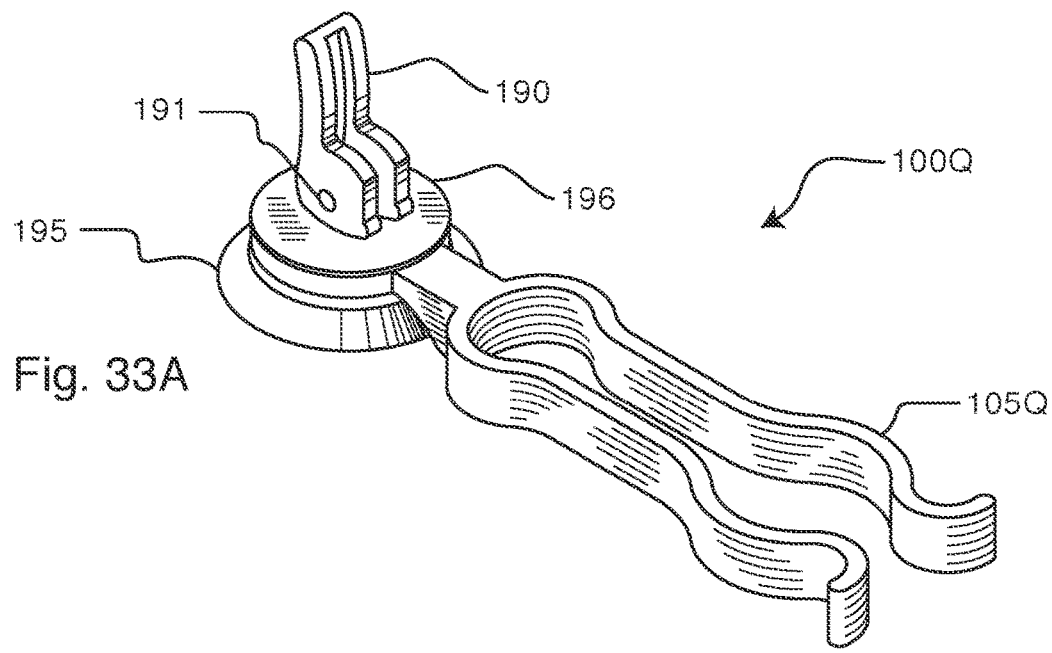
FIG. 33A is a perspective view of holder 100Q in unlocked position.
Figure 33B:
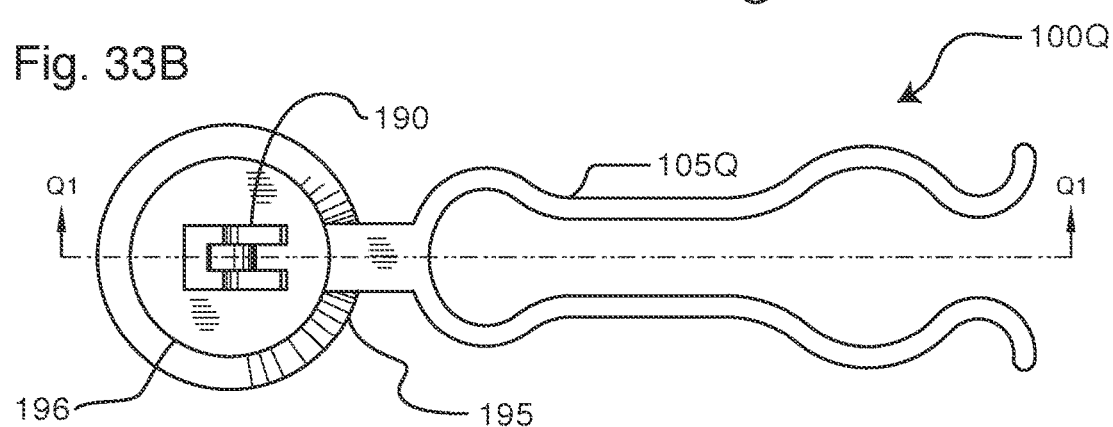
FIG. 33B is a top down view of holder 100Q in unlocked position.
Figure 33C:
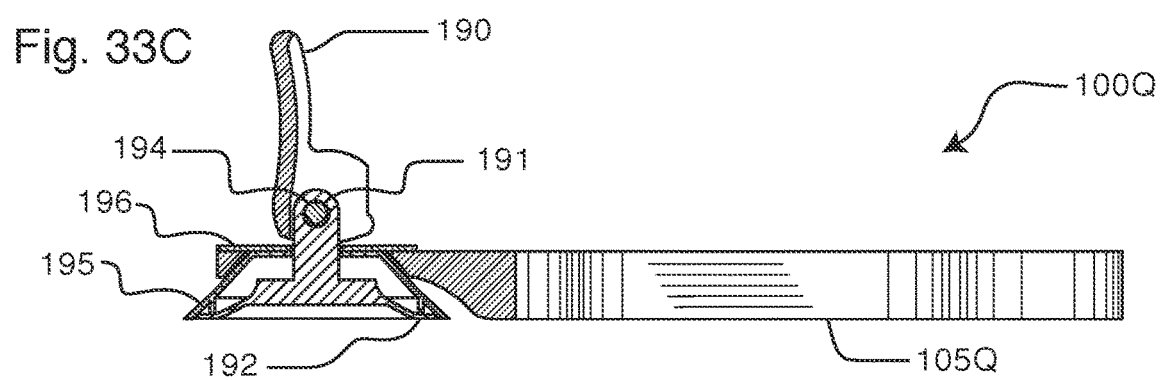
FIG. 33C is a side section view of holder 100Q along lines Q1-Q1 from FIG. 40B.
Figure 34A:
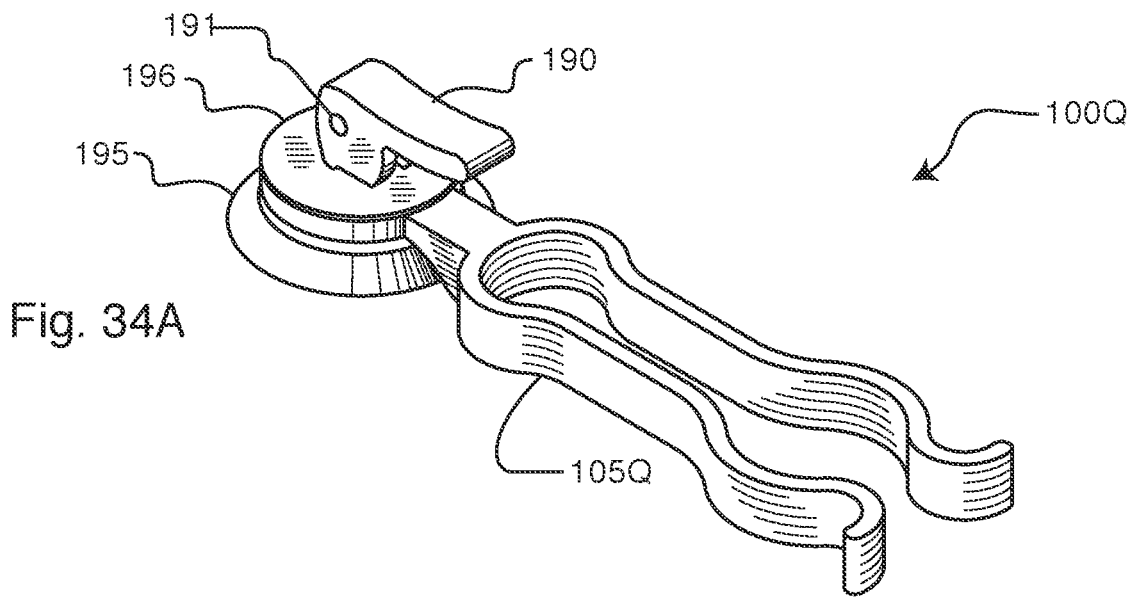
FIG. 34A is a perspective view of holder 100Q in locked position.
Figure 34B:
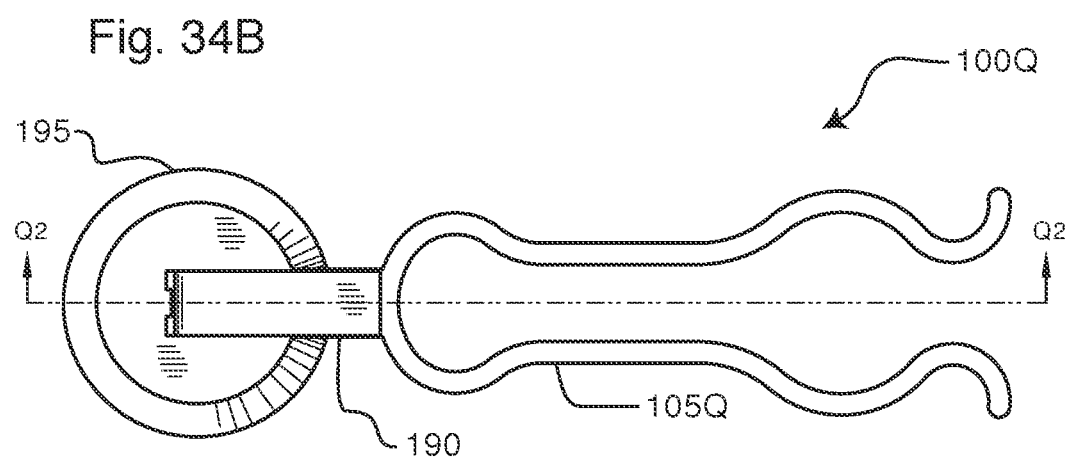
FIG. 34B is a top down view of holder 100Q in locked position.
Figure 34C:
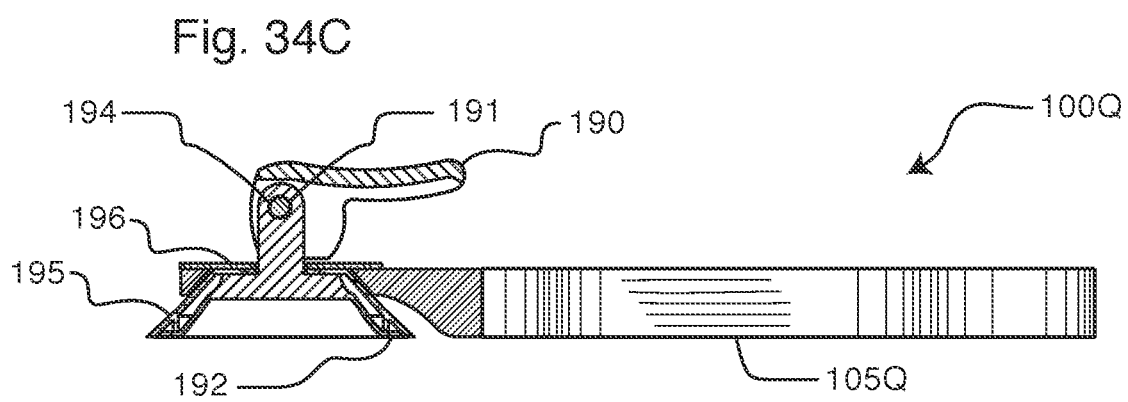
FIG. 34C is a side section view of holder 100Q along lines Q2-Q2 from FIG. 34B.
Figure 35A:
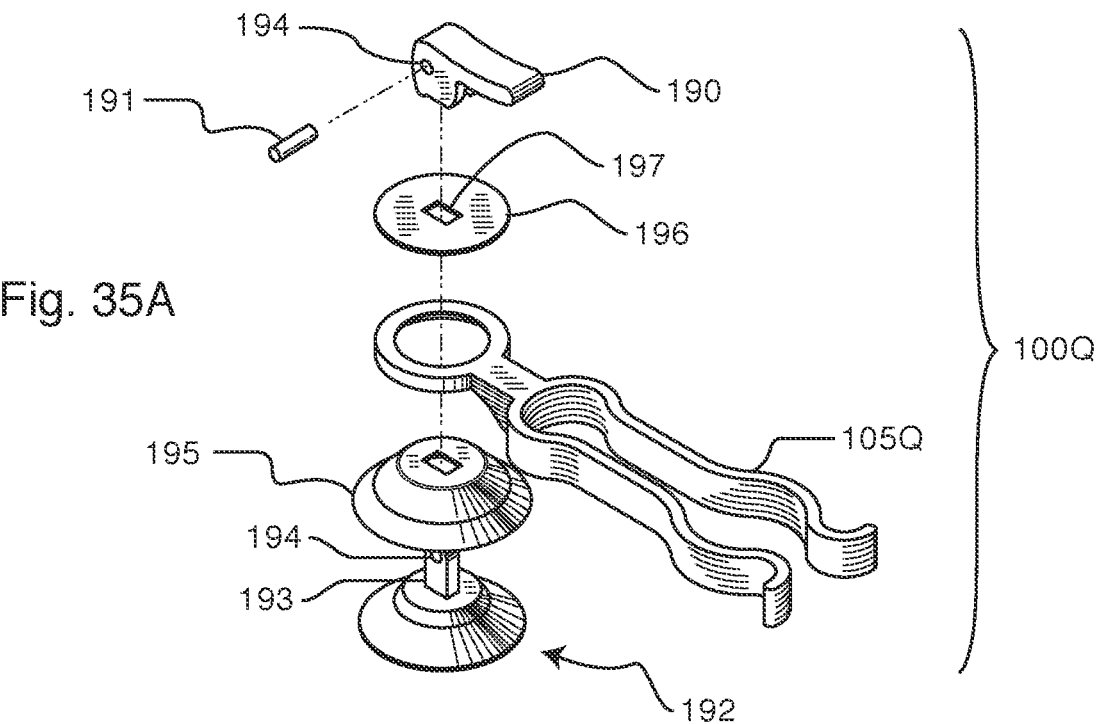
FIG. 35A is a perspective exploded view of holder 100Q.
Figure 35B:
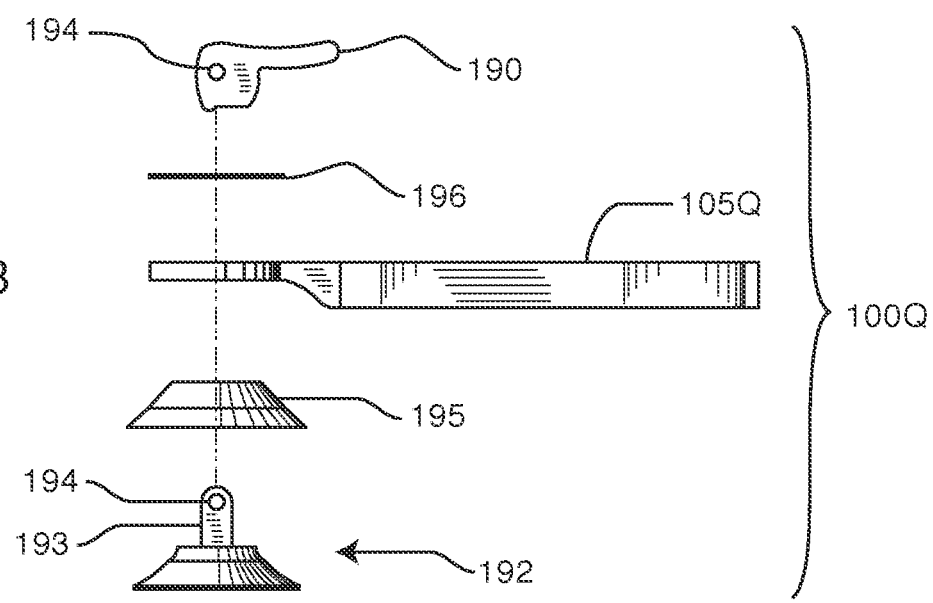
FIG. 35B is a side exploded view of holder 100Q.

FIG. 33A is a perspective view of another embodiment of a lever-lock-type holder 100Q. FIG. 33B is a top down view showing section lines Q1-Q1. FIG. 33C is a section view along lines Q1-Q1 showing lever 190 in an unlocked position and suction cup 192 in a relaxed position as it drops down relative to when it is in a locked position as shown in FIG. 34C. FIG. 34A is a perspective view of holder 100Q in locked position. FIG. 34B is a top down view of holder 100Q in locked position. When lever 190 is rotated from the unlocked to locked position it acts as a cam lever by pressing against retainer 196 which traps main body 105Q between retainer 196 and bell housing 195 while still allowing the main body 105Q to rotate around said bell housing 195. Said retainer 196 has a center hole 197 (as particularly seen in FIG. 35A) which allows suction cup with post 192 to move up and down. The exploded views in FIG. 35A and FIG. 35B can aid in understanding the arrangement of the parts of holder 100Q and how they fit together.

As seen in FIG. 1A, FIG. 17, FIG. 19A, FIG. 19B and FIG. 19C, the utensil head 210 such as in a dish wand 200B can be positioned in such holders as 100A or 100B so draining liquid 224 can drain into sink basin 301. This obviates the need for a dish or other means of channeling such utensil drippings 224.

Similarly, other utensils such as a sponge 200C (as shown in FIG. 4A and FIG. 12A and FIG. 22A) or scrubbing pad 200D (shown in FIG. 7A through FIG. 7D) can also be parked so as to drain liquid 224 into sink basin 301.

As shown in FIG. 17 and FIG. 19B some utensils, such as dish wand 200B, have a hollow handle 209 for cleaning fluid 214, such as liquid dish soap, and a dispensing head 210 with an outlet 216. Such fluid 214 can unintentionally leak out of the dispensing head 210 through outlet 216 if utensil 200B is tilted downward towards said outlet. Even laying down a utensil 200B horizontally, as for instance on the bottom of a sink basin 301, can result in leaking some fluid 214 (not shown). Such leaking is well-known and considered undesirable. The upright position of the utensil 200B (with the dispensing head 210 uppermost) in the holder 100B means that such cleaning fluids 214 flow down into the handle hollow 209 towards end cap 218 which is lower than said head 210 thus preventing leakage.

The invention of the present disclosure allows for easy configuration for a range of utensils. For example, FIG. 11A, FIG. 11B and FIG. 11C shows a holder 100D configured for a dish wand 200B. FIG. 10A shows platform 105D and suction cup 140 of holder 100D. FIG. 10A further shows platform 105D is comprised of suction cup connector 106, first arm 110A, and second arm 110B.

In another example, FIG. 12A shows holder 100E comprised of platform 105E and suction cup 140 configured for sponge 200C. FIG. 12B, FIG. 12C and FIG. 12D show other views of holder 100E with said sponge 200C.

The embodiment of holder 100A demonstrates how one design can be configured to accommodate a wide range of types and sizes of utensils. For example FIG. 1A, FIG. 2A, FIG. 2B, FIG. 2C, FIG. 3A and FIG. 3B shows holder 100A with a dish wand 200B. FIG. 4A, FIG. 4B and FIG. 4C show an example of holder 100A with a sponge 200C. Another example is shown in FIG. 7A, FIG. 7B, FIG. 7C and FIG. 7D where holder 100A is holding scrubbing pad 200D.

As shown in FIG. 21A through FIG. 21D, FIG. 22A through FIG. 22D, and FIG. 23A through FIG. 23D is an embodiment 100C which can accept one or more utensils. As shown more particularly in FIG. 21A are platform 105C and suction cup 140 which comprise holder embodiment 100C. FIG. 21A, FIG. 21B, FIG. 21C and FIG. 21D have a third arm 110C which, with first arm 110A, defines second void 112B adjacent first void 112A. Holder 100C is shown simply as an example because many configurations for holding multiple utensils are possible by combining parts of the various aspects of holders described in the disclosure of the present invention.

Shown in FIG. 23A is holder 100C with mouth 113A configured to receive sponge 200C into first void 112A and with mouth 113B configured to receive dish wand 200B into second void 112B.

In FIG. 21D and FIG. 23A first void 112A and second void 112B are specifically labeled but are shown together, either empty or occupied, but not specifically labeled in FIG. 21A, FIG. 21C, FIG. 21D, FIG. 22A through FIG. 22D, and FIG. 23A through FIG. 27C.

Figure 8A:
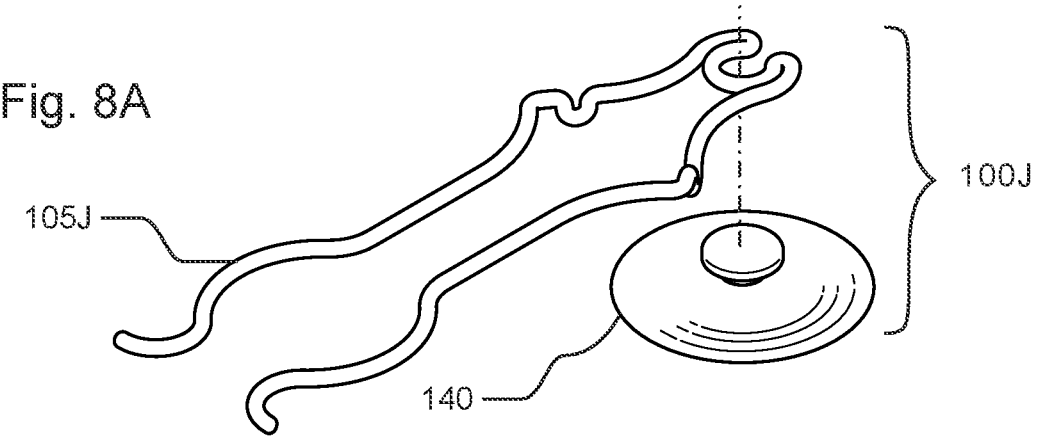
FIG. 8A is an exploded perspective view of holder 100J.
Figure 8B:
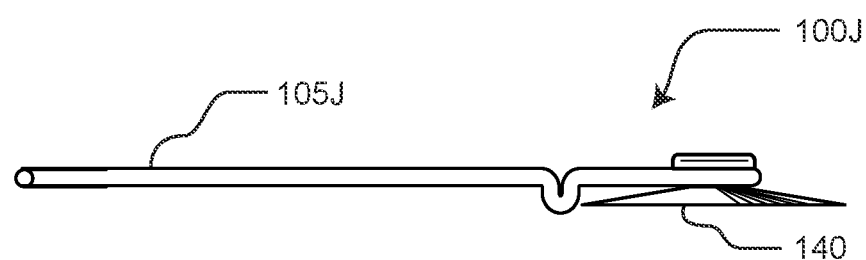
FIG. 8B is a side view of holder 100J.
Figure 8C:
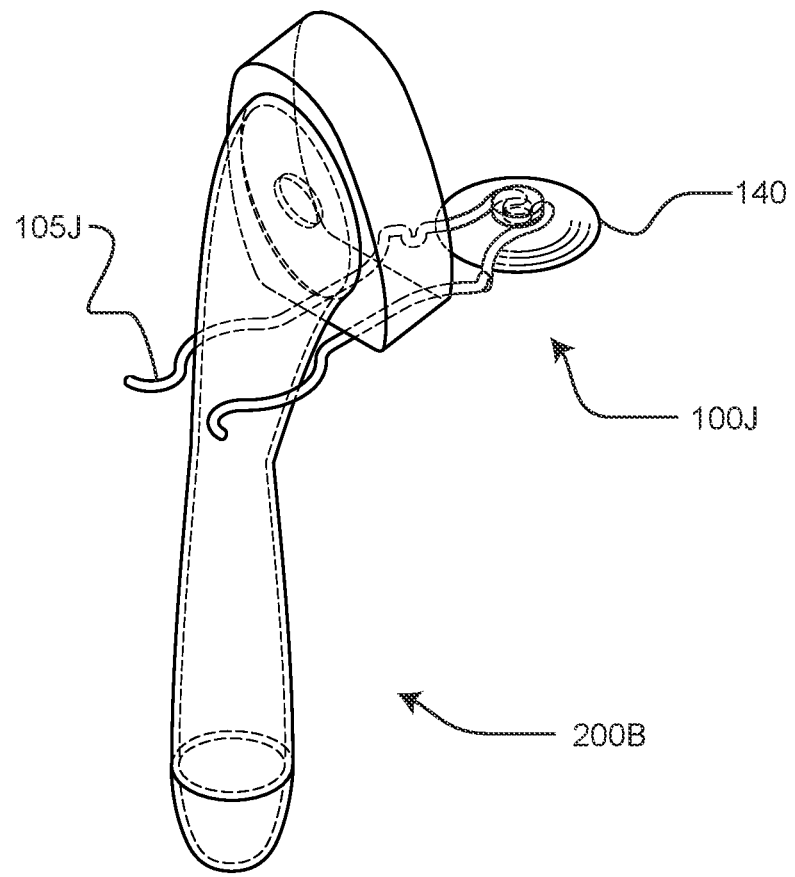
FIG. 8C is a perspective view of holder 100J with a dish wand 200B.

FIG. 8A shows an exploded perspective view of holder 100J where platform 105J is comprised of bent wire accompanied by a suction cup 140. FIG. 8B shows a side view of an assembled holder 100J. FIG. 8C shows holder 100J holding a dish wand 200B. Holder 100J is configured to hold other utensils such as a sponge 200C or scrubbing pad 200D (not shown).

There are many optional retention means. For example FIG. 9A shows two fillets 126 which can allow a utensil (not shown) to better fit into void 112A. Fortunately, one normally adds some draft (not shown) when designing for injection molding which can perform similarly to fillets 126. Another example is shown in FIG. 9B and FIG. 9C which show scoops 128 removed which can also help to more positively retain a utensil (not shown). Another example in FIG. 9D and FIG. 9E shows two bumps 130 at the proximal end 115 of first arm 110A and second arm 110B which can also contribute to more positive retention of a utensil (not shown).

One can use as many or none of these additional optional retention methods as one wishes.

Figure 24A:
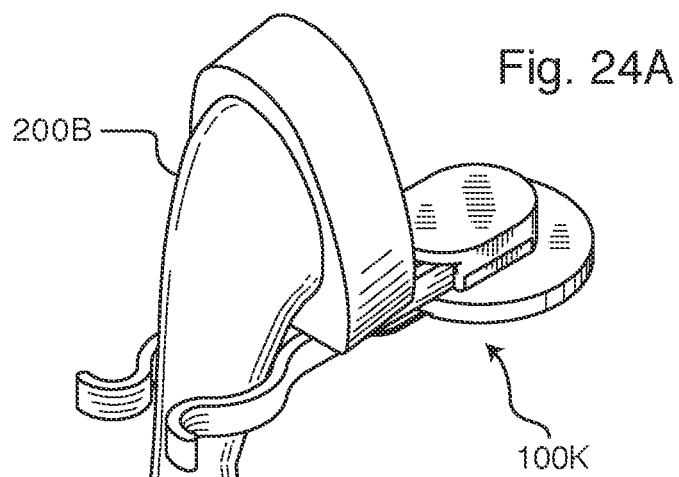
FIG. 24A is a perspective view of holder 100K with dish wand 200B.
Figure 24B:
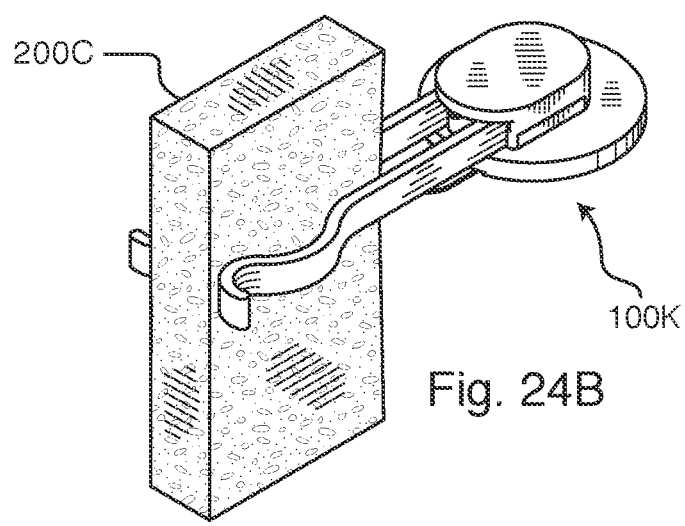
FIG. 24B is a perspective view of holder 100K with sponge 200C.
Figure 24C:
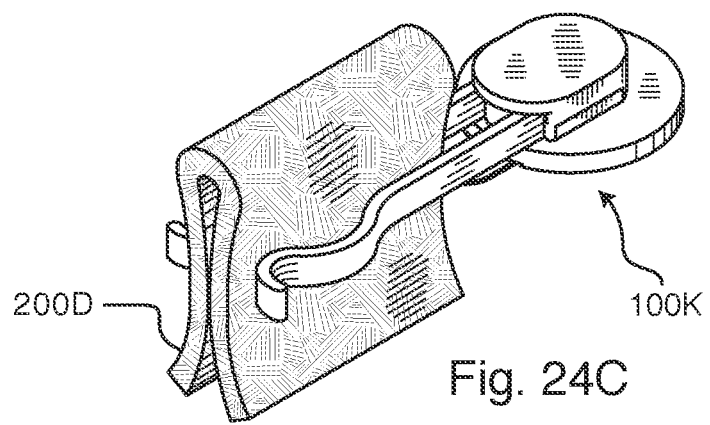
FIG. 24C is a perspective view of holder 100K with scrubbing pad 200D.
Figure 25A:
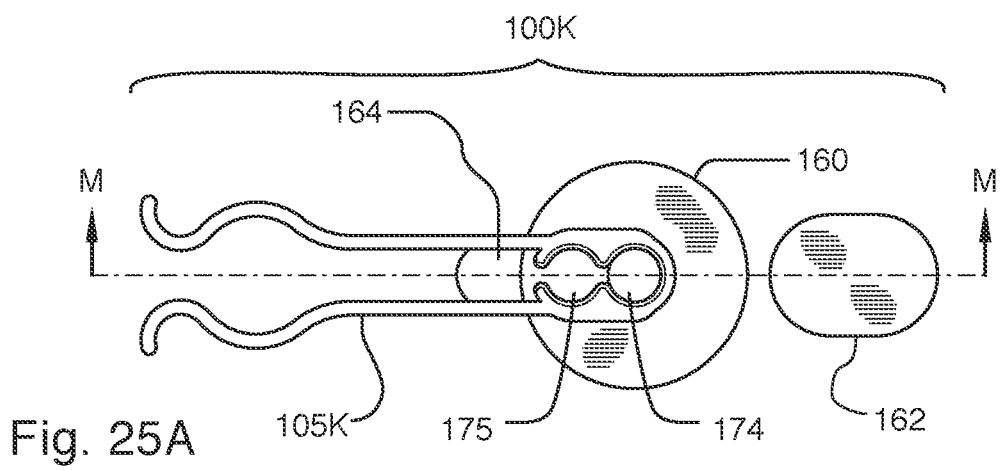
FIG. 25A is a top down exploded view of holder 100K (with lid 162 slide off).
Figure 25B:
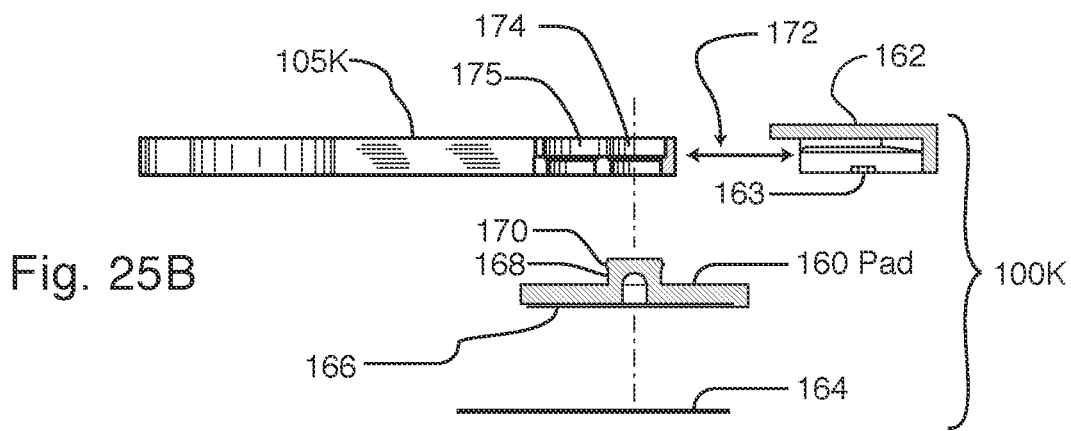
FIG. 25B is a side section view along lines M-M from FIG. 25A.

FIGS. 24A, 24B and 24C show an embodiment of utensil holder 100K holding, respectively, dishwand 200B, sponge 200C and scrubbing pad 200D. FIG. 26A shows the assembled holder 100K. FIG. 25B is an exploded view of holder 100K comprised of platform 105K, lid 162, pad 160 and adhesive strip 164 along lines M-M in FIG. 25A. FIG. 26B is an exploded drawing of holder 100K as seen top down. FIG. 26C is an exploded drawing showing the same parts from a bottom up view.

As shown in FIG. 25B and FIG. 26B hole 174 or hole 175 of platform 105K snaps over ring 170 on post 168 of pad 160 in what is generally known as an annular snap fit. Choosing hole 174 or hole 175 adjusts the reach of arms 176 and 177 (designated in FIG. 26B and FIG. 26C) by moving platform 105K closer to or further from post 168. If one desires more adjustability more such holes can be included.

As particularly shown in FIG. 26B and FIG. 26C lid 162 has two channels 178 which engagingly slide over two platform rails 179. In doing so the lid 162 enables platform 105K to hold onto post 168 and ring 170. As shown in FIG. 26B and FIG. 26C lid 162 slides on and off in the directions shown by two-way arrow 172. Lid 162 includes two snap-on catches 163 which interlock with platform 105K to create a snap-fit relationship which keeps said lid in place. In other words, this arrangement makes it easy to assemble and disassemble holder 100K without the need of any great skill or tools.

Figure 25C:
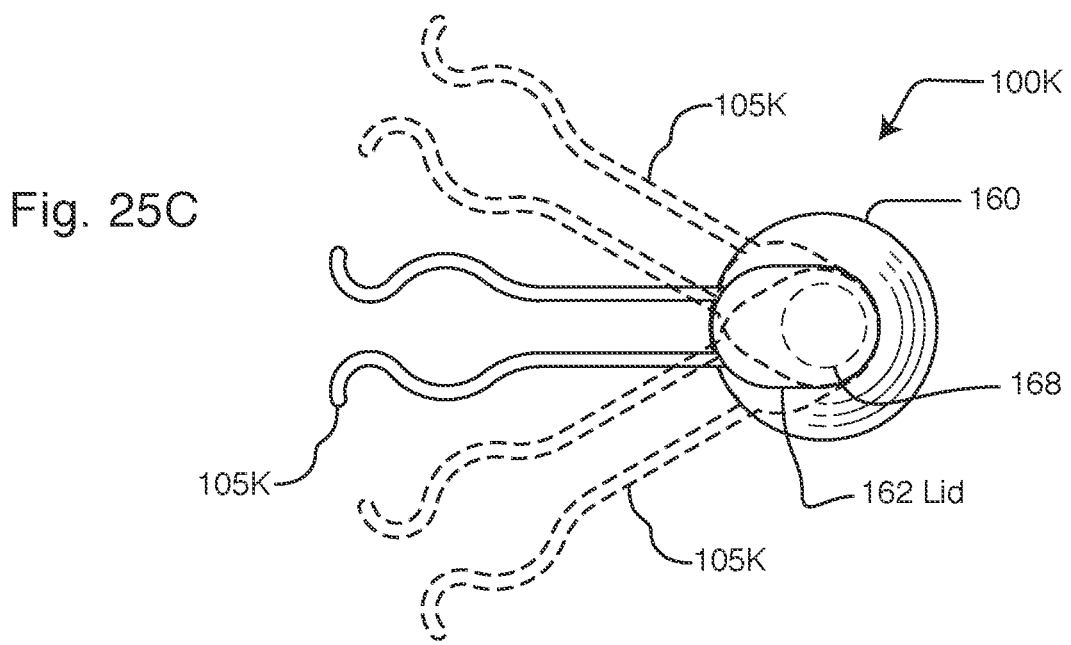
FIG. 25C is a top down view of holder 100K.
Figure 27A:
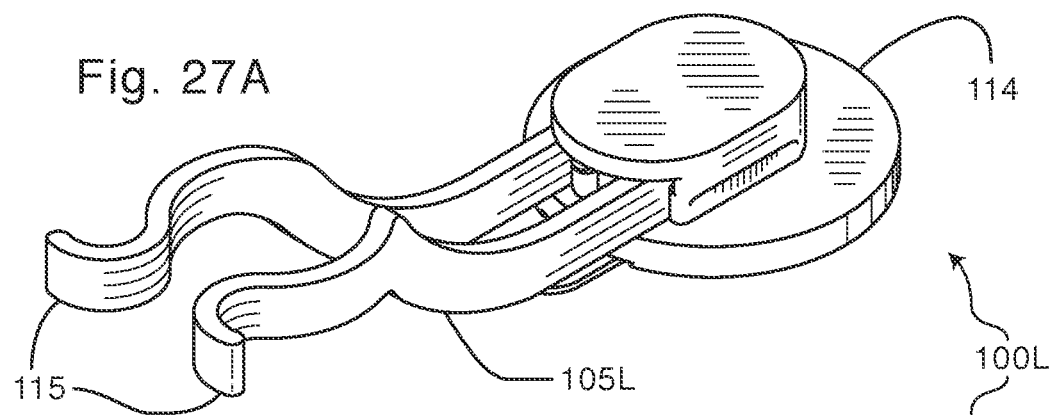
FIG. 27A is a perspective view of holder 100L.
Figure 27B:
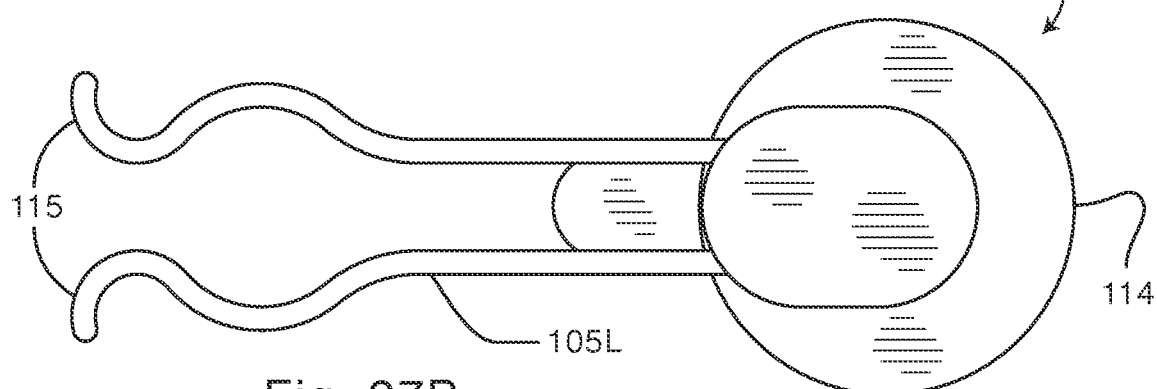
FIG. 27B is a top down view of holder 100L.
Figure 27C:
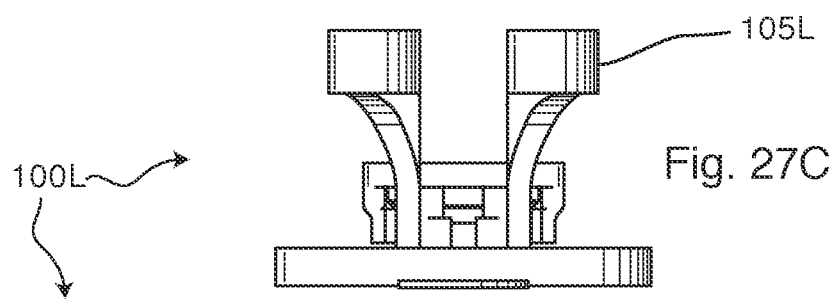
FIG. 27C is a front view of holder 100L.
Figure 27D:
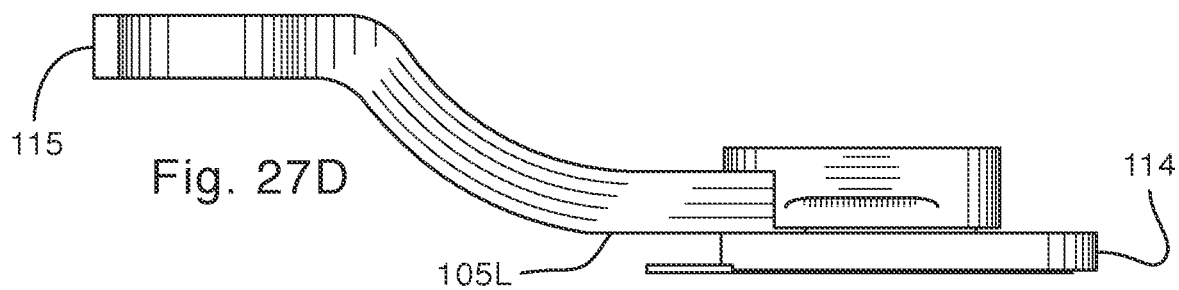
FIG. 27D is a side view of holder 100L.
Figure 29A:
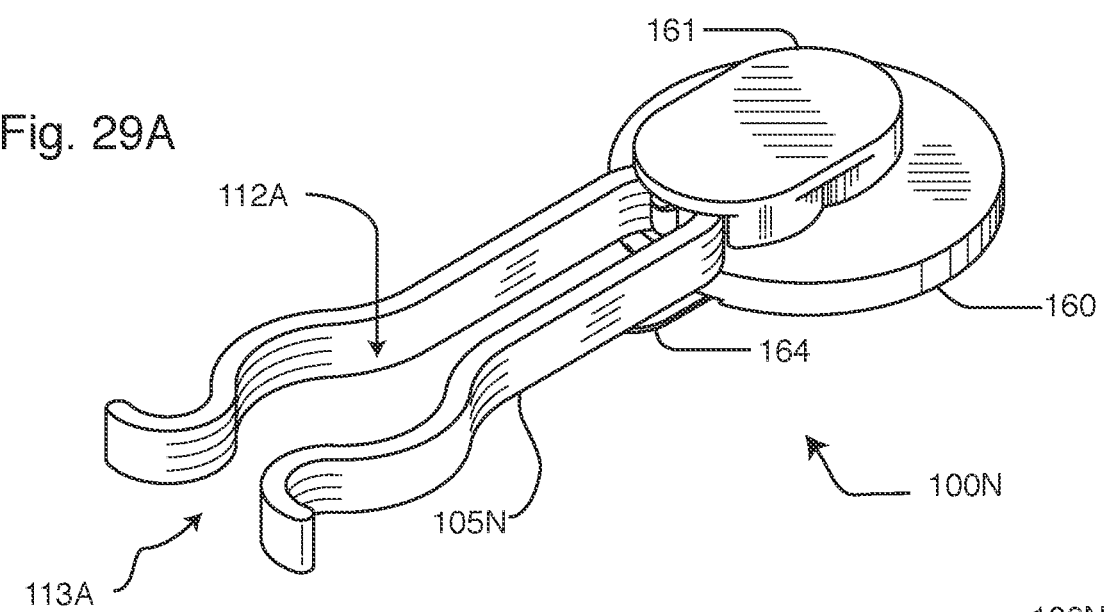
FIG. 29A is a perspective view of holder 100N (assembled).
Figure 29B:
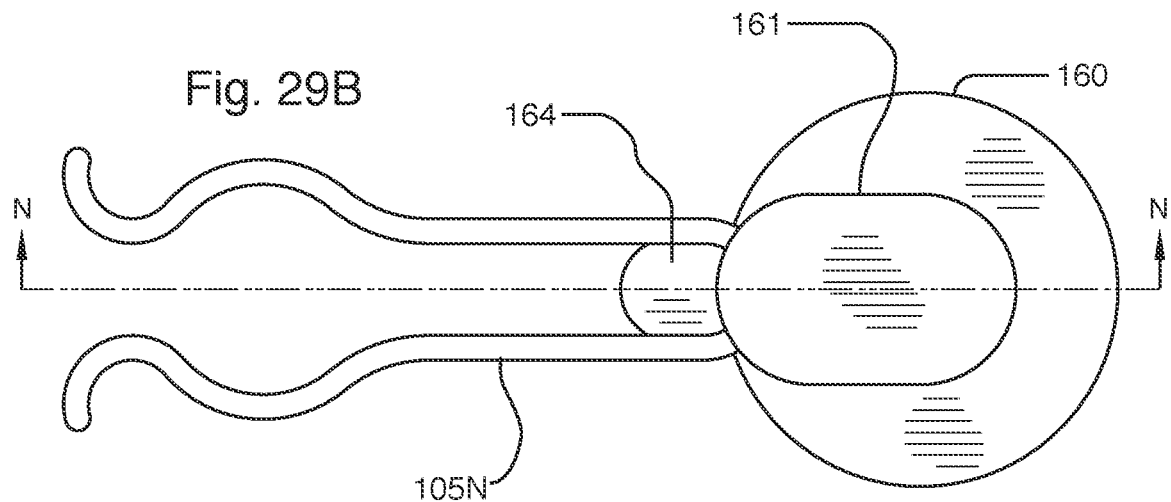
FIG. 29B is a top down view of holder 100N.
Figure 29C:
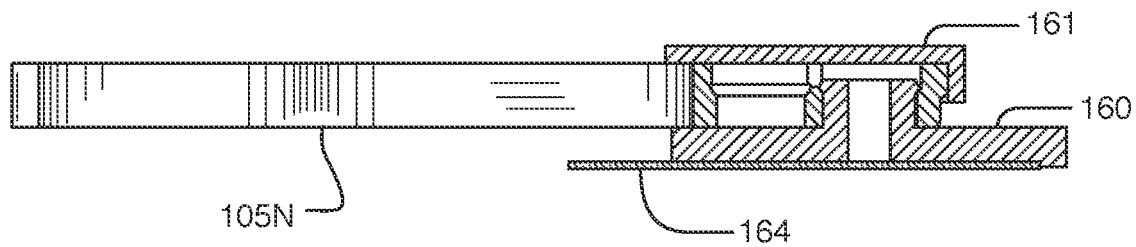
FIG. 29C is a side section view of holder 100N along lines N-N from FIG. 29B.

In FIG. 25C embodiment 100K is shown to be able to swivel by pivoting around the center of post 168 of pad 160. Two swiveled positions are indicated by phantom dotted outlines, but it is understood these are only examples of many possible positions.

FIG. 26C shows recess 166 for receiving an adhesive strip 164. There are various attachment means available, for example, removable adhesive strips such as 3M Command Strips™ or various types of Velcro™ (not shown). If desired one can use permanent adhesive means such as 3M™ Mounting Tape (not shown).

FIG. 27A, FIG. 27B, FIG. 27C and FIG. 27D show an embodiment of utensil holder 100L in which a portion of the proximal end 115 of platform 105L has been raised higher. As shown in FIG. 28A, FIG. 28B, FIG. 28C and FIG. 28D this results in a held utensil, such as dishwand 200B, being lifted higher. This is intended as an example of many configurations which the invention of this disclosure is capable of being adapted to.

FIG. 28A, FIG. 28C and FIG. 28D show a pair of drip stops 180 to interrupt the path of dripping liquid thus helping to guide such liquid downward. Although a simple bump is shown, such a drip stop could be enacted in various ways, such as an annular ring or a depressed grove or a combination thereof.

FIG. 29A, FIG. 29B, FIG. 29C and FIG. 30 show an embodiment of utensil holder 100N with a lid 161 which is placed and removed moving as indicated by direction arrow 173. Such a cap can be retained by such methods as a friction fit or a snap fit relationship, such arrangements being commonly known to those skilled in the art.

Also, the user can choose to place either hole 174 or 175 on post 168 to adjust the length of void 112A (length meaning, for example, the distance of mouth of void 113A from pad 160). Shortening the length can, for example, make more of the sink area usable. A longer length can, for example, provide more room for a larger utensil. Although only two holes 174 and 175 are shown, more such holes could be incorporated.

One could also have such holes simply snap over the center post directly, without the addition of a lid (not shown). Such a snap fit relationship is well known to those skilled in the art.

FIG. 38A, FIG. 38B, FIG. 38C, FIG. 38D and FIG. 38E shown show an embodiment of holder 100T where main body 105T snaps over post 168. Hole 184 and slot 185 allow post 168 to compress as main body 105T snaps over said post. Optional plug 186 slides into hole 184 keeping said post 168 expanded thus ensuring a more secure grip of main body 105T relative to post 168.

Shown in FIG. 39A through FIG. 40B is an embodiment of holder 100U which includes a twist on cap 400 which locks onto post 412 of pad 410 via keyhole 413. Interlocking protrusions 406 and recesses 408 enable cap 400 to cooperate to hold said cap in locked position. Alignment indicators on cap 416 and alignment indicators on pad 418 provide a visual indication of how to align cap 400 for locking and/or removal. Wings 402 on shaft 401 fit through keyhole 413 and secure cap 400 to post 412 when twisted into locking position thus retaining platform 105U between cap 400 and pad 410. Ring 422 fits onto post 412 via hole 424. This arrangement allows platform 105U to swivel as indicated by arrow 420 using post 412 as a vertical axle. One or more stops 426 can be provided to limit how far the cap pivots. Stops 426 and interlocking protrusions 406 and recesses 408 provide tactile feedback to let the user know when the cap 400 is locked or unlocked. This arrangement makes tasks such as assembly, disassembly and cleaning easier. Holder embodiment 100U eliminates all overhangs and undercuts making injection molding easier.

Shown in FIG. 41A through FIG. 42B is an embodiment of holder 100W which includes a rubber plug 500 which inserts into hole 506 of post 508 of pad 502. Platform 105W includes ring 504 which fits over post 508. Platform 105W is retained between plug 500 and pad 502. Adhesive strip 510 can fit into recess 512. Platform 105W can pivot around post 508 (not shown but analogous to what is shown in FIG. 16A). Plug 500 and platform 105W can be removed for ease of cleaning. Although platform 100W shows only one ring it is understood a platform could have multiple such rings which the user may choose from as shown in FIG. 43A with example platform 520. Such an arrangement allows for adjusting the reach of platform 520 vis a vis post 508 of pad 502. Likewise, although platform 105W is relatively flat as shown, for example in FIG. 42A and FIG. 43A, it is envisioned it can be other shapes, for example an arched platform 522 as shown in FIG. 43B. It is to be understood other such variations are described elsewhere in this disclosure which may apply in a similar manner. The many advantages of this embodiment in holder 100W particularly include ease of injection molding, assembly and disassembly.

The invention of this disclosure can be manufactured with a variety of methods and materials. Suction cups such as suction cup 140 (as in FIG. 1B) are well-known and are generally made by injection molding and are commonly available in a variety of sizes and types. Although the term "rubber" is used in this disclosure it is understood that that is mostly a historical reference, meaning that although suction cups or plugs such as plug 500 were traditionally made of rubber, nowadays other materials can be used such as silicone, vinyl and urethane so use of the term "rubber" is not intended to be exclusionary.

Adhesive means mentioned in the disclosure of the present invention, such as suction cups 140 (as in FIG. 1B), 3M™ Command Strips 164 (as in FIG. 26C), are well known and are given as examples and are not intended to be exclusionary of other types of attachment means such as Velcro™, 3M™ Mounting Tape or even screws.

Further, relatively stiff parts such as platforms 105A through 105H and 105K through 105M (shown in many figures) and other parts such as pad 160, lid 162, pad 502 or platform 522 could easily be injection molded from a range of types of plastics such as PETG (Polyethylene terephthalate glycol-modified) or ABS (Acrylonitrile butadiene styrene). It will be apparent to one skilled in the art which parts to make of relatively stiff materials and what to make of a relatively elastic rubber-type material. In another example, FIG. 8A, FIG. 8B and FIG. 8C show a platform 105J which can be formed by bending material such as music wire.

FIGS. 44A through 44D show a holder 700 comprising securing portion 102 and holding portion 104. Holder 700 includes platform 705 and an adhesive strip 610, such as a 3M Command Strip. Other adhesives, such as removable pressure-sensitive glue, could be utilized in securing portion 102. In general, with any such adhesive the more water resistant the better as some environments are wetter or more humid than others. A designer can choose from a spectrum of adhesives with different degrees of water resistance, with higher or lower tack or degree of ease of removability. The 3M Outdoor Command strip provides high water resistance and high tack with ease of removal, but other another adhesive could be chosen due to other considerations such as cost or desired level of permanence. Platform 705 can be fixed in position utilizing adhesive strip 610. This is similar to holder 100M shown in FIGS. 20A and 20B in that 100M would be relatively fixed in position once installed as it was shown secured with a nut 313 from below. Holder 700 further clarifies that the design of holder 100M and holder 700 are not limited to rotatable holders. Further, the device 700 in FIGS. 44A through 44D show a device 700 which is a simply one-piece utensil holder platform 705 plus an attaching means, for example adhesive strip 610. Thus I have demonstrated multiple examples of a one-piece design plus attaching means.

These examples are not intended to be exclusionary, but instead to indicate by way of examples the wide variety of ways such devices can be designed.

FIGS. 45A through 45G show a utensil holder 600, including securing portion 608A and holding portion 608B, which has many desirable attributes, including being rotatable, easily injection molded and easily assembled and disassembled. Said holder is shown with an adhesive strip 610, such as a 3M Command Strip, for attachment to a horizontal surface adjacent, for example, to a sink 300 (similarly to what is shown in FIG. 1A). In addition a platform 605 can be easily removed for cleaning by pulling the platform 605 in a direction generally parallel with the countertop. Although sink 300 in FIG. 1A is used as an example holder 600 could be used elsewhere such as by a bathtub (not shown).

The flexible distal holder arms 606 shown in FIG. 45F allow easy installation by pressing the distal end 614 back on to the hub 603. In other words, the hub 603 and platform 605 snap apart and back together when so desired.

It should be noted that the geometry of platform 605 is designed to allow parking and removal of utensils without disturbing the grip of the platform 605 around the hub 603. Thus one can selectively park and remove utensils and alternatively remove platform 605.

As shown in section view FIG. 45F base 602 includes nubs 622 which are juxtaposed with nubs 621 on the inner face of the distal arms 606 of platform 605 of the holder 600. This is shown in greater detail in magnified section view in FIG. 45I.

This arrangement is a resistance element and serves to limit rotation to some degree. The amount of existing freedom of rotation is commonly called "backlash" when referring to mating gear teeth. If one exerts sufficient torque on proximal arms 607 of platform 605 the distal holder arms 606 expand to allow swiveling. Nubs 621 and 622 tend to come to rest when they are juxtaposed side-by-side so distal arms 606 relax and close around hub 603. In other words the facing nubs 621 and 622 provide a detente function to prevent undesired rotation to a degree while at rest, but allowing rotation when desired.

As shown in FIG. 45I, when nubs 621 are more pronounced than nubs 622, then nubs 621 rest against face of hub 632. while nubs 622 touch nothing. The shorter nubs 622 are, the less torque required to turn platform 605 as distal arms 606 expand when nubs 621 pass over nubs 622.

Conversely, this could be viewed as protrusions on one face and depressions on the other which function to perform the same relaxation when a bump is settled in a corresponding depression (not shown). It will be understood that the size and number of nubs, bumps or depressions on either face is up to the designer in order to control aspects such as the degree of rotation in normal use ("backlash") and/or amount of torque required for rotation beyond that. By way of example, one could have the same number of nubs per inch on both faces (as shown in FIGS. 45F and 45I) or many nubs on the face of the hub 603 and fewer on the inside face of distal arm 634 or vis versa (not shown). Similarly, although nubs 622 are only shown on base 602, as shown in FIG. 45B, and FIGS. 45D and 45E, such nubs could also be on the face of the top 630 (not shown).

This arrangement allows the plastic of the distal holder arms 606 to be in a state of rest during normal use, thus the plastic is not stretched out continually and tends to retain its original shape and size. In other words, it does not tend to be come looser over time. As shown in FIG. 45B the height of the nubs 621 on the inner face of distal arms 634 allows the user to flip the platform 605 and still interlock with the nubs 622 on base 602.

As shown in FIGS. 45B, 45C, 45D, 45F and 45H only having nubs 622 on one half of the hub face 632, shown on face of base 631, has many advantages among which are allowing easier manufacture and assembly. This is especially apparent when, for example, one uses an assembly method such as spin welding as when top 601 does not have nubs which obviates the need to line up top 601 with the nubs 622 on base 602. So there can be advantages to having nubs 622 only on top 601 or bottom 602 or on both. Of course an assembly method such as spin welding would require design changes such not including protrusions 625 as shown in FIGS. 45D and 45E.

In FIGS. 45B, 45D and 45E details are to be seen with the protrusions 625 on top 601 and corresponding recesses 626 on base 602. These serve, among other functions, to line up the parts during assembly and also prevent rotation while installing screw 611. Plus this prevents subsequent rotation of top 601 and base 602 relative to each other which could loosen screw 611 over time.

Further, as shown in FIG. 45C nubs 620 on the inside faces of the proximal arms 607 located distal of the narrowing 609 of void 612 help to hold a utensil, such as a wet, flexible sponge by denting into said sponge (similarly to what is shown in FIGS. 4B and 4C). When sponges dry they tend to shrink and such protrusions enable greater retention. This can also assist in retaining other utensils such as a scrubbing pad.

As shown in FIG. 45B the utensil holder 600 has a top 601 and a base 602 which are held together by screw 611. This is but one example of many known means of assembly which could include spin welding, adhesive or other known means.

FIG. 45J shows a variation of platform 605 with utensil holder platform arms 607 converging from approximately where the holding portion 608B joins with securing portion 608A to narrowing of void 609. When a utensil such as a sponge (not shown) is inserted past narrowing of void 609 arms 607 widen and become more nearly parallel providing more contact and support for the utensil (not shown). it is understood said arms 607 could be straight, wavy, recurve or other shapes, for instance to accommodate particular utensils or adjust tension, while remaining within the scope of the present invention.

FIG. 45K is a perspective view of platform 605 in FIG. 45J.

FIG. 46A is an exploded view showing utensil holder 800 comprised of top 802, base 804 and platform 806. It further shows sink sprayer hose guide 810 comprised of threaded escutcheon 812, washer 814 and nut 816. Holder 800 and sink sprayer hose guide 810 taken together become assemblage 818. Although sink sprayer hose guide 810 is shown as an example many products could benefit from including holder 800 such as sink faucet hole covers or soap dispensers. Installation and use of such products are well known.

FIG. 19C shows how a similar holder 100B cooperates with countertop 302.

In FIG. 46B the assemblage 818 of holder 800 and sink sprayer hose guide 810 is shown.

FIG. 46D is a section view along lines Y-Y of FIG. 46C showing how top 802 and base 804 are installed above washer 814. A countertop or sink rim (not shown) go in the space between the washer 814 and nut 816.

Further, in FIG. 46C platform 806 is shown removed. Platform 806 can be snapped back on by pressing in direction of arrow 820 as shown in FIG. 46D. Once snapped on platform 806 can rotate about sink sprayer hose guide 810.

Many variations are foreseen as possible with the invention of this disclosure. For instance, top 802 and base 804 could be manufactured as one part. Also, items such as sink sprayer hose guides, sink faucet holes covers, or even bottles or a simple base could incorporate the design principles of this invention during manufacture. For example, a sink sprayer hose guide could have the top 802 and bottom 804 included in the mold for the threaded escutcheon 812. Such variations are understood to be within the scope of the present invention.

Use of holder 800 in assemblage 818 results in advantages such as increasing the utility of space around sinks, increasing the utility of products such as sink sprayer hose guides, allowing rotation of platform 806 and ease of cleaning by removal of said platform.

These are intended as examples and not meant to limit the methods and materials for making the invention of this disclosure. It will be obvious to those skilled in the field that there are other methods and materials to make the invention of this disclosure.

I claim:

1. A sink utensil holder, comprising:
   (a) a transversely extending mounting post defining a transverse axis and having first and second transverse ends,
   (b) a means for securing the first transverse end of the mounting post to a surface with the transverse axis of the mounting post extending axially away from the surface, and
   (c) a clip extending radially from the mounting post from a proximal longitudinal end secured to the mounting post to a distal longitudinal end,
   (d) wherein the clip is rotatable about the transverse axis of the mounting post.

2. The sink utensil holder of claim 1 wherein the mounting post extends orthogonal to the surface when the mounting post is secured to the surface by the securing means.

3. The sink utensil holder of claim 1 wherein the securing means is a suction cup.

4. The sink utensil holder of claim 3 further comprising locking lever suction cup lifters.

5. The sink utensil holder of claim 1 wherein the securing means is a pressure sensitive adhesive.

6. The sink utensil holder of claim 5 wherein the securing means is a stretchable double-faced synthetic rubber resin adhesive tape.

7. The sink utensil holder of claim 1 wherein the clip is releasably secured to the mounting post.

8. The sink utensil holder of claim 1 further comprising a resistance element operable for applying resistance against rotation of the clip about the transverse axis of the mounting post at selected rotational positions of the clip.

9. The sink utensil holder of claim 1 wherein the clip has a pair of laterally spaced and laterally elastically deformable first and second arms extending radially from the transverse axis from a proximal end of each of the first and second arms to a distal end of each of the first and second arms whereby the first and second arms define a lateral gap therebetween.

10. The sink utensil holder of claim 9 wherein at least one of the first and second arms is curvilinear so as to define an intermediate portion having a first lateral spacing between the first and second arms and a distal end portion having a second lateral spacing between the first and second arms wherein the first lateral spacing is greater than the second lateral spacing.

11. The sink utensil holder of claim 9 wherein the first and second arms are mirror images of one another.

12. The sink utensil holder of claim 10 wherein the first and second arms are mirror images of one another.

13. The sink utensil holder of claim 9 wherein the first and second arms have inner facing surfaces with nubbins projecting therefrom wherein the nubbins are effective for enhancing frictional resistance to longitudinal and/or transverse sliding of a compressible item clamped between the first and second arms.

14. The sink utensil holder of claim 9 wherein at least one of the first and second arms further includes a laterally projecting third arm.

15. The sink utensil holder of claim 9 wherein the distal ends of the first and second arms project laterally away from one another.

\* \* \* \* \*